US007021204B2

(12) United States Patent
Backus et al.

(10) Patent No.: US 7,021,204 B2
(45) Date of Patent: Apr. 4, 2006

(54) ENCLOSED ROTISSERIE WITH DETACHABLE ELECTRONIC COMPONENTS

(76) Inventors: Alan L. Backus, 1660 Bel Air Rd., Los Angeles, CA (US) 90077; Ron Popeil, 1672 Waynecrest Dr., Beverly Hills, CA (US) 90210

( * ) Notice: Subject to any disclaimer, the term of this patent is extended or adjusted under 35 U.S.C. 154(b) by 68 days.

(21) Appl. No.: 10/648,836

(22) Filed: Aug. 26, 2003

(65) Prior Publication Data

US 2004/0144260 A1    Jul. 29, 2004

Related U.S. Application Data

(63) Continuation-in-part of application No. 10/286,680, filed on Nov. 2, 2000, which is a continuation of application No. 09/880,673, filed on Jun. 13, 2001, now abandoned, which is a continuation of application No. 09/662,308, filed on Sep. 15, 2000, now Pat. No. 6,393,972, which is a continuation of application No. 09/436,614, filed on Nov. 9, 1999, now Pat. No. 6,173,645, which is a continuation of application No. 09/217,944, filed on Dec. 21, 1998, now Pat. No. 6,170,390.

(51) Int. Cl.
*A47J 37/04*   (2006.01)
*A47J 37/07*   (2006.01)

(52) U.S. Cl. .................. 99/421 H; 99/339; 99/419
(58) Field of Classification Search .............. 99/421 H, 99/421 HH, 421 R, 419, 340, 339
See application file for complete search history.

(56) References Cited

U.S. PATENT DOCUMENTS 553,363 A    1/1896  Sickels (Continued)

FOREIGN PATENT DOCUMENTS

DE    3606800    * 9/1987    ............ 99/421 H (Continued)

OTHER PUBLICATIONS

Dorman, et al., Advantage Partners, LLC v. Salton, Inc., et al. "Ex Parte Application For Temporary Restraining Order and Order to Show Cause Re Preliminary Injunction", Dated Feb. 2, 2001; (6) Pages.

(Continued)

*Primary Examiner*—Reginald L. Alexander
(74) *Attorney, Agent, or Firm*—Jeffer, Mangels, Butler & Marmaro LLP

(57) ABSTRACT

The present invention is directed toward an improved rotisserie oven, having the following features: a removable side mounted control box; single wall oven cabinet construction; single wall oven cabinet construction with tabs protruding from the lower side edges of the oven cabinet which mount feet to support the cabinet; a rigid heat coil structurally connected to the removable control box; a heat coil, supported by a bracket within the oven cabinet which both allows the heat coil to be slid in and out of the oven cabinet and allows for expansion of the heat coil when the coil is energized; a light bulb integrated with the removable control box so that the bulb's globe protrudes into the interior of the oven cabinet when the control box is mounted on the oven cabinet; a drive mechanism integrated into the removable control box which allows the control box to be easily removed from the oven cabinet; a drip pan located below the spit, which has its liquid catching reservoir recessed in from the pan's perimeter; a drip pan cover with an array of small holes recessed into its surface; a spit assembly, whose axis of rotation is located closer to a glass view port located on the oven cabinet's exterior than to the heater located within the oven cabinet; and a spit assembly, whose axis of rotation is located closer to the oven cabinet's loading door than to the top, bottom, back and heat coil within the oven cabinet, using the rotisserie in combination with specific foods and eating schedule, to help people lose weight.

29 Claims, 24 Drawing Sheets

U.S. PATENT DOCUMENTS

| | | | |
|---|---|---|---|
| 1,584,121 | A | 5/1926 | Moecker, Jr. et al. |
| 1,786,300 | A | 12/1930 | Harrison |
| 2,012,811 | A | 8/1935 | Duffy |
| 2,085,169 | A | 6/1937 | Prood |
| 2,245,220 | A | 6/1941 | Nelson |
| 2,502,685 | A | 4/1950 | Warner |
| 2,607,286 | A | 8/1952 | Krissel |
| 2,619,951 | A | 12/1952 | Kahn |
| 2,681,001 | A | 6/1954 | Smith |
| 2,701,516 | A | 2/1955 | Dorsey |
| 2,705,450 | A | 4/1955 | Steinbook |
| 2,722,882 | A | 11/1955 | Wilson |
| 2,754,401 | A | 7/1956 | Edelman |
| 2,809,579 | A * | 10/1957 | Theisen ............... 99/339 |
| 2,815,707 | A | 12/1957 | Morrow |
| 2,827,847 | A | 3/1958 | Shafter |
| 2,828,733 | A | 4/1958 | Moore, Jr. |
| 2,831,421 | A | 4/1958 | Mele |
| 2,839,989 | A | 6/1958 | Persinger |
| 2,846,941 | A | 8/1958 | Goodwin |
| 2,851,575 | A | 9/1958 | Walston et al. |
| 2,887,944 | A | 5/1959 | Walker |
| 2,895,408 | A | 7/1959 | Glenny |
| 2,898,437 | A | 8/1959 | McFarland |
| 2,917,988 | A * | 12/1959 | Harris ............... 99/327 |
| 2,925,081 | A | 2/1960 | Shooter |
| 2,938,450 | A | 5/1960 | Carpenter et al. |
| 2,979,053 | A | 4/1961 | Crispell et al. |
| 2,983,218 | A | 5/1961 | Persinger et al. |
| 3,025,783 | A | 3/1962 | Coudek |
| 3,045,581 | A | 7/1962 | Bernstein |
| 3,079,208 | A | 2/1963 | Compton |
| 3,100,435 | A | 8/1963 | Mobley, Jr. |
| 3,103,161 | A | 9/1963 | Whitehead |
| 3,121,424 | A | 2/1964 | Russell |
| 3,126,814 | A | 3/1964 | Brown |
| 3,127,889 | A | 4/1964 | Mills |
| 3,181,453 | A | 5/1965 | Moran |
| 3,188,939 | A | 6/1965 | Smith |
| 3,196,776 | A | 7/1965 | Norton |
| 3,315,591 | A | 4/1967 | Elliott |
| 3,335,712 | A | 8/1967 | Marasco |
| 3,511,170 | A | 5/1970 | O'Connor |
| 3,527,155 | A | 9/1970 | Renn |
| 3,529,536 | A | 9/1970 | Milhem |
| 3,566,777 | A | 3/1971 | Koziol |
| 3,693,538 | A | 9/1972 | Synder |
| 3,838,538 | A | 10/1974 | Burford |
| 3,867,877 | A | 2/1975 | Zajc |
| 3,901,136 | A | 8/1975 | Wilson et al. |
| 4,089,258 | A | 5/1978 | Berger |
| 4,119,020 | A | 10/1978 | Sharp et al. |
| 4,181,074 | A | 1/1980 | Hieb |
| 4,214,516 | A | 7/1980 | Friedl et al. |
| 4,409,452 | A | 10/1983 | Oouchi et al. |
| 4,421,016 | A | 12/1983 | Sich |
| 4,442,763 | A | 4/1984 | Beller |
| 4,455,928 | A | 6/1984 | Townsend |
| 4,483,241 | A | 11/1984 | Vaughn |
| 4,508,024 | A | 4/1985 | Perkins |
| 4,562,771 | A | 1/1986 | Williams |
| 4,625,634 | A | 12/1986 | Krüper |
| 4,726,352 | A | 2/1988 | Radke |
| 5,044,262 | A | 9/1991 | Burkett et al. |
| 5,184,540 | A | 2/1993 | Riccio |
| 5,275,095 | A | 1/1994 | Van Haren |
| 5,325,767 | A | 7/1994 | Beller |
| 5,367,950 | A | 11/1994 | Sarich |
| 5,410,948 | A | 5/1995 | Eickmeyer |
| 5,473,977 | A | 12/1995 | Koether et al. |
| 5,497,697 | A | 3/1996 | Promny |
| 5,515,773 | A | 5/1996 | Bullard |
| 5,515,774 | A | 5/1996 | Swisher et al. |
| 5,562,022 | A | 10/1996 | Schmid et al. |
| 5,598,769 | A | 2/1997 | Luebke et al. |
| 5,639,497 | A | 6/1997 | Bedford et al. |
| 5,735,191 | A | 4/1998 | Russell et al. |
| 5,778,766 | A * | 7/1998 | Wang ............... 99/326 |
| 5,799,569 | A | 9/1998 | Moreth |
| 5,801,357 | A | 9/1998 | Danen |
| 5,801,362 | A | 9/1998 | Pearlman et al. |
| 5,845,563 | A | 12/1998 | Haring et al. |
| 5,881,640 | A | 3/1999 | Rœvsager |
| 5,961,866 | A | 10/1999 | Hansen |
| 5,970,854 | A | 10/1999 | Tsai |
| 6,009,797 | A | 1/2000 | Lin |
| 6,079,322 | A | 6/2000 | Su |
| 6,080,967 | A | 6/2000 | Sandor et al. |
| 6,131,505 | A * | 10/2000 | Lin ............... 99/340 |
| 6,138,553 | A | 10/2000 | Toebben |

FOREIGN PATENT DOCUMENTS

| | | |
|---|---|---|
| FR | 853400 | 3/1940 |
| FR | 1218203 | 5/1960 |
| GB | 850083 | 9/1960 |
| GB | 996233 | 6/1965 |
| IT | 555893 | 1/1957 |
| KR | 206810 | 12/2001 |

OTHER PUBLICATIONS

Hankin, et al. Advantage Partners, LLC v. Salton, Inc., et al. "Defendant Salton, Inc.'s Opposition to Plaintiff's Ex Parte Application For Temporary Restraining Order and Order to Show Cause Re Preliminary Injunction" Dated Feb. 6, 2001 (18) Pages.

Dorman, et al., Advantage Partners, LLC v. Salton, Inc., et al. "Plaintiff's Reply to Salton's Opposition to Ex Parte Application for Temporary Restraining Order and Order to Show Cause Re Preliminary Injunction". Dated Feb. 7, 2001; (31) Pages.

Dorman, et al., Advantage Partners, LLC v. Salton, Inc., et al. "Ex Parte Order Granting Application for Temporary Restraining Order and Order to Show Cause Re Preliminary Injunction", Dated Feb. 9, 2001; (5) pages.

Dorman, et al., Advantage Partners, LLC v. Salton, Inc., et al. "Final Consent Judgement and Permanent Injunction Against Defendant Salton, Inc."; Dated Feb. 20, 2001; (9) pages.

* cited by examiner 174  196  312  172  310

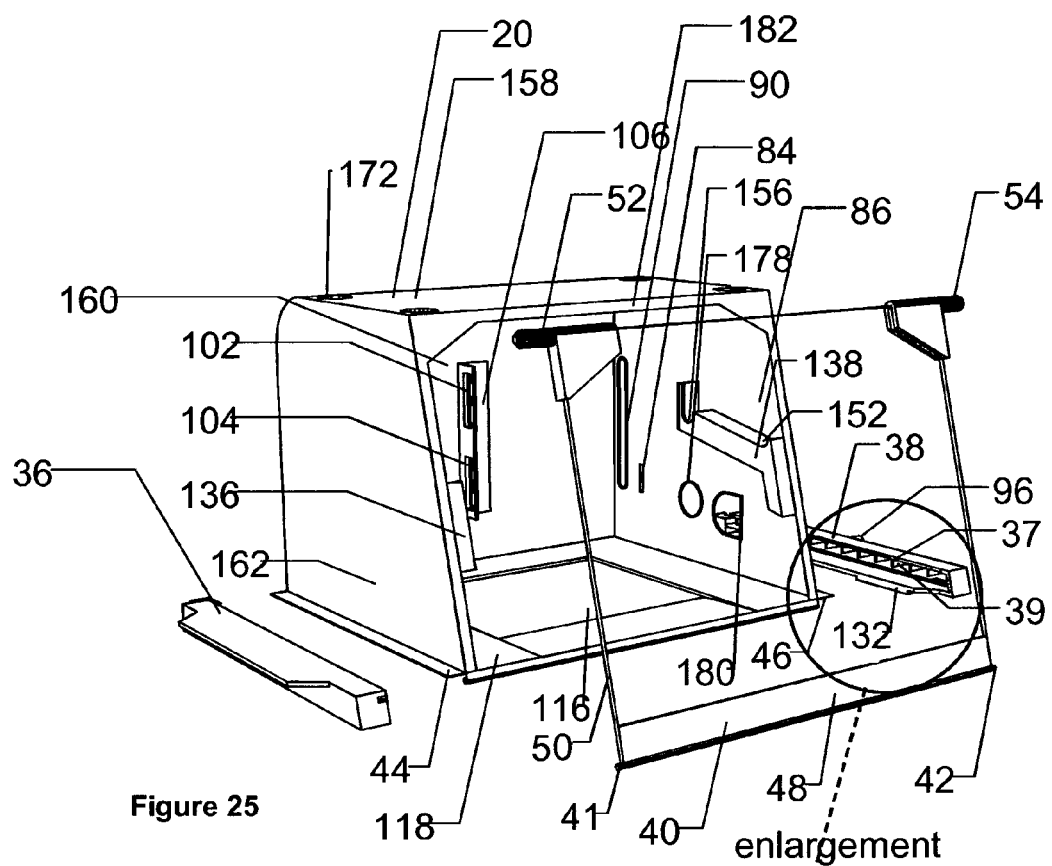
Figure 25
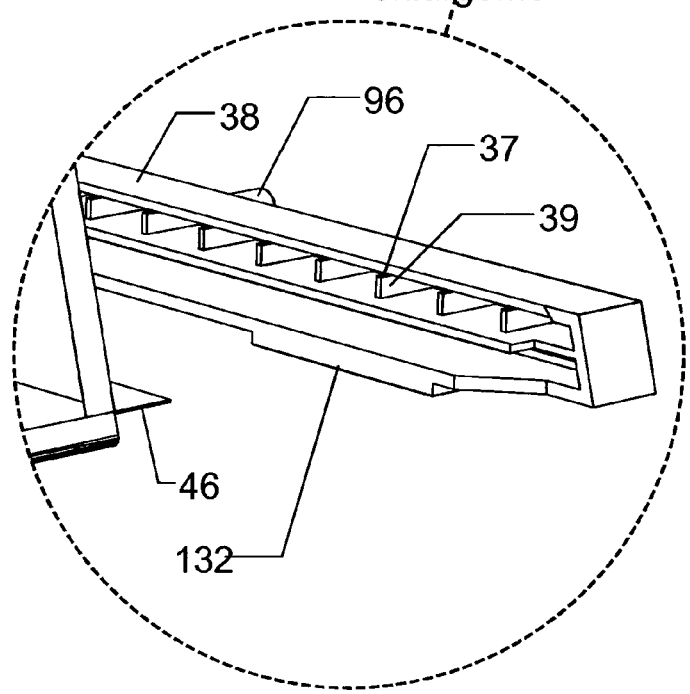
enlargement

ENCLOSED ROTISSERIE WITH DETACHABLE ELECTRONIC COMPONENTS

CROSS-REFERENCE

This application is a continuation-in-part application of U.S. patent application Ser. No. 10/286,680 filed Nov. 2, 2002, which is a continuation application of U.S. patent application Ser. No. 09/880,673 filed Jun. 13, 2001 (now abandoned), which is a continuation of U.S. patent application Ser. No. 09/662,308, filed Sep. 15, 2000 (now U.S. Pat. No. 6,393,972), which is a continuation of U.S. patent application Ser. No. 09/436,614, filed Nov. 9, 1999 (now U.S. Pat. No. 6,173,645), which is a continuation of U.S. patent application Ser. No. 09/217,944, filed Dec. 21, 1998 (now U.S. Pat. No. 6,170,390).

FIELD OF THE INVENTION

The present inventions are directed toward appliances and, in particular, toward enclosed horizontal rotisserie countertop cooking devices having detachable electronic components.

BACKGROUND OF INVENTION

Cooking appliances provide consumers with tremendous benefits, including safer cooking procedures, increased convenience, and higher quality food. Many types of cooking appliances exist, including rotisseries, toaster ovens, ice cream makers, cookers, deep fryers, griddles, food processors, blenders, steamers, coffee makers, juice makers, grinders, among others.

Rotisserie cooking, in particular, is considered to be among the healthiest ways of preparing foods. Unlike other cooking methods, unhealthy grease and oil are allowed to drip off all sides of the food while it is being cooked. Other cooking methods allow grease and oil to settle into the top of the foods. Rotisserie cooking is also among one of the tastiest methods of cooking. Contrasted with other cooking methods, moisture while cooking doesn't settle to the bottom of the food, allowing the top to dry out. Taste is enhanced too because foods, and particularly meats, self-baste during the rotisserie cooking process. This self basting both seals in flavor and moisture, and simultaneously adds flavor to the outside of the food being cooked. Rotisserie foods require little or no seasonings to add flavor for reasons just mentioned. Finally, unlike many other methods of cooking, rotisserie cooking requires no, or virtually no, attention during the actual cooking process.

Among the most popular rotisseries in today's U.S. marketplace are those fitted to outdoor grills. Generally these have a gear reduced electric motor powering a single rod horizontal spit over a charcoal or gas fired heat source, with either an open-air or enclosed oven design. These units have their shortcomings, particularly during inclement weather, or when it is very hot or very cold, or when flies, ants or yellow jackets are around, or when it's windy, etc.

Prior art rotisserie designs are often inherently expensive to manufacture, unnecessarily complicated, difficult to use, fail to optimize space use, and/or difficult to clean. For example, U.S. Pat. Nos. 2,754,401, 2,831,954, 5,801,362 and 6,363,841 each use an essentially rectangular oven housing to enclose a rotisserie spit. Whereas these devices are somewhat space efficient, each widens the entire housing in order to accommodate the operating controls, and each shows at least two containment walls between their oven interiors and their outside faces on at least a portion of their cabinetry. Several other designs in US patent prior art attempt to achieve aesthetic pleasantness at the expense of space efficiency. As examples, U.S. Pat. Nos. 6,076,453 and 6,186,054 both show devices with a more curved plan view which fails to maximize countertop space use.

Prior art rotisseries usually have no internal light and no window or only a small window to view the food while it's being cooked. Such construction makes it difficult to check cooking progress. Moreover, opening the doors on these enclosed oven units generally lets out the hot cooking air, which, in turn, slows cooking and makes gauging cooking times even more difficult. Cooking results can therefore be unpredictable on these units, particularly on charcoal fired models due to variances in the heat source and outside air. Furthermore, the exteriors of these units generally get very hot and thus present safety considerations, which may require warning labels and extra caution on the part of the users.

Charcoal grills have additional inconveniences of having to start and maintain their hot coals. Starting charcoal fires or using bottled or other forms of gas may also present safety hazards, and hot grease dripping onto glowing charcoal, gas flames or onto hot electric coils may flare up. In addition, the single rod spits used on most of these rotisseries may be difficult to use and may not do an adequate job of supporting the food being cooked.

Another popular rotisserie type in the U.S. market is the enclosed countertop rotisserie having a vertically rotating spit. These typically have limited capacity, such as being able to cook only a chicken weighing five pounds or less. Such capacity may be unsuitable for families or for use at parties. Also, many of these units have small door openings and hot oven walls which make it difficult to insert and remove food, and usually when the door is opened it swings to one side where it is still in the way of loading or unloading foods, especially when the door is hot. Because these units rotate foods about a vertical axis, the top half of the food usually becomes dry even when the chef takes the inconvenient trouble to regularly baste. Furthermore, there are usually no provisions for putting smaller foods closer to the heat source where they might cook faster. Finally, these units have very hot exteriors, which may present safety hazards requiring warning labels and extra user care.

Another rotisserie type becoming popular in the U.S. is the countertop toaster oven with horizontal rotisserie spit. These typically have capacity limitations similar to those found on countertop rotisseries with vertical spits. They combine these limitations with the difficulty of use of outdoor rotisseries with their inadequate, awkward and limited use single rod spits.

Many of these countertop toaster ovens also present fire safety and smoke hazards from heat rods, which are directly next to grease drip pans. They also have tight door openings and small oven cavities which make it difficult to insert and remove foods, particularly when the units are hot. Furthermore, many of these units have thermostatically controlled heating elements, which cycle on and off and thus lengthen rotisserie cooking time. Rotisseries are most efficient when they have a constant radiant heat source. A constant source of heat, however, requires a method of efficiently removing heat from the cooking cavity which these units typically don't posses. Without efficiently removing heat, rotisserie oven interiors may overheat.

These units also typically have small door windows and little or no interior lighting, which makes it difficult to view cooking progress. Their spits are also very difficult to maneuver into place and pull out of the oven, both due to the small oven cavities and because of poor mounting design. This is particularly true when the oven is hot. In addition, when the doors open on these units, they generally swing down or swing to one side where they are in the way of loading and unloading food, particularly when the doors are hot. The conventional rotisserie also has doors that are generally complicated in construction, typically having a small piece of glass framed with several pieces of metal, creating an assembly, which is then permanently hinged to the cooking cavity. The units also have no means to bring smaller foods closer to the heat source where they might cook faster.

Substantially all of the rotisseries on the market today have several shortcomings in common. They are usually limited as to what they can cook. Small foods or foods that can't be skewered may not be mountable for cooking. Even where baskets that fit on the spits are available, they are difficult to use and generally do a poor job of holding some types of food. They occupy a large amount of space. This is particularly detrimental for indoor units where kitchen space may be at a premium. Few current rotisseries adequately display the food being cooked, which, with rotisserie cooking, can be a taste tempting show in itself.

Cleanup is also very difficult on most units. This is because few components can be removed for cleaning, and areas, which require a lot of cleaning, may be difficult to access, as an example, behind the heating elements. Other cooking appliances have similar disadvantages. Their electronic components and/or heating elements can not be readily detached from the structures which are in contact with food, thereby making them difficult to clean safely and not capable of being subjected to dishwashers. In addition to rotisseries, toaster ovens, for example, have their heating elements and electronics integrally formed with the structure encapsulating the heating area.

It would be preferred to have a tasty, healthy food preparation method also be easy to use and clean. While some of the aforementioned cooking appliances have food compartments in the form of cups or containers that are easily removed from the rest of the device and easy to clean, certain devices, particularly rotisseries and toaster ovens, have heating elements and other electronic components that are integrally formed with the enclosure exposed to food, thereby making the devices difficult to clean and use.

BRIEF DESCRIPTION OF THE PREFERRED EMBODIMENT

The present invention is directed toward cooking appliances that have electronic components, which can be safely detached from enclosures surrounding and/or in contact with food.

In one embodiment, the present invention comprises a countertop resting box-like enclosure housing a safety rear mounted heating element and a power rotated dual rod spit assembly. The gear driven spit assembly may be easily inserted and removed straight into and out of the enclosure without need for angling or coupling the assembly to a power drive socket. The spit assembly may also be mounted at various distances from the heating element to decrease cooking times.

The open front of the enclosure is from time to time covered by an inclined glass panel door which may be opened in various ways to facilitate food insertion into and removal from the enclosure, and which may be easily removed for cleaning or other purposes. The embodiment's design makes efficient use of valuable counter space by recessing back and raising off the countertop its controls.

A contained light as well as room light emitted through the inclined glass door illuminate the enclosure's interior to make the rotisserie cooking into a taste tempting show. Two countertop supported sizes for the embodiment are suggested, one for larger families and entertaining, and the other for small families and singles.

Cooking times are decreased and manufacture simplified by the embodiment heating element remaining on constantly during the cooking process. Maintenance is minimized by various embodiment parts being removable for cleaning including a cleaning shield located behind the heating element, the glass door, and a drip pan.

A variety of foods may be cooked using the spit and accessories that attach to the spit. Such accessories include wire baskets and a rotating stir fryer. Foods may be cooked on top of the embodiment as well using an included warming tray and an inserted steaming tray with cover. Grease-tight rotisserie/barbecue gloves make food handling easier and safer, as can also be said for a spit support platform which supports the spit assembly for food mounting and carving. Self-rotating kabob rods cook kabobs on all sides evenly and allow for increasing rotisserie capacity by increasing the length of rotating rods available for rotisserie food mounting.

In another embodiment, the present invention is directed toward horizontal spit countertop rotisserie ovens, or other devices including those described herein, having features found within this specification, including, but not limited to: a removable side mounted control box; single wall oven cabinet construction; single wall oven cabinet construction with tabs protruding from the lower side edges of the oven cabinet which mount feet to support the cabinet; one or more rigid heat coils structurally connected to the removable control box; a heat coil, supported by a bracket within the oven cabinet which both allows the heat coil to be slid in and out of the oven cabinet and allows for expansion of the heat coil when the coil is energized; a light bulb integrated with the removable control box so that the bulb's globe protrudes into the interior of the oven cabinet when the control box is mounted on the oven cabinet; a drive mechanism integrated into the removable control box which allows the control box to be easily removed from the oven cabinet; a drip pan located below the spit, which has its liquid catching reservoir recessed in from the pan's perimeter; a drip pan cover with an array of small holes recessed into its surface; a spit assembly, whose axis of rotation is located closer to a glass view port located on the oven cabinet's exterior than to the heater located within the oven cabinet; a spit assembly, whose axis of rotation is located closer to the oven cabinet's loading door than to the top, bottom, back and heat coil within the oven cabinet; and being capable of using specific foods and eating schedule, to help people lose weight.

Examples below are given by way of illustration, and are not intended in any way to limit the direct or implied teachings contained herein.

Having the control box and related mechanical components removable from the oven cabinet may have several advantages. Separated from the control box, the cabinet may be easily washed in a sink, or in a dishwasher. It may allow selling end users replacement or duplicate parts easier. For example, end users may purchase more than one control box for less than an entirely new cooking appliance unit. As an example after an end user has purchased a rotisserie with a control box containing a mechanical timer, the same end user may be resold a control box with an electronic timer having additional features such as warming food after the initial rotisserie cooking is completed. This permits the unit functionality to be readily, though economically, upgraded.

The detachable electronic components may allow selling the end user more than one enclosure or oven cabinet. As an example, end users might be sold an oven cabinet, which is styled differently than their original cabinet or which is a different color to better match their kitchen. This permits the unit aesthetics to be readily, though economically, modified, making it easy to change models and/or styles by mixing and matching different control boxes with different oven cabinets.

The present invention makes servicing simpler by allowing only the control box, or only the oven cabinet, to be returned for service in the event of damage or breakdown. The present invention makes manufacturing simpler and less expensive by allowing the relatively small but manufacturing labor intensive control box to be made overseas where quality labor is relatively inexpensive, while allowing the large, relatively simple to manufacture oven cabinet to be made domestically where shipping costs are lowest.

The present invention includes an oven cabinet construction where there is only one wall between the interior of an oven cooking chamber and the exterior of the oven, referred to herein as single wall oven cabinet construction. Single wall oven cabinet construction has several advantages. It allows the cleaning of the oven cabinet without concern for water or other cleaning materials being caught between dual containment oven walls. It provides greater efficiency in using countertop space due to the elimination of space taken up by double wall construction. It provides a cleaner oven cabinet with fewer spaces for grease and other food components to get caught in, including spaces between dual containment oven walls. Single wall oven cabinet construction yields a less expensive construction, due to a lower part count and simpler manufacturing details. Furthermore, it provides a lighter weight construction due to the use of less material. Lighter weight reduces manufacturing costs, and makes it easier for the end user to lift and move the oven cabinet and assembled rotisserie. Lighter weight also reduces shipping and handling costs.

Having a single wall oven cabinet construction with tabs protruding from the lower side edges of the oven cabinet, which mount feet to support the cabinet has several advantages including: lower manufacturing costs due to the reduction of the need for high temperature materials in the construction of cabinet support feet and greater oven cabinet stability due to the wider side to side spacing between the support feet, which is facilitated by the outward facing cabinet support mounting tabs.

Having a rigid heat coil structurally connected to the removable control box, provides several advantages, including: providing a means to help structurally connect the removable control box to the oven cabinet; providing a means to remove the heat coil from the oven cabinet for cleaning or other purposes; and simplifying manufacture by centralizing mechanical components within the control box.

Having a heat coil, supported centrally by a bracket within the oven cabinet which both allows the heat coil to be slid in and out of the oven cabinet and allows for expansion of the heat coil when the coil is energized has several advantages including: providing support for the heat coil within the oven cabinet to prevent distortion or bending of the heat coil due to accidental impact or other reasons and preventing distortion of the heat coil due to its expansion, while it is being energized.

Having a light bulb integrated with the removable control box so that the bulb's globe protrudes into the interior of the oven cabinet, provides advantages including: simplifying construction by eliminating the need for a lens to cover the light's globe; simplifying construction by centralizing all mechanical components within the control box; providing more light within the oven cavity due to the elimination of light lost from a lens covering the light; helping highlight the rotisserie cooking process; making minimal maintenance even easier by eliminating the need to remove a lens cover in order to replace the light bulb; and lowering construction costs by eliminating a lens cover.

The drive mechanism integrated into the removable control box which allows the control box to be easily removed from the oven cabinet, provides advantages including: simplifying construction by centralizing all mechanical components within the control box and allowing the drive mechanism to be upgraded to a faster or more powerful drive mechanism simply by trading one control box for another.

The drip pan located below the spit which has its liquid catching reservoir recessed in from the pan's perimeter, provides advantages which include: reducing the risk of fire by locating the reservoir which contains combustible greases and liquids further from the heat coil and reducing undesirable odors caused by heated greases and oils by spacing the reservoir away from the heat coil so that the greases and oils remain cooler and produce fewer undesirable orders.

Providing drip pan cover with an array of small holes recessed into its top surface provides advantages including: reducing the risk of fire by lowering oxygen circulation within the reservoir and reducing odors by reducing air circulation from within the reservoir. Providing a spit assembly, whose axis of rotation is located closer to a glass view port disposed on the oven cabinet's exterior, than to the heat coil located within the oven cabinet, provides advantages including providing additional safety by being able to view foods touching the glass view port during rotisserie rotation before these foods have a chance to dangerously touch, and possibly become lodged on, the rotisserie's heat coil.

Having a spit assembly whose axis of rotation is located closer to the oven cabinet's door than to the oven cabinet's perimeter walls and heat coil, provides advantages including additional safety by the foods being rotisserie cooked safely pressing against the oven cabinet's door, potentially producing sound and/or door movement, before the foods can dangerously touch the oven cabinet's perimeter walls or the cooking heat source.

In one embodiment, the present invention is directed toward a horizontal spit rotisserie oven comprising a cabinet having a plurality of side walls, each having an interior face and exterior face, and resting on a horizontal surface; a spit assembly that can be positioned within the cabinet; and a control box comprising an activation switch and a spit assembly drive mechanism, wherein the control box is attached to a cooking heating member, wherein the control box can be mounted on the exterior of one of the side walls of the cabinet and wherein the control box and the cooking heating member can be manually removed without use of tools from mounting on the cabinet.

Optionally, when the control box is mounted on the exterior of one of the side walls of the cabinet, the cooking heating member and the spit drive mechanism driving the spit are positioned within the cabinet. The side walls of the cabinet each have only a single panel between their interior and exterior faces. The cabinet has an opening through which food is loaded into the cabinet, and the opening is covered by a door having an interior and exterior face wherein the door has only a single panel between its interior and exterior faces. The cabinet has an opening through which food is loaded into the oven cabinet, and the opening is covered by a door and the door can slide under the oven cabinet and the door can be lowered below the horizontal surface on which the rotisserie rests.

Optionally, the control box is removed from the cabinet by pulling the control box generally orthogonally away from the side wall on which the control box is mounted. The cooking heating member is at least one of an electric, resistive, or tubular heating element. The activation switch is a countdown timer which activates and terminates operation of the rotisserie. The activation switch is a timer which activates a food warming feature after cooking.

Optionally, the spit drive mechanism is a gear reduced electric motor. The control box has a light which illuminates an interior of the cabinet when the control box is mounted on the cabinet. A globe of the light protrudes into the cabinet. The cabinet comprises side rails which support it above a horizontal surface. The cabinet has a plurality of feet wherein the feet attach to the side walls using tabs extending away from the side walls.

Optionally, the cooking heating member helps structurally support the control box to be mounted to the cabinet. The cabinet mounts a food warming tray. When the control box is mounted on the cabinet there is an air gap between an outside face of the cabinet and an inside face of the control box. The control box is mounted to the cabinet by means of a manually activated latch. The cabinet has an access door. An axis of the spit is closer to the door than to the cooking heating member. The cabinet has a transparent window. A frontal portion of the cabinet is inclined.

In another embodiment, the present invention is directed toward a toaster having a substantial number of above described traits. Specifically, the toaster oven comprises an enclosure with a plurality of tracks for receiving a support structure, such as a grate or pan. It further comprises a removable side mounted control box; single wall oven cabinet construction; single wall oven cabinet construction with tabs protruding from the lower side edges of the oven cabinet which mount feet to support the cabinet; one or more rigid heat coils structurally connected to the removable control box; a heat coil, supported by a bracket within the oven cabinet which both allows the heat coil to be slid in and out of the oven cabinet and allows for expansion of the heat coil when the coil is energized; and a light bulb integrated with the removable control box so that the bulb's globe protrudes into the interior of the oven cabinet when the control box is mounted on the oven cabinet. These features have advantages that are substantially similar to the advantages described above.

DESCRIPTION OF FIGURES

The present invention will be described in greater detail with reference to following drawings:

FIG. 25 is a forward, left hand, upper perspective of oven cabinet, 20, glass door 40, left support rail 36, and right support rail 38; with both support rails 36 38 and door 40 detached from oven cabinet 20;

DETAILED DESCRIPTION OF THE PRESENT INVENTION

Figure 1:
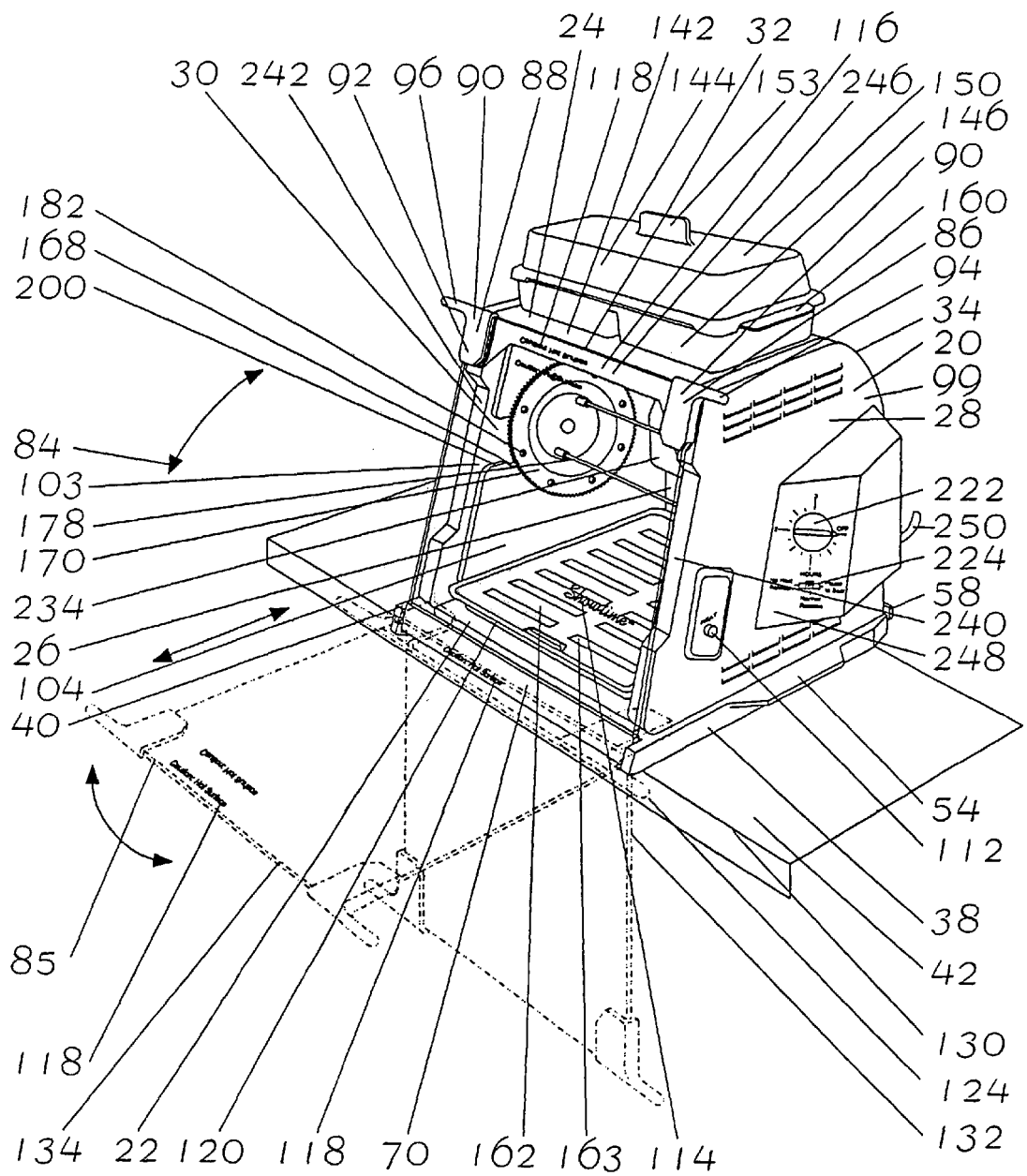
FIG. 1 is a perspective view of one embodiment of the present inventions showing phantom lines for various glass door positions.

Referring to FIGS. 1–19, one embodiment utilizing the present inventions comprises a metal enclosure 20 including an essentially horizontal metal floor 22 and metal roof 24, a generally vertical metal back 26, and two essentially vertical side walls including a double paneled right side wall 28 and a double paneled left side wall 30, and an inclined glass front door 32. A curved metal section 34 containing louver vents 238 joins the generally vertical metal back 26 to the essentially horizontal metal roof 24.

Two horizontal front-to-back running rod-like side rails 38 40, one located below the double paneled right side wall 28 and one disposed below the double paneled left side wall 30, support the metal enclosure 20 and raise it off a countertop 42 or flat surface on which it might rest. Four rubber feet 44 46 48 located on the bottom 52 of the side rails 38 40 keep the rails 38 40 from scratching countertops 42 and help prevent the embodiment from skidding.

The side rails 38 40 have lifting handles 54 56 projecting from their sides, one 54 projecting rightward from the right side rail 38, and one 56 projecting leftward from the left side rail 40. These lifting handles 54 56 allow the embodiment to be lifted and carried.

The side rails 38 40 also incorporate two cord winding projections 58 60 extending rearward, one 58 from the back of the right side rail 38 and one 60 from the back of the left side rail 40. These cord winding projections 58 60 serve to wrap the cord for shortening its length, or for storing the cord while carrying the embodiment or during storage, or for other reasons. The cord winding projections 58 60 also keep the back 26 of the embodiment from directly contacting a vertical back wall.

The glass front door 32 is essentially a single flat panel of glass 64 with a round steel axle rod 66 held along its lower edge 68 by a "U" shaped channel 70 which is silicone glued to both the lower edge 68 of the panel of glass 64 and the axle rod. This axle rod extends outward 72 74 from both lower corners 76 78 of the panel of glass 64.

The rails 38 40 provide tracks 81 83 which engage and support the two ends 80 82 of the round steel axle rod 66 which extend horizontally from each lower corner of the lower edge 68 of the glass front door 32, and this engagement with these tracks 81 83 controls movement of the glass front door 32 to pivot downward 84 from the door's 32 closed position 85 and to slide under 87 the metal enclosure 20.

In the upper right corner 86 of the panel of glass 64 and the upper left corner 88, there are two handles 90 92, one for each corner 86 88, which have rod-like grips 94 96 which extend horizontally outward 72 74 in opposite directions. By making the grips extend horizontally instead of vertically, the overall height of the embodiment is minimized. This may be particularly advantageous in placing the embodiment below over counter cabinets or other overhead objects. The handle geometry is such that either handle 90 92 or both handles 90 92 may be easily used to grip and open or close the glass door 32, or slide it 32 under 87 the metal enclosure 20 or hold the door for other reasons such as removal.

The inclined glass door 32 may be held closed 85 by gravity alone, requiring no other latching mechanism. Thus, when compared to cooking enclosures having latches, this preferred embodiment door construction generally: reduces required assembly parts, simplifies manufacturing, makes manufacturing tolerances wider, and makes user operation easier and more reliable.

When compared to a vertical glass door, the inclined glass door 32 also typically permits more ambient light to enter the cooking cavity and allows viewing of food being cooked from a broader range of vertical angles, thus making viewing of the food being cooked easier and more convenient. This in turn makes it easier to determine cooking progress and turns cooking of rotisserie food into an entertaining and taste tantalizing show.

A light 98 mounted between the panels 99 101 of the double paneled right side wall 28 introduces additional light into the cooking cavity 104 and further adds to the food viewing advantages just stated. This light 98 has a frosted translucent glass cover 100 which is in a contiguous plane with the interior wall 101 of the double paneled right side wall 28. This cover 100 separates the light bulb 98 from the cooking cavity 104. The light bulb 98 has a shiny metal reflector 106 behind it which backs onto the outside wall 99 of the double paneled right side wall 28. The light 98 is wired to come on any time the embodiment's heat coil 110 is on.

A translucent red colored lens 112 penetrates the reflector 106 located behind the light bulb 98 and penetrates the outside panel 99 of the double paneled right side wall 28. Light shines through this red colored lens from the light 98 whenever the light bulb 98 and thus the heat coil 110 is on. This red colored lens 112 is visible on the outside of the right side wall 99 and gives a clear visible indication of when the heat coil 110 is operating. Using a single light 98 to both illuminate the interior of the cooking cavity 104, as well as give indication on the outside of the embodiment of when the heat coil 110 is operating, cuts down on required parts, simplifies embodiment construction, and increases embodiment reliability. Such a operation warning light may also meet the requirements for an "on" indicator as set by safety regulatory bodies such as Underwriters Laboratories. The lens color may also be changed, as an example to green, to match foreign safety standards such as those established by TUV in Germany.

The glass door 32 is silk printed 114 118 with trademark, decoration and safety markings. Such markings 114 may be printed in translucent inks which may be back lit by illumination from the light 98 mounted into the double paneled right side wall 28. Such glowing back lit markings 114 may be thus made to be much more visible and dramatic, especially in dark rooms, than similar common unlit markings.

Markings 114 on the panel of glass 64 may by placed to block glare from light 98 mounted into the double paneled right side wall 28 from shining into viewer's eyes thus making the embodiment more pleasant to look at due to less emitted light glare.

Markings 118 on the door 32 may match the color of the enclosure door 32 frame 116 which backs portions of the glass door 32 when the door 32 is closed 85. Such markings 118 when viewed against the background of the like colored enclosure frame 116 when the door 32 is closed 85, may be virtually invisible. When the glass door 32 is lowered 84, however, the markings 118 may become very visible. Thus a warning marking such as "Caution—Hot Surface" 118 may be printed to appear mirror imaged and upside down over when it is virtually invisible while the door 32 is closed 85 and the marking 118 is displayed against the like colored frame 116 background. When the door 32 is lowered 84 and opened 134 87, however, the marking 118 may become clearly visible and appear in proper orientation, that is right side up and not mirror imaged, reading correctly "Caution—Hot Surface".

Any inclination past vertical may be used for the glass front door 32, but an angle between five and twenty-five degrees has been found to be most advantageous for producing satisfactory door latching and food viewing, as well as for conserving valuable countertop space. Too flat a glass angle stretches out the bottom of the enclosure and consumes an unacceptable amount of countertop space. Too steep a glass angle won't allow proper door latching and provides a poor view of foods being cooked. Inclining the front of the enclosure increases the enclosure's footprint on a countertop and thus increases its stability and decreases any tendency to tip over or be accidentally moved.

This embodiment may be constructed at any scale. However, two sizes have been found to be particularly advantageous. For large families, or for parties and entertaining, an enclosure with cooking cavity 104 interior dimensions between eleven and thirteen inches wide side to side, ten to twelve inches from the cooking cavity ceiling 142 to the top of the drip pan 120, as explained later herein, and ten to twelve inches deep from the inside of the glass door 32 to the front of the heating rods 110, as explained later, as measured horizontally midway between the ceiling 142 and the top of the drip pan 120. When constructed at this scale, the embodiment can cook a fifteen pound turkey, or two six pound chickens. Fifteen pound turkeys are considered among the largest turkeys commonly sold around Thanksgiving and Christmas. And six pound chickens are among the largest commonly sold popular chickens sold in US supermarkets. Thus such a size meets the needs of most large families or people who entertain.

A second advantageous size meets the needs of smaller families, people who live alone, or people with very small kitchens. For these markets, a cooking cavity 104 with interior dimensions between nine and eleven inches wide, seven to nine inches from the cooking cavity ceiling to the top of the drip pan, and seven to nine inches deep from the inside of the glass door 32 to the front of the heating rods is particularly advantageous. When constructed at this scale, the embodiment can cook a six pound chicken, or two three pound chickens. Three pound chickens are among the smallest commonly sold chickens. This size thus meets the needs of most smaller families or people who live alone.

The inclined glass front door 32 may rotate downward 84 and following such rotation to an essentially horizontal position 85, slide under 87 the metal enclosure 20 with glass front door's 32 axles 80 82 engaging into the tracks 81 83 in the two front-to-back side rails 38 40. In this slid-under position 87, the top 126 of the glass door 32 is held off the countertop 42 by flat horizontal ribs 91 93 in the side rails 38 40. Also in the slid-under position 87, the glass door 32 is out of the way of foods being loaded into or removed from the cooking cavity 104. This is particularly advantageous when the door 32 is hot and user contact with it might cause burns.

Alternatively, the enclosure 20 may be placed on the edge 30 of a countertop 42 and the glass door 32 may be rotated below the countertop 42 level 132 where it will also be out of the way of food loading and unloading.

As a third alternative, the glass door 32 may be opened 134 onto a countertop by being rotated down 84 from its closed position 85 to the countertop.

The glass front door 32 is also removable for cleaning, food loading, or other purposes.

Figure 3:
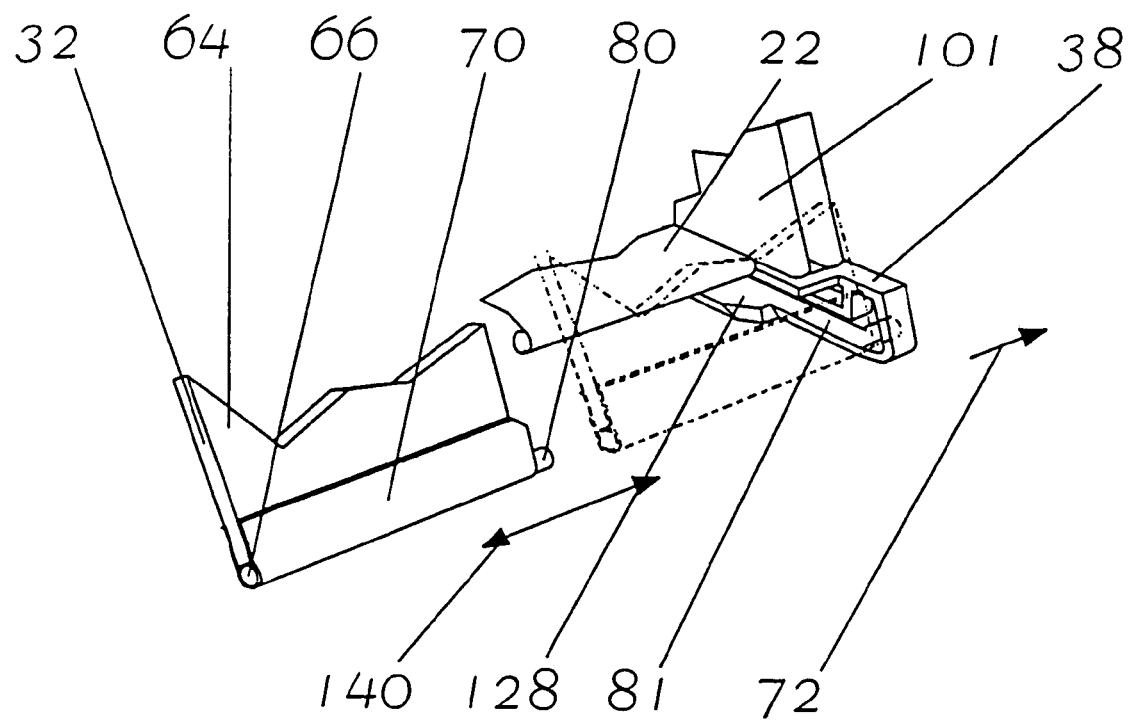
FIG. 3 is a broken out perspective view of the front lower right corner of one embodiment shown in FIG. 1 showing in phantom lines how the glass door is mounted.
Figure 4:
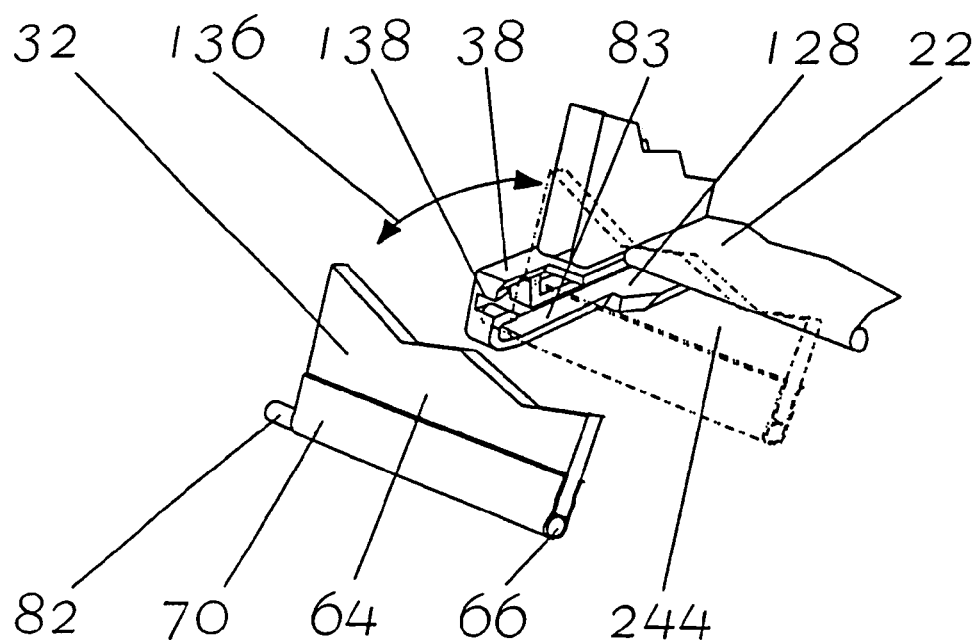
FIG. 4 is a broken out perspective view of the front lower left corner of one embodiment shown in FIG. 1 showing in phantom lines how the glass door is mounted.

As shown in FIGS. 3 and 4, this removal is accomplished by moving the door's 32 left axle 82 out of engagement with the track 83 in the left side rail 40 by sliding the axle 82 through a slot 138 located in the front of the left side rail 40. After this, the right axle 80 is pulled out of engagement with the track 81 in the right side rail 38 by moving the glass door 32 and the attached right axle 80 to the left 140, away from the right rail 38. Reinstalling the glass door 32 is done by reversing the above procedure.

Several advantages come from using what is essentially a single panel of glass 64 for the front door 32. First, unlike most other framed glass constructions, the door 32 may be washed in a dishwasher, or sink, or immersed in liquid.

Second, when compared to doors which have framed glass, construction is generally: simpler, has fewer parts, is less expensive, and is lighter in weight for comparable transparent viewing area. Appearance is also typically cleaner. And the viewing area is unsurpassed compared to most other constructions.

On top 142 of the metal enclosure 20 may rest a warming/steaming tray unit 144 comprising a lower heating pan 146, an intermediate steaming tray 148 with holes 149 in its floor which rests down into the lower heating pan 146, and a warming tray lid 150 which caps and encloses both the lower heating pan 146 and the intermediate steaming tray 148.

This unit is supported by four frustum conical feet 152 projecting from near each of the four corners of the bottom of the lower heating pan 146, each of the feet 152 which rests into its own two level inverted wedding cake shaped support indention 154 located near each of the corners of the roof 24 of the metal enclosure 20. Each foot 152 may rest in the lower most level of each such indention 154 allowing direct contact between the roof 24 of the metal enclosure 20 and the floor 156 of the lower heating pan 146; or each foot 152 may rest at the next level up of each indention 154 providing an air space 158 between the roof 24 of the metal enclosure 20 and the floor of the lower heating pan 146, thus lowering the temperature of the floor 156 of the lower heating pan 146 and the temperature inside the warming/steaming tray unit 144. Such temperature control may be used in warming, cooking or steaming foods or in any combination of these functions or other functions—i.e. steaming vegetables and then keeping them warm.

The warming/steaming tray unit 144 may be used to warm, cook or steam foods, either simultaneous with rotisserie cooking or independent of it. And it may perform these functions either with or without the intermediate steaming tray 148 in place, and either with or without the warming tray lid 150 in place.

Handles 160 on either side of the heating pan 146 make it easy to lift the entire warming/steaming tray unit 144, with or without the intermediate steaming tray 148, and with or without the warming tray lid 150 in place. As an extra measure of convenience, the placement of the warming/steaming tray feet 152 is symmetrical both front to back and side to side thus allowing the user to place it 144 on top of the metal enclosure 20 with a given heating pan handle 160 on the right side or on the left side of the metal enclosure 20.

Water may be placed in the lower heating pan 146 and the intermediate steaming tray 148 put in place to facilitate the steaming of vegetables or other foods.

Figure 12:
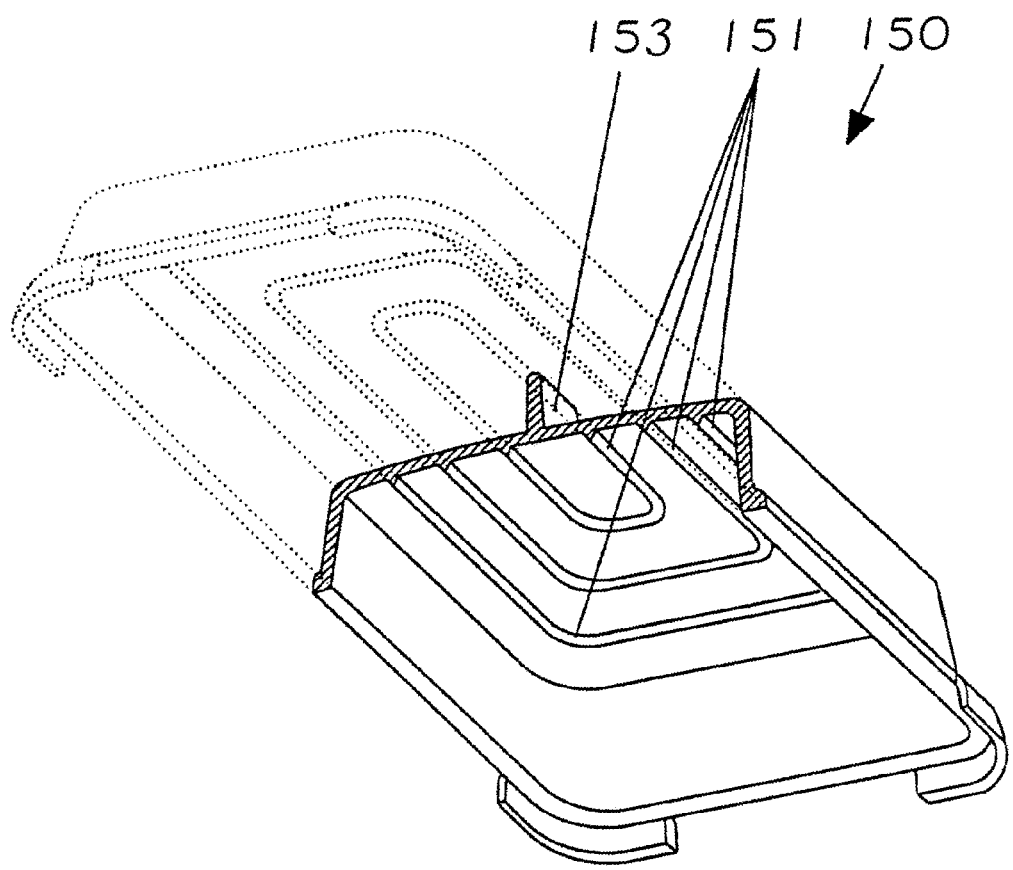
FIG. 12 is a sectioned perspective view taken from below of the lid used on the warming/steaming tray unit showing ribbing used to prevent uncontrolled dripping of condensed liquids.

When foods are being steamed or when moist foods are being heated in the warming/steaming tray unit 144, droplets of water generally condense on the warming tray lid 150. These droplets may present a safety hazard when the user lifts off the lid because the droplets may be hot and tend to run to the side of the lid 150 and drop onto the user when the lid is lifted and tilted. As shown in FIG. 12, to help prevent this from happening, the lid 150 has several concentric "V" shaped ribs 151 on the underside of its top surface. When the lid 150 is lifted and tilted, water droplets on this surface begin to run to the side of the lid 150. En route to the side of the lid 150, most of the water droplets cross the concentric "V" shaped ribs 151 and drop safely back into the intermediate steaming tray 148 or lower heating pan 146, thus preventing burns which might occur if the "V" shaped ribs 151 were not present and the hot water droplets dripped onto the embodiment user.

The warming tray lid 150 may be constructed of any of many suitable materials. It would be advantageous for it 150 to be translucent or transparent so cooking or steaming progress as well as the food being cooked could be observed without removing the lid 150. Glass or plastics such as polypropylene, polycarbonate, or Ultem™ from GE Plastics might be suitable for use in constructing the lid 150 as examples.

The warming tray lid 150 has a handle 153 in the center of its outside top surface to help in its use. This handle 153 is textured to help prevent slippage.

Within the metal enclosure 20, resting on its floor 22, is a drip pan 120 which mounts inside it, and is covered by, a grate cover 162. The drip pan 120 collects grease, oil, and liquid which come from the food being rotisserie cooked.

The grate cover 162 is a metal cover perforated with slots 163 which reduces splashing, and smoke, and flares from liquids from the rotisserie cooked foods splashing and hitting heat coils 110 and other hot surfaces, and diminishes the risk fire from hot grease and oil inside which has dripped from rotisserie cooking food into the drip pan 120 becoming overheated and igniting. The drip pan 120 and capping grate cover 162 may be pulled out 164 to facilitate their own cleaning, or the embodiment's interior cleaning, or for other purposes.

The grate cover 162 and underlying drip pan 120 both tend to get dirty during rotisserie cooking. In one embodiment, both are covered on their upper sides with a nonstick coating similar to that used in nonstick fry pans. Such coating greatly reduces cleanup, particularly on the grate cover 162 which may get grease, oil and residue dripped on it while simultaneously being exposed to high heat from the heat coil 110 which bakes the drippings on.

Figure 2:
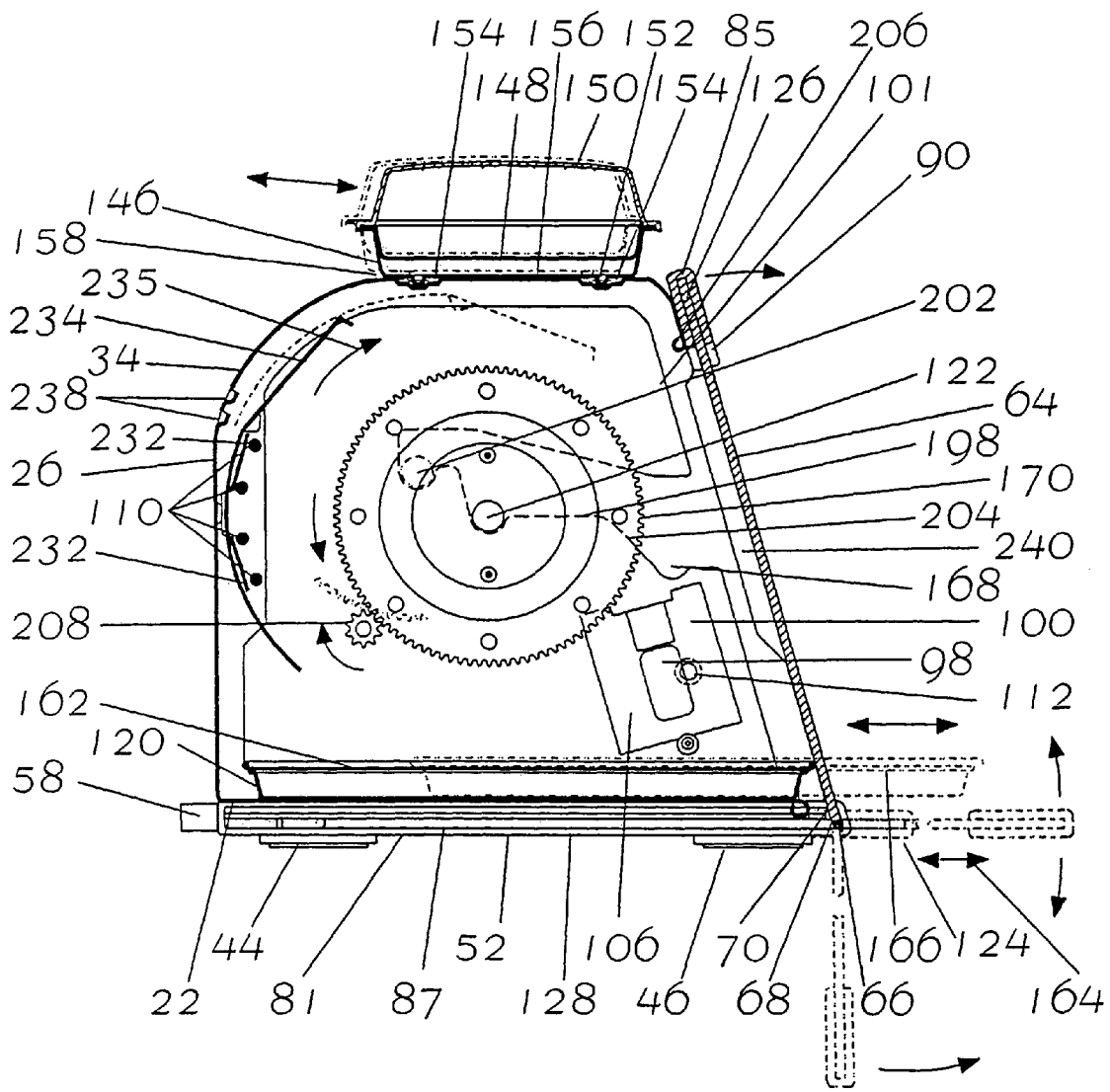
FIG. 2 is a section view of one embodiment shown in FIG. 1 as indicated in FIG. 8.

As shown in FIG. 2, the drip pan 120 may be pulled out part way 166 to prevent grease and oil from dripping onto counter tops or the glass front door 32 when food is being prepared for cooking in the spit track rest position 168, as explained later, or when food is being removed from the metal enclosure 20 after cooking.

Adding to user convenience, the grate cover 162 and drip pan 120 are each square, thus allowing the user to place the grate cover 162 in the drip pan 120 with any given corner of the grate cover 162 resting in any corner of the drip pan 120, and allowing the drip pan 120 to be placed in the metal enclosure 20 with any of its four corners resting in any corner of the metal enclosure 20.

Figure 11:
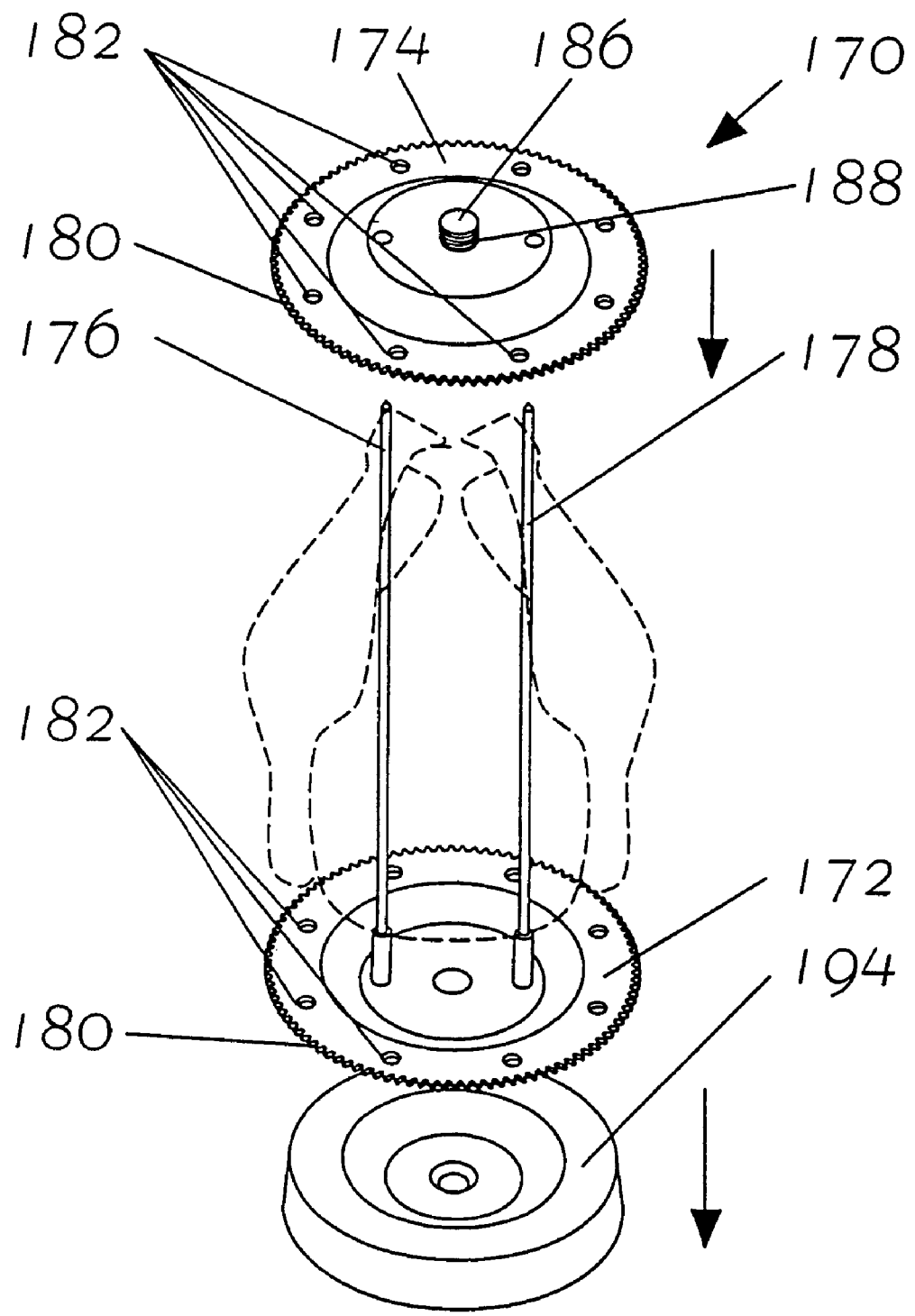
FIG. 11 is a perspective view of one embodiment of a spit assembly including a spit support platform.

As shown in FIG. 11, the embodiment's spit assembly 170 comprises a first metal spit plate 172 and a second metal spit plate 174. The first metal spit plate 172 has two sharpened cylindrical spit rods 176 178 attached at right angles to it. This first metal spit plate 172 is circular in outline with gear teeth 180 on its periphery and eight evenly spaced essentially round kabob holes 182 penetrating it just inside of and adjacent to the gear teeth 180. These kabob holes 182 are for supporting kebob rods 184 as explained later.

The center of the first metal plate 172 is frustum conically indented away from the projecting attached spit rods with a stub axle 186 projecting from the back bottom center of the plate's 172 frustum conical indent.

The stub axle 186 has circular grooves 188 cut into its cylindrical periphery. These grooves 188 help to prevent squeaking from the stub axles rubbing against their support tracks 198 200, described later, when the spit assembly 170 is rotating.

The second metal spit plate 174 is the mirror image of the first metal spit plate 172 except in place of the two attached spit rods 176 178 it has two short spit rod support tubes 192 attached. These tubes 192 receive, and hold by an overlapping friction fit, the sharpened ends of the two spit rods 176 178.

Foods are secured to the spit simply by running one or both of the two sharpened spit rods 176 178 through the food and then capping the rods by pushing the tubes 192 in the second spit plate 174 over the sharpened ends of the spit rods 176 178 projecting from the first spit plate 172. The food is then easily inserted into the embodiment as explained later.

The spit assembly 170 of this embodiment has several advantages over other available spit assemblies. It's compact and efficient in the use of space both inside and outside the cooking cavity 104. Because the spit assembly 170 is placed straight into the cooking cavity without angling or sliding into a drive socket, and because no drive forks or other space robbing mechanisms are required to hold even large and heavy pieces of food, almost the entire length of the spit rods 176 178, which run almost the full width of the cooking cavity 104 from the interior left oven wall 103 to the interior right oven wall 101, may be used to cook food. Other available spit rods, because they must be angled into place and slid into a drive socket are far less efficient in cooking space utilization.

Also, with the spit rods 176 178 on this embodiment there is no loss of space outside the cooking cavity 104 while foods are being loaded into or are being cooked in the cooking cavity 104. Other available spit rods have handles which project beyond their cooking enclosure and waste valuable counter space.

The spit assembly 170 on this embodiment, as explained earlier, with its dual spit rod 176 178 design, holds foods more firmly than other single spit rod designs. This advantage means that even heavy and large foods rotate solidly with the spit assembly 170 and don't become loose and flop or fall off the rods 176 178. On other spit rod designs, foods tend to shift while rotating and become loose and fall off the spit rods when this looseness bores a hole through the food being cooked.

The spit assembly 170 on this embodiment, as explained in more detail later herein, also integrates the mounting of self-rotating kabob rods into its design. Many other spit rod designs don't even plan for the mounting of non-rotating kabob rods.

And the spit assembly 170 on this embodiment, as also explained in more detail later herein, also allows for the easy and solid mounting of other cooking accessories such as cooking baskets 270. Other spit rods designs may make no such provisions.

The spit assembly 170 on this embodiment makes food mounting easy. The food is simply pushed onto the two relatively skinny and sharp spit rods 176 178, the second spit plate 174 slid into place, and the assembly, food and all, is placed directly into the cooking cavity 104. Other designs have thicker spit rods which are more difficult to shove through foods, and these designs may require hard to use accessories, such as mounting forks, to secure the foods from rotating independently of the spit while cooking, and placing foods into their cooking enclosures is more difficult, as explained in the next paragraph.

The spit assembly 170 on this embodiment is easy and intuitive to load into the cooking cavity 104. The assembly 170 is simply shoved directly into the cooking cavity without angling or having to align its end with and slide it into a drive socket. Other designs with drive sockets or other complicated drive means are far more difficult to use.

And foods are easy to unload from this embodiment's spit assembly 170. The assembly 170 is simply slide straight out of the cooking cavity 104, the second spit plate 174 easily removed, and the foods slid off the two rods 176 178. Other spit rods are difficult to remove from their cooking enclosures, some requiring the attachment of handles or lifting devices, and/or angling to uncouple drive mechanisms, and may require the additional steps of removal of accessories, such as food mounting forks.

The spit assembly 170 on this embodiment may be mounted closer to the cooking heat source 110 to speed cooking of smaller foods. Other spit rod designs don't offer this feature.

Cleaning of the spit rods 176 178 is enhanced by nonstick coating, similar to that used in nonstick fry pans, covering their surfaces which contact food during cooking. The ends of the spit rods may be left uncoated to facilitate the easy insertion of the rods 176 178 into the spit rod support tubes 192.

To facilitate food loading onto the spit assembly, a spit support base 194 is supplied with this embodiment. This spit support base 194 can hold the first spit plate 172 with its spit rods 176 178 projecting directly upward. In this position, foods can be easily loaded onto the spit rods 176 178 by lowering the foods onto the pointed ends of the rods 176 178.

In addition, the spit support base 194 can be used to help in serving. In this capacity, the support base 194, possibly after being placed on top of a plate, can hold foods skewered on the vertically disposed spit rods 176 178 while the food is being removed from the spit rods 176 178 or while the food is being carved.

Figure 18:
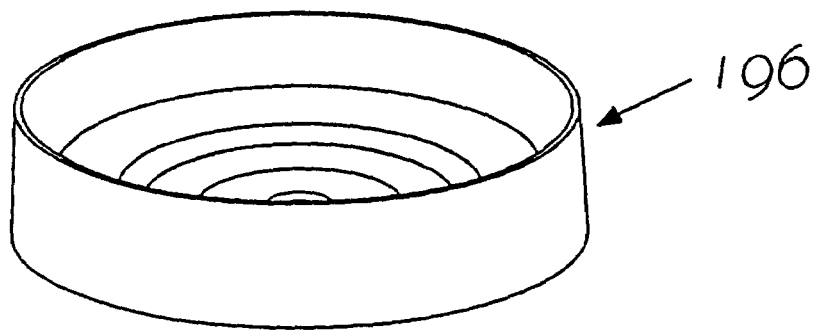
FIG. 18 is a perspective view of an alternative spit support platform.
Figure 19:
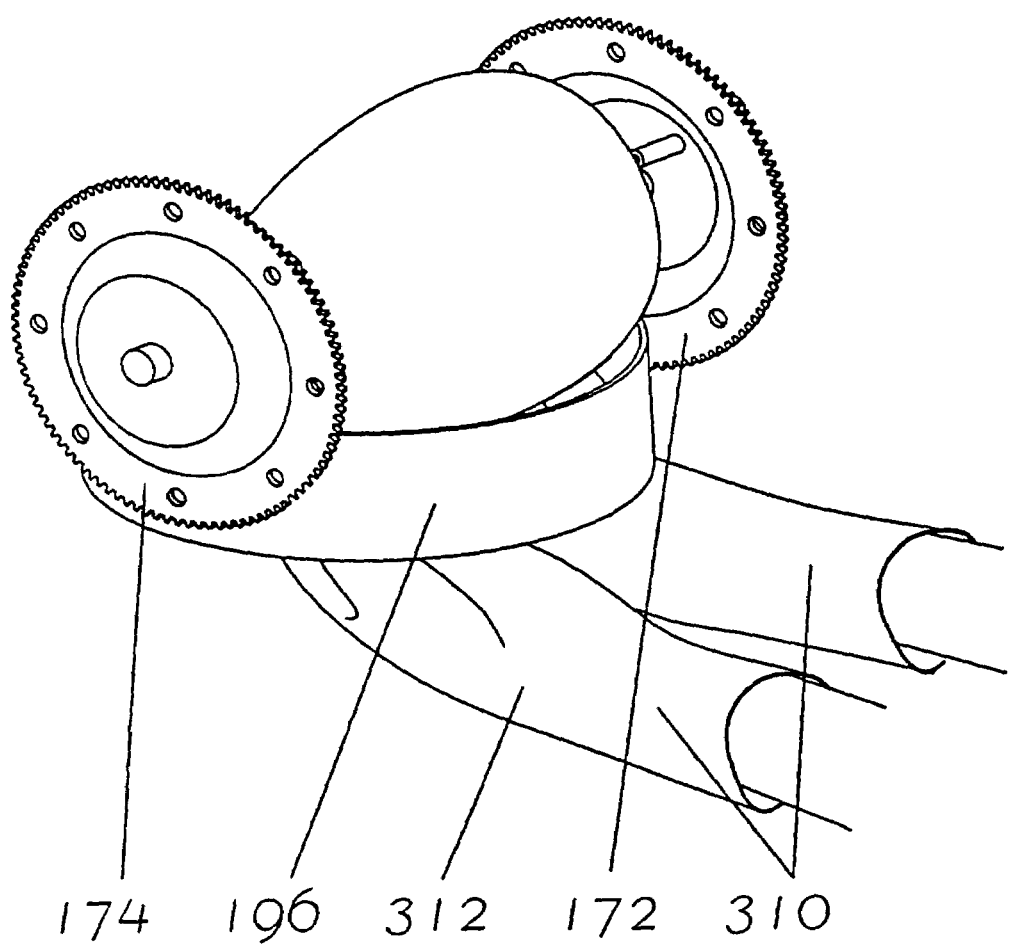
FIG. 19 shows the alternative spit support platform shown in FIG. 18 being used to support spit mounted food including use of gloves specifically designed for use in rotisseries.

A variant 196 of the spit support base 194 shown in FIGS. 18 and 19 expands the diameter of the support base 194 and allows the expanded diameter support base 196 to be used for all of the original 194 support base's functions plus it may be used as a serving plate for foods either not skewered or positioned on vertically supported spit rods 176 178. In addition, this larger variant 196 may eliminate any need for a plate when the support base is used as a serving platform holding the spit assembly 170 with its rods 176 178 disposed vertically.

As shown in FIG. 19, this spit support base variant 196 may also be used to help load and unload foods into and from the embodiment. Here, the support base 196 is placed under the food, and the support base 196 along with the food which it supports is lifted and moved to load the food into, or remove the food from, the enclosure 20.

Similarly, any dish shaped device might be used to help load and unload food to and from the enclosure 20. Such a shape is enhanced for this use if its perimeter is raised in a manner similar to that found on a soup bowl. Such a raised perimeter helps better support the foods being inserted into or removed from the enclosure 20 and more reliably holds liquids which may drip form such foods.

Either the original 194 or the variant 196 spit support base may be used to keep the spit assembly 170 from rolling on a countertop. Here, one of the spit plates 172 174 is placed into either an upright or inverted spit support base 194 196 resting on the countertop which thus prevents the spit assembly 170 from rolling by providing a stable indention, i.e. either the top face or bottom face of the support base 194 196 resting flat on the counter, in which one of the round spit plates 172 174 may rest.

Because there are two spit rods 176 178, foods may be penetrated by both rods 176 178 and thus the foods may be securely held and prevented from spinning independent of the spit assembly's 170 rotation, or prevented from dropping off the spit assembly 170. This compares to conventional single rod spit designs which tear holes in food because all the food's weight is supported on a single rod. Foods supported on such single rods may break loose and fail to turn as the spit turns because of inadequate tortional support engagement between the spit and the food. Foods may also fall off of single spit rods due to inadequate weight distribution and support, and because food movement not synchronized with the spit tends to tear holes in the foods which results in the foods tearing loose of the spit.

In addition, many single spit rods use clamped-on support forks positioned at each end of the spit rod supported food to compensate for food tearing and spinning independently of the spit assembly. These support forks frequently cause further problems by being difficult and inconvenient to install and remove as well as by shortening the length of food that can fit on the spit rods because of the space the support forks consume.

Once the spit 170 is fully assembled with the food skewered on the spit rods 176 178 and the tubes 192 projecting from the second metal spit plate slid over and capping the pointed ends of the spit rods 176 178 orthogonally projecting from the first metal spit plate 172, the spit assembly 170 is ready to be loaded into the embodiment enclosure 20.

The double paneled right side wall 28 and the double paneled left side wall 30 each contain an indented spit support track 198 200 on their interior panels 101 103. In this embodiment, the spit support track 200 on the interior panel 103 of the left double paneled side wall 30 is a mirror image of the spit support track 198 on the interior panel 101 of the right double paneled side wall 28.

These two spit support tracks 198 200 engage the stub axles 186 on the spit plates 172 174 when the spit assembly 170 is slid into the enclosure 20. The tracks 198 200 allow the spit assembly 170, including any spit accessories or any food thereon, to slide in and out of the enclosure 20. In addition, each track 198 200 has three axle positioning indents 168 122 202 which can support and hold the stub axles 186, and thus the spit assembly 170 in specific track 198 200 locations.

The first 168 of these axle positioning indents 168 122 202 is located on each track 198 200 adjacent to the door 32 opening. This indent 168 is referred to as the rest position and has several functions. First, when loading or unloading food from the embodiment, it may be first rested in this position 168 where a better grip may be obtained on the food or where it simply may be rested. It also serves as the first location to catch the spit assembly 170 as it's being loaded into the embodiment, and the last location to catch the spit assembly 170 before it leaves.

It also serves as an area to prepare food. As an example, in the rest position 168 foods can be centered on the spit rod, or ties to secure the wings and legs on a chicken might be readjusted, or barbecue sauce can be brushed on a chicken or baby back ribs, or seasonings applied to other foods.

When the rest position 168 is being used for food preparation, it may be advantageous to pull the drip pan 120 and attached grate cover 162 to their part way out position 166, as explained earlier, to keep foods and preparations from dripping or dropping onto the countertop or glass door.

The rest position 168 on each spit support track 198 200 is backed by an upwardly inclined track portion 204. This inclined track 204, combined with the large open front throat of the track and rest position 168, makes it easy to catch the spit assembly 170 and hold it in the rest position 168 when it's inserted into the enclosure 20, and it makes it obvious that the spit assembly 170 has been caught in the rest position 168 when it is being removed from the enclosure 20.

The tracks' 198 200 lowered front portions allows foods to duck under the enclosure's roof 24 front overhang 206, thus allowing larger foods to be loaded into the enclosure 20. The roof 24 front overhang 206 is necessary to give strength to the front of the roof 24, and without lowering the front of the track, the size of the foods which might be loaded into the enclosure 20 could be reduced and be smaller than the capacity of the enclosure 20 itself.

When the spit assembly 170 is being loaded into the enclosure 20, the assembly 170 first passes the rest position 168, then the inclined track portion 204, and next it comes to the low heat position 122 where its stub axles 186 can be engaged by gravity into a detent 168 122 202 and rotate. In the low heat position 122 the gear teeth 180 on the perimeter of the spit plate closest to the right side inner side wall 101 engage a motor driven drive gear 208 which penetrates into the enclosure through the right side inner side wall 101. The spit assembly 170 and any spit accessories or food thereon, may be rotated by this motor driven drive gear 208 in front of the embodiment's rear heating element 110, which is described later herein.

A quick and easy method of tying up loose parts of foods to be rotisserie cooked has been found using the spit support track 200, timer 222 and control switch 224. As an example wings and legs on chickens, ducks and turkeys can be easily secured using this method. First, the end of a length of string is secured to a wing, leg or other part of the fowl using a simple wrap or a slip knot as examples. In the alternative, the end of the string might be indirectly secured to the fowl by securing the string to the spit assembly 170. This might be done while the fowl is supported on the spit assembly 170 in the spit support track 200 rest position 168 or while the fowl is outside the embodiment. Next, the spit assemble is moved back to either the low heat 122 or high heat 202 spit support track 200 position. The control switch 224 is then turned to the "no heat rotation" 252 position and the timer turned on. As the fowl rotates, the string automatically wraps around the fowl's loose parts thus securing them. Once secured, the timer is turned off, the string is cut, and its end tied or wrapped or otherwise secured to the fowl on a wing, leg or other part. In the alternative again, the cut end of the string might be indirectly secured to the fowl by securing the end to the spit assembly 170.

The direction of spit assembly 170 rotation is important in producing satisfactory cooking results. The embodiment's heating element 110 is located half way up, and directly adjacent to, the back 26 wall of the enclosure 20. The drive gear 208 rotates the spit assembly 170 so food rotate 175 from the top of the enclosure 20 down to directly in front of the heating element 110 and then down to the bottom of the enclosure where the food rotates 175 back to the top of the enclosure 20 while the food faces away from the heating element 110. Reversing this rotation 175 has been found to result in smoke, small flare-ups and less tasty food.

The speed of spit assembly rotation has also been found to be important in producing rotisserie cooked foods with generally superior taste and texture. The embodiment has a spit assembly 170 rotation speed of between 3.5 and 5 rpm. This is typically faster than most home rotisseries operate The low heat position 122 may support large foods up to the capacity of the enclosure 20. However, it may also support foods of any size including smaller sized foods. In some cases the low heat position 122 may be desirable to cook smaller foods slower as an example.

Rotisserie cooking in this embodiment differs in several ways from conventional oven cooking. First, in conventional oven cooking the food remains stationary and is cooked by hot air. In this embodiment, food is rotated about a horizontal axis and is cooked by a combination of both radiant energy coming directly from the heat coil 110 and air heated by the heat coil 110. Radiant energy is generally more efficient than hot air in conveying cooking energy to food and thus typically gets foods hotter quicker.

However without food rotation, radiant energy tends to dry out and burn foods as is the case in most conventional oven broilers. Also, without food rotation, radiant energy tends to cook grease and oil into foods, and particularly into meats.

Rotisserie cooking in this embodiment is generally quicker than conventional oven cooking. This is partly due to the efficiency of radiant energy heating and also due to food movement which helps break the air boundary layer around foods being cooked and thus speeds hot air heat transfer to foods in a similar manner to fan driven home convection bake ovens.

Cooking speed is also increased because foods are alternately super heated on their surfaces as they pass directly in front of the heating coil and then the heat is allowed to soak into the foods as they rotate away from the heating coil.

Natural expansion and contraction as foods heat and cool during rotation also helps speed the cooking process and lower cooking times.

Directly behind and above the low heat track position 122, is the high heat track position 202. Again, the stub axles 186 of the spit assembly 170 may be pushed back, raised and rested into this position. In this position the gear teeth 180 in the perimeter of the spit plate closest to the right side inner side wall 101 may engage the drive gear 208 and the spit assembly 170 may be thus power rotated. Smaller foods may be rotated closer to the heating element 110 in the high heat track position 202 which may greatly reduce such smaller foods' cooking times.

Inserting the spit assembly 170 into this embodiment requires only resting it on the left and right spit support tracks 200 198 and lifting and pushing it back into the enclosure 20 to the desired use position 168 122 202, be it the rest position 168, the low heat position 122 or the high heat position 202.

Removing the spit assembly 170 from the high heat track position 202, the low heat track position 122, or from the rest track position 168, requires only lifting and pulling the spit assembly 170 toward the front of the enclosure 20.

This easy insertion of the spit assembly 170 into, and simple removal of the spit assembly 170 from, the embodiment enclosure 20 is in marked contrast to most other rotisseries which typically require angling the spit rod assembly into its cooking position and carefully fitting one of the spit assembly's ends into a drive socket.

Use of the relatively large diameter spit plates 172 174 as the final reduction gear in the motor rotational speed reducing gear train driving the spit assembly 170 has several advantages when compared with typical rotisserie drives which use a gear box terminated by a drive socket directly coupled to the spit rod.

The spit plate's 172 174 large outer diameter gear 180 greatly reduces the play and backlash in the motor speed reduction gear drive train caused when off-center weighted foods are rotated. In this situation the motor pushes off-center foods uphill until the off-center weight swings over the top of center and then moves downhill constrained by the drag of the motor. The shift from the motor pulling the food uphill to the motor constraining the food's movement downhill causes a shock load on all the gears in the gear reduction train, and particularly on the final drive gears, as any free movement, or play, between the gears in the gear train shifts with the full power of the off-center weighted foods behind it.

Typical final drive gears found in rotisserie drive trains are one-tenth or less of the diameter of the spit plate's outer gear teeth 180 and thus generally are far less durable, have far more play, and put far more load on both the spit and attached food, and on the rest of the reduction drive gear train itself. This in turn may result in shorter motor and gear life, food disengaging from and falling off of the spit rod, and unacceptable levels of noise and vibration.

The speed reduction between the drive gear 208 and the gear teeth 180 on the spit plate 172 174 is ten-to-one in this embodiment but may be greater or less depending on the desired diameter of the spit plate and the coarseness needed in the gear teeth. In this embodiment, such a high gear reduction outside of the gear transmission 210 attached to the gear reduced motor 212 means that fewer and less durable, which may translate to less expensive, gears may be used inside the gear transmission 210 attached to the gear reduced motor 212.

And by eliminating the drive socket which is generally used to attach the spit assembly to the final drive gear of the motor speed reducing gear transmission, any play in the socket engagement with the spit assembly or any binding in inserting or removing the spit assembly into and from the drive socket are eliminated.

Both the first 172 and the second spit plates 174 each have eight evenly spaced kabob holes 182 penetrating their structure just inside their perimeter gear teeth 180. These holes 182 are designed to hold the ends of self rotating kabob rods 184. Each kabob hole 182 is essentially circular hole passing through the spit plate 172 174 with four evenly spaced semicircular lobes 214 carved into its perimeter.

Engaging these kabob holes 182 are self-rotating kabob rods 184. Each kabob rod 184 has a pointed end 216, and an end with a drive cam 218 and retaining spring 220. The kabob rods 184 work by the spit assembly 170 first being put together with the spit rod holding tubes 192 on the second spit plate 174 being pushed over the pointed ends of the two spit rods 176 178 projecting from the first spit plate 172.

Each kabob rod 184 to be used is then loaded with food by skewering the food onto the kabob rod 184 using its pointed end 216. Any number of kabob rods 184 may be used at any one time, from one up to the spit assembly's 170 capacity of eight.

To insert a kabob rod 184 onto the spit assembly 170, the pointed end 216 of the kabob rod 184 is inserted through a kabob hole 182 in the spit plate 172 174 which will be closest to the inner panel 103 of double paneled left wall 30. Then the rod 184 is backed into an opposing hole 182 in the other spit plate 172 174 where the retaining spring 220, as its widest 183 part passes through the kabob hole, snaps and retains the kabob rod 184 from side to side movement away from or toward either spit plate 172 174 similar to the way a clothing snap works. This insertion process is easy and intuitive and is repeated for each kabob rod 184 to be used.

Insertion of the kabob rods 184 onto the spit assembly 170 may be done while the spit assembly 170 is outside of the enclosure 20 or while it is placed in a track position inside the enclosure 20, such, as an example, as being placed in the rest position 168.

The spit assembly 170 with attached kabob rods 184 is then inserted into the low heat track position 122, and the embodiment turned on by setting the cooking time on the timer 222 and turning the control switch 224 to the "Normal Heat Rotation" position.

Figure 15:
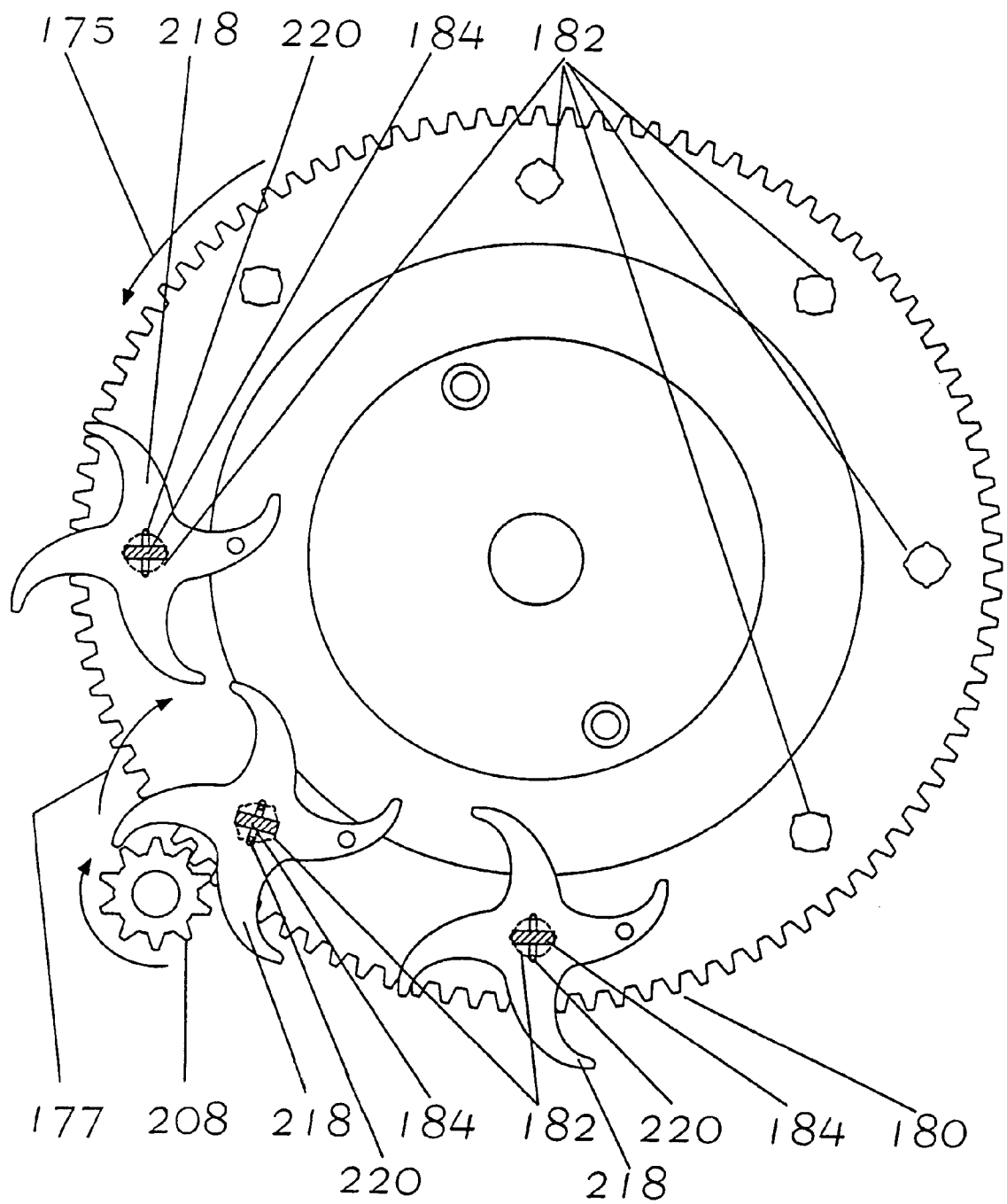
FIG. 15 is a plan side view of the spit plate and kabob rod shown in FIG. 14 showing how the kabob rod is turned by the drive gear when the spit plate rotates.

As shown in FIG. 15, each 360 degree rotation 175 of the spit assembly 170 causes each kabob rod 184 to be rotated 177 one-quarter turn by the kabob rod's 184 drive cam 218 being rotated by the spit plate 172 174 into the drive gear 208 which forces one of the kabob rod's cam 218 arms striking the drive gear 208 to move and consequently causes the one-quarter turn rotation of the kabob rod 184.

The four lobes 214 in each of the spit plate 172 174 kabob holes 182 help stop each kabob rod 184 at even one-quarter turn intervals, and also help prevent a kabob rod 184 from rotating in its kabob hole 182 when it is not being driven by the drive gear 208 pushing on the kabob rod cam 218.

This kabob rod 184 automatic rotation results in all sides of the kabob rod cooked food being cooked evenly, unlike in most rotisserie kabob cooking where one side of the kabob food gets cooked more than the opposite side.

The kabob rods 184 on this embodiment are better than others commonly available for several reasons. First, they 184 may automatically rotate, as explained above, which cooks kabob foods more evenly on all sides than non-rotating rods.

Second, one, or up to the spit wheel's capacity of eight kabob rods, can be in use at any time. Some kabob rods require the entire transport wheel to be loaded with kabob rods in order to operate.

Third, the rods 184 can be inserted or removed while the rods 184 are inside the cooking cavity 104. Many kabob rods require a lot of space to be inserted or removed from their transport wheel, and thus they could not be inserted and removed from inside a confined cooking space.

Next, the rods 184 are very efficient in space utilization and allow foods to be placed along most of the rod's 184 entire length. Along with this, the rod's 184 means of attaching to their transport wheels 172 174 is compact and therefor allows more room for cooking foods with less wasted space for attachment to the transport wheels 172 174. Many kabob rods use a substantial portion of their length for coupling which limits their cooking space.

And the kabob rods 184 intuitively snap into place which makes them easy to use. This also generally removes the need for user instructions. Many kabob rods have complicated coupling mechanisms which are both difficult to use and require detailed user instructions.

The rods 184 offer the ability for each rod 184 to automatically rotate or remain stationary at the user's discretion and in any combination (i.e. 3 rotating and 2 remaining stationary all simultaneously) simply by the user facing the rod's cam 218 toward or away from the drive gear 208 side of the cooking cavity 104. This feature is not found on other kabob rod designs.

And when the rods 184 are stationary, bacon, slabs of baby back ribs or other foods may be wrapped around and clipped to the rods in drum-like fashion for fast even cooking.

Figure 8:
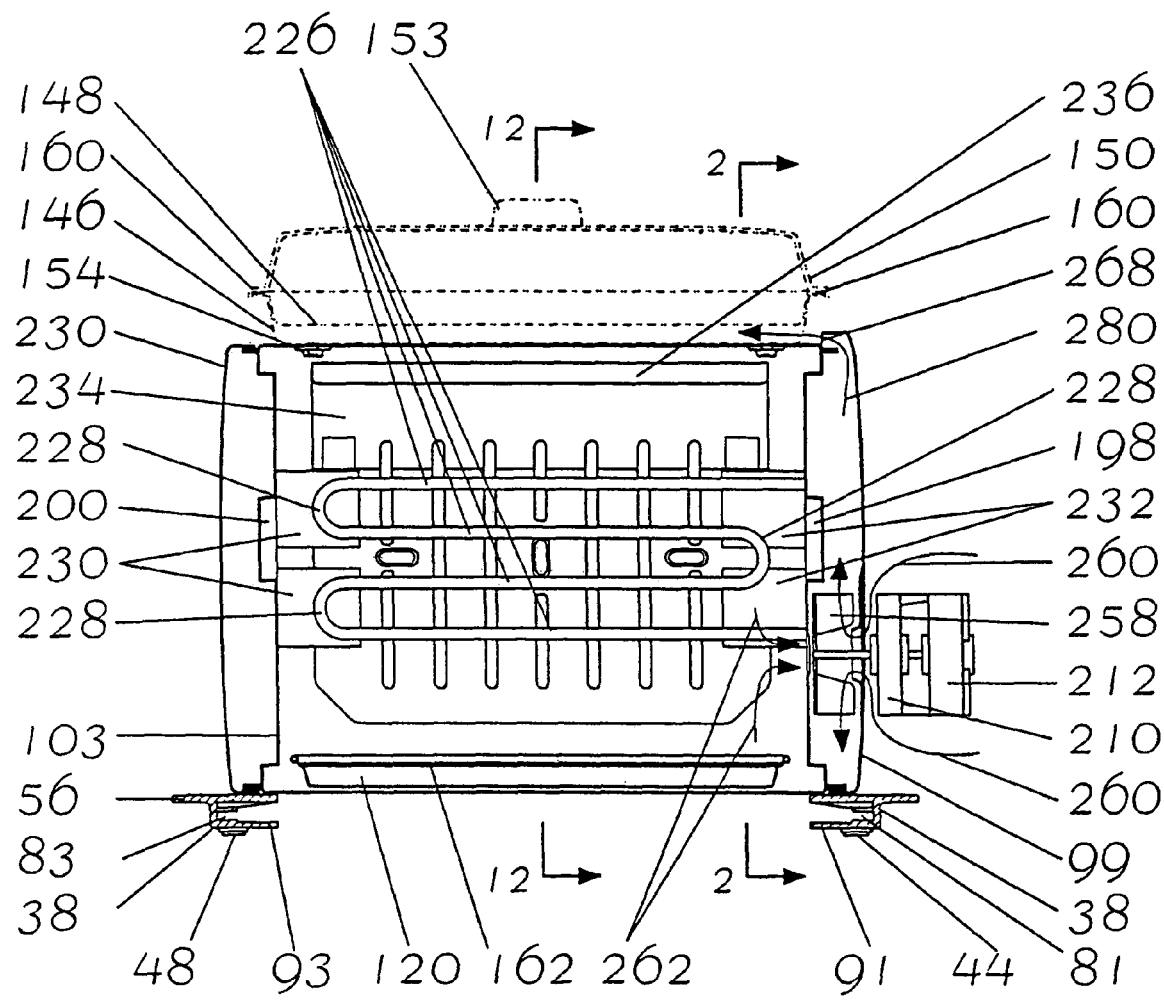
FIG. 8 is a section taken through the alternative fan activated embodiment shown in FIG. 7 as indicated in FIG. 7.
Figure 9:
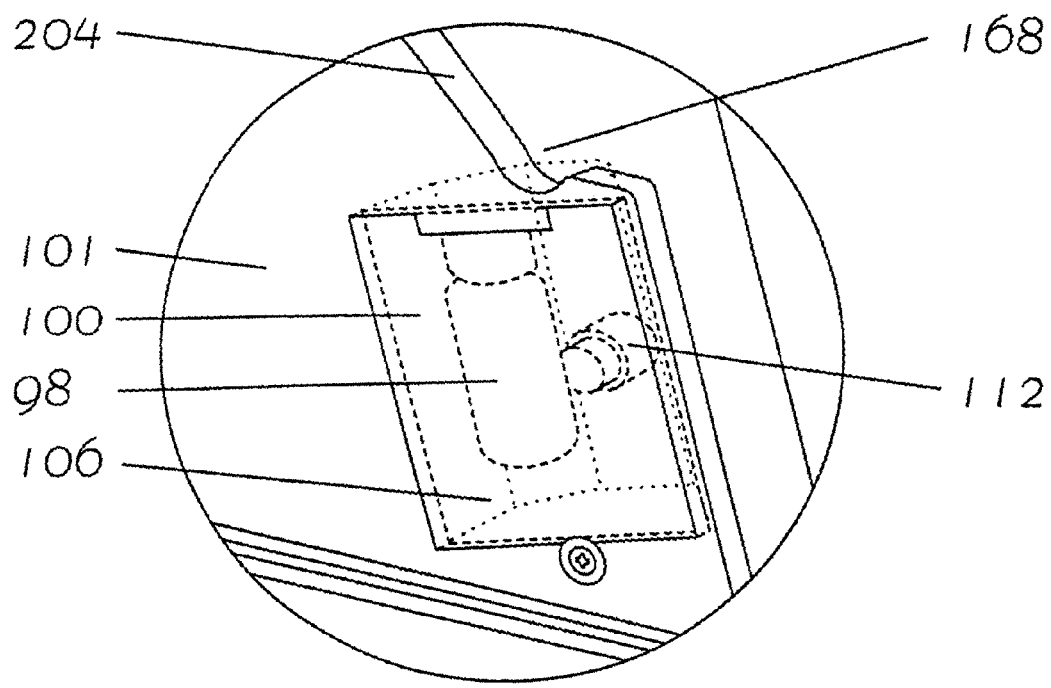
FIG. 9 is a detailed perspective view of a non-detachable light used to illuminate the cooking interior of the embodiment shown in FIGS. 1 through 6 with the translucent red lens shown in dotted lines.
Figure 10:
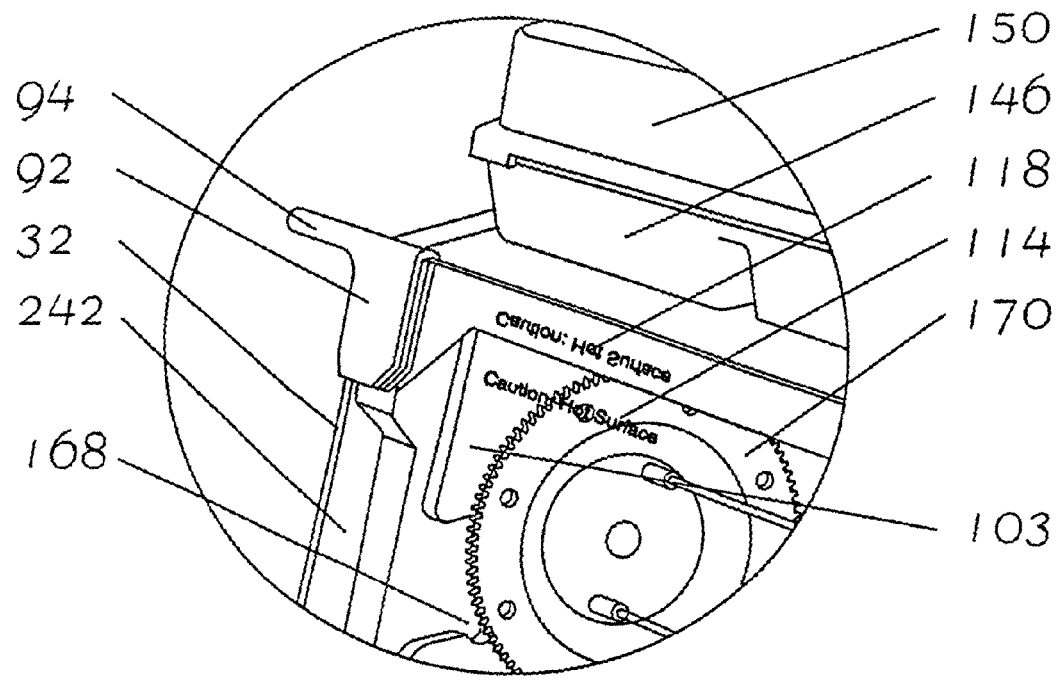
FIG. 10 is an enlarged detail of FIG. 1 showing in greater detail the upper left corner of the preferred embodiment shown in FIG. 1.

As most clearly shown in FIG. 8, directly adjacent to, and approximately half way up the back 26 of the enclosure 20 of this embodiment, is a serpentine shaped electric heat coil 110. This coil 110 winds back and forth across the back 26 of the enclosure 20 creating four straight heat rods 226 terminated by three "U" turns 228 and two rods passing through the enclosure's right side interior wall. The coil is supported on its right and left ends by support brackets 230 232 which slide over the "U" turns 228 in the coil and position it to allow for expansion and contraction as the coil heats and cools, while maintaining the coil's correct position.

This heat coil 110, unlike heating elements in conventional ovens which turn on and off under thermostatic control, may remain constantly on during cooking. This minimizes cooking times and simplifies embodiment construction when compared to rotisseries which cycle on and off while cooking. Alternatively the heat coil 110 may be thermostatically controlled and forgo these advantages.

Through the constantly on heat coil 110, the embodiment is continuously heating air inside the enclosure 20, and is constantly radiating cooking energy. By being constructed to have a heating element 110 which remains constantly on and thus having no thermostat, this embodiment obviates the need for safety devices such as safety thermostats and thermal fuses designed to protect the device if a user set thermostat should fail. This further simplifies construction of the embodiment when compared to most conventional oven constructions.

Some rotisseries place their heating elements or sources of heat below the spit. This may create safety problems from grease fires and flare ups. When grease, oil and residue collected in drip receptacles below the spit become overheated from a heating source located below the spit, smoke and fires can result. When grease, oil or other residue drip or splash onto heating elements, other heat sources, or other hot surfaces, fire and smoke can also result. Heat sources located below the spit also tend to raise the overall height of the rotisserie which may be a problem when it is used in kitchens with cabinets located over their countertops.

Some enclosed rotisseries place their heating source above the spit assembly. These elements, due to their locations, and because both radiant and convection heat given off by the elements tends to rise, are generally less efficient than heat sources placed lower in the cooking enclosure 20. This high position also tends to raise the overall height of the rotisserie which may be a problem when they are used in kitchens with cabinets located over their countertops. This problem is compounded by top mounted heating sources superheating the top of the cooking enclosure 20 which in turn may cause heat damage to over-counter cabinets. Such superheating may also create heat and fire safety hazards.

Both low and roof mounted heating elements, because they may have their heat sources located near the middle or front of the rotisserie, may create an increased potential for users burning their hands when inserting and removing foods from the rotisserie enclosure when compared to a back mounted heating element.

By this embodiment placing its heating element in the back 26 of the enclosure 20, risk is minimized that a user will burn themselves on the element 110 or element heated hot surfaces.

By this embodiment placing its heating element mid way between the floor 22 and ceiling 24 of the embodiment enclosure 20, problems of both low and high mounted heat sources are overcome. As an example, this mid way heating element 110 location helps minimize the overall height of the embodiment, and greatly reduces any chance of smoke and fires from the contents of the drip pan becoming overheated or from grease, oil or other residues splashing onto heat coil 110 or heat coil warmed hot surfaces.

When compared to roof mounted heat elements, this mid location also reduces the temperature of the roof 24 of the embodiment, thus reducing the risk of heat damage to over-counter cabinets and the risk of burning users on the roof 24

This mid location in this embodiment is also generally more efficient in conveying cooking energy than heat coils mounted above the spit assembly 170.

This mid location, when compared to heat elements located above or below the spit which generally are closer to the front of the enclosure, also tends to reduce the temperature on the outside of the front door 32, including the front door 32 glass, which in turn reduces the risk a user will burn themselves on these surfaces.

The mid heat element 110 location in general, when compared to heat element locations above or below the spit assembly, reduces all temperatures on the forward exterior of the enclosure 20 where users are most likely to come in contact and potentially burn themselves. This in general reduces user safety hazards both directly from burning themselves on the enclosure 20 or from accidents, such as accidentally dropping hot food, after unintentional contact with such hot enclosure 20 surfaces.

Located directly behind the heating element 110, and held in place by the left 230 and right 232 heater element support brackets, is a removable cleaning shield 234. During rotisserie cooking, grease, oil and residue may be splattered off food as the food becomes heated in front of the heating element 110. Thus the area behind and adjacent to the heating element 110 tends to get dirty. Heat from the heating element 110 bakes on the grease, oil and residue and makes cleanup difficult.

The cleaning shield 234 may be coated with a nonstick ceramic coating similar to that used in many of today's nonstick fry pans. This coating is medium gray in color and thus tends not to show when it is dirty.

However, when it becomes dirty, the cleaning shield 234 is easy to clean simply by gripping the shield 234 by its bent-over top edge 236 and pulling it up and forward 235 and out of the enclosure 20. Once thus removed, the shield 234 may be washed in a sink or dishwasher. Reinserting the cleaning shield 234 is accomplished by reversing the removal process.

By being behind and adjacent to the heating element 110, the cleaning shield 234 receives radiant heat from the element 110. When compared to a shiny surface cleaning shield placed behind the heating element 110, the medium gray ceramic coating on the cleaning shield 234 has been found to cook foods as fast or even faster than their shiny counterparts.

Although definitive tests have not been performed to prove the theory, it appears there are two reasons for this unexpected cooking efficiency. First, the medium gray ceramic nonstick coated cleaning shield 234 gets hotter than a similar shiny cleaning shield. This in turn raises the interior air temperature of the enclosure 20 which in turn reduces cooking times.

Second, radiant energy striking the medium gray ceramic nonstick coated cleaning shield is reradiated at a lower infrared frequency than radiant energy striking a shiny cleaning shield. This lower frequency tends to absorb quicker and deeper into foods which in turn results in shorter cooking times.

These same cook time reducing features can be found with other cleaning shield coatings. As an example, self-cleaning oven interior coatings similar to those found in the DeLonge Alfredo Toaster Oven which today is widely available in U.S. department stores such as Robinson-May and Macy's, show similar advantages and require even less cleanup than nonstick ceramic coatings.

The nonstick ceramic coating on the cleaning shield 234, by not readily showing when it is dirty, reduces the amount of cleaning that the cleaning shield 234 requires. This same coating, when compared to other surfaces, makes cleaning the shield much easier. Cleaning ease is also greatly enhanced by the cleaning shield 234 being easy to remove from and reinsert into the enclosure 20.

As mentioned earlier, the heating element 110 in this embodiment remains constantly on during rotisserie cooking which creates hot air which must be safely vented from the enclosure's 20 interior.

Directly behind the heat shield 234, on the curved center wall section 34 connecting the back 26 of the enclosure 20 to the roof 24 of the enclosure 20, are upward facing vents 238. These vents 238 allow air heated by the constantly operating heating element to escape the enclosure's 20 interior. These louvered vents 238 are indented inward with their openings at the top of the indent.

This arrangement of upward facing louvers 238 reduces potential heat damage to overhead cabinets when compared to more conventional indented louvers with their openings at the bottom of the indent. This is because hot air must first rise above the louver 238 and then exit by dropping down into the louver 238 opening rather than simply rising directly through the louver opening.

Forcing the hot air to first rise and then drop, reduces its velocity and creates turbulence which breaks up potentially damaging concentrated streams of fast moving exiting hot air.

Placing the vents 238 on the curved wall section 34 connecting the back 26 of the enclosure 20 with the enclosure's roof 24, when compared to placing the vents on the back 26 or the roof 24 of the enclosure 20, helps hot air exit away from backing walls the embodiment might be placed against, or exit away from overhead cabinets the embodiment might be placed under. Exiting hot air also tends to follow along the curved wall section 34 breaking away slowly and this further disperses hot air concentration.

There are gaps 240 242 244 246 between the glass door 32 and the frame 116 it rests against on all four sides of the door 32. The gaps on the lower side of the glass door 32 generally allow cool air to enter the enclosure's 20 interior, and the gaps around the upper section of the glass door 32 generally allow hot air to exit from inside the enclosure 20. This air movement helps control interior enclosure 20 temperatures which might otherwise rise to unacceptable levels due to the heat element 110 remaining constantly on during rotisserie cooking.

The gaps 240 242 between the door frame 116 and the glass door 32 are exceptionally wide on both the left 242 and right 240 sides of the glass door 32. Hot air exiting out these left 242 and right 240 side gaps is dispersed and broken up by these exceptionally wide gaps 240 242 being inclined with the glass door 32 which help form the side gaps 240 242. Such dispersion and breakup of the hot air rising from the inclined side gaps 240 242 helps prevent heat damage to overhead cabinets which the embodiment might be placed under.

The interior temperature of the enclosure 20 is controlled by the venting already described both on the curved wall 34 connecting the back 26 wall of the enclosure 20 with the roof 24 of the enclosure 20 and the venting from the gaps 240 242 244 246 surrounding the door. An equilibrium is reached involving the cooking energy supplied by heating element 110, a cooling affect from the cooler temperature of the food being cooked, the amount of venting, and the ambient air temperature of the room in which the embodiment is operating. In the final stages of food cooking this embodiment is engineered to produce an air temperature measured near the center of the enclosure's 20 interior of around 250 to 375 degrees Fahrenheit. Such a temperature, when compared to both warmer and cooler cooking temperatures, has been found to produce exceptionally satisfactory results in rotisserie cooked food taste and texture.

Figure 7:
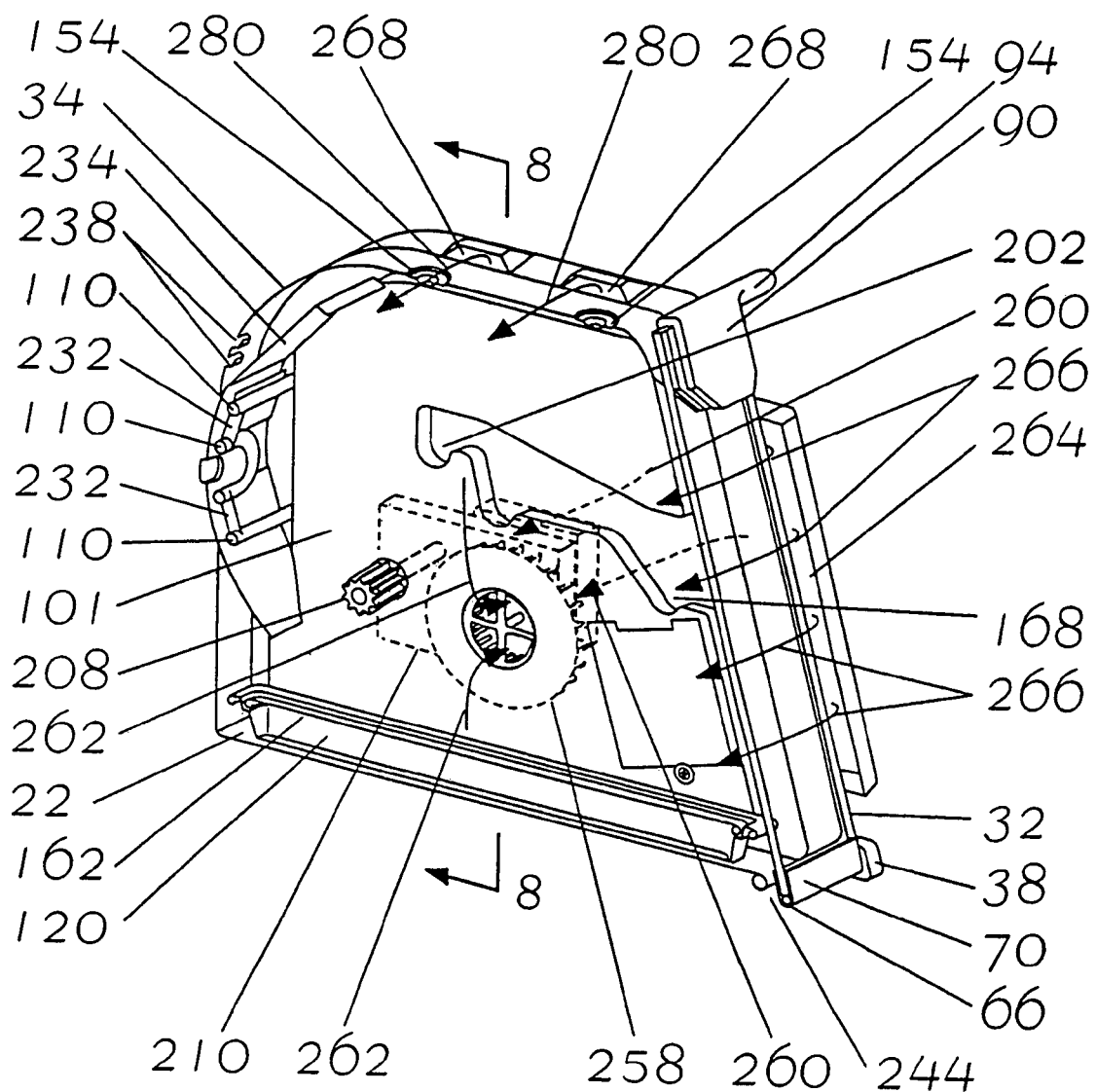
FIG. 7 is the same perspective view shown in FIG. 6 but with the spit plate removed and an alternative fan activated heat removal and cabinet cooling system installed.

An alternate form of controlling cooking temperatures is shown in FIGS. 7 and 8. Here the shaft of the gear reduced motor 212 is extended through the case of the gear transmission 210 and a radial fan 258 is attached to the end of the motor's shaft. This fan 258 pulls through it both cool air 260 from outside of the enclosure 20 as well as hot air 262 from inside the enclosure 20. The cool air 260 and hot air 262 are mixed and the combined warm air move into the space between the interior wall 101 and outside wall 99 of the double paneled right side wall 28. A long scoop shaped vent 264 adjacent to the right side of the glass door 32 directs warm air out 266 over the exterior of the glass door when the embodiment is on and cooking with the glass door 32 closed. This directed warm air 266 cools the exterior of the glass door to help lower its temperature and thus the chances of a user getting burned by touching its surface.

Other vents 268 at the top of the double paneled right side wall 28 direct 280 the warm air moved by the fan 258 out 280 over the metal roof 24 of the enclosure 20 thus cooling the roof 24 and lowering its temperature to reduce the risks of burns from users accidentally touching the roof 24 when it is hot. Air from these vents 268 is blocked when the warming/steaming tray unit 144 is placed on top 24 of the enclosure 20 thus increasing the heat on the metal roof 24 and allowing the warming/steaming tray unit 144 to function in its normal way. Other vents may be placed in other locations around the double paneled right side wall 28, such as example adjacent to the curved metal section 34 or back 26 of the enclosure, to help vent the interior of the enclosure 20 and reduce the chances of accidental burns from a user touching that section 34 26 by mistake.

The enclosure 20 is generally symmetrical side to side when viewed from the front. However, there are a few exceptions to this. First, there is a control/motor housing 248 mounted to the outside panel 99 of the double paneled right side wall 28. The control/motor housing 248 has a power cord 250 extending out its back and contains within it: a three hour mechanical timer 222, a control switch 224, and a gear reduced 210 motor 212 which powers the drive gear 208, referred to earlier, projecting through the interior panel 101 of the double paneled right side wall 28. The heat element 110, as described earlier, also projects from the interior panel 101 of the double paneled right side wall 28 and is supported by brackets 230 232 attached to both the right interior side wall 101 and the left interior side wall 103. There too is a light 98 and light reflector 106 mounted between the interior 101 and exterior 99 panels of the double paneled right side wall 28 which lights the interior of the enclosure 20 through a translucent glass cover 100 disposed on the interior wall 101 of the double paneled right side wall 28. This light 98 has a red lens 112 which extends from the light 98 through the light reflector 106 and exterior right panel 99 to the outside of the double paneled right side wall 28.

The control/motor housing 248, as just described, is attached to the outer panel 99 of the double paneled right side wall 28. Instead of mounting the controls 222 224 on the front face of the embodiment as most conventional ovens do, this embodiment mounts its controls 222 224 more than one-third the way back on its right side. It also mounts the control/motor housing 248 above the bottom of the embodiment, so that more than one-eighth of the outer panel of the double paneled right side wall 28 is left exposed under the control/motor cover 248 to allow items on the countertop 42 on which the embodiment might rest to move and reside under the control/motor housing 248.

Placing the controls 222 224 in a separate housing 248 and placing the housing 248 more than a third of the way back on the side and more than an eighth of the way up the side of the cooking enclosure 20 has been found to maximize valuable useable counter space while simultaneously not significantly impairing the accessibility, usability, or required visibility of the controls.

Adding to this accessibility, usability and required visibility of the controls 222 224, the surface on which they are displayed is inclined, and inclined both in plan and side views. Such double inclination, by facing the controls 222 224 toward the user whose eyes and hands are generally disposed above and to the right side of the enclosure 20, helps in both the viewing and the use of the controls 222 224.

Two devices control the embodiment's operation. The first is a mechanical three hour count down timer 222. This windup timer 222 allows the embodiment to operate for up to three hours without having to reset the timer 222. An electronic digital can be substituted to perform the same function. Three hours is appropriate because a fifteen pound turkey takes about 12 minutes per pound to cook or about three hours in total. Thus three hours may accommodate such a large item without having excess time which might result in timer inaccuracies and loss of safety advantages. As an example, a four hour mechanical timer might have its time markings closer together on its dial and might have a mechanism which is inherently less accurate than a three hour timer. Both of these conditions would reduce the timing accuracy for the user. And safety might be reduced it the user could leave the embodiment for four, five, or six hours, instead of only three hours maximum.

Figure 5:
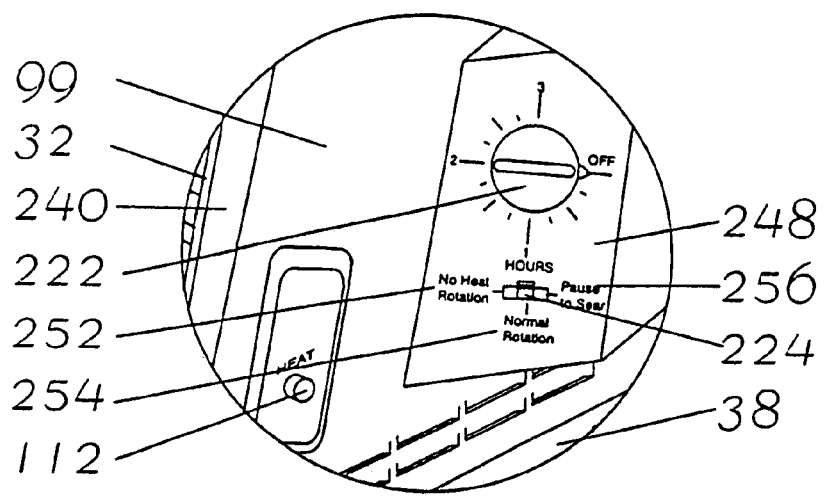
FIG. 5 is an enlarged section of FIG. 1 showing details of a non-detachable timer, control switch, and heater indication light and the vents in the side wall.
Figure 6:
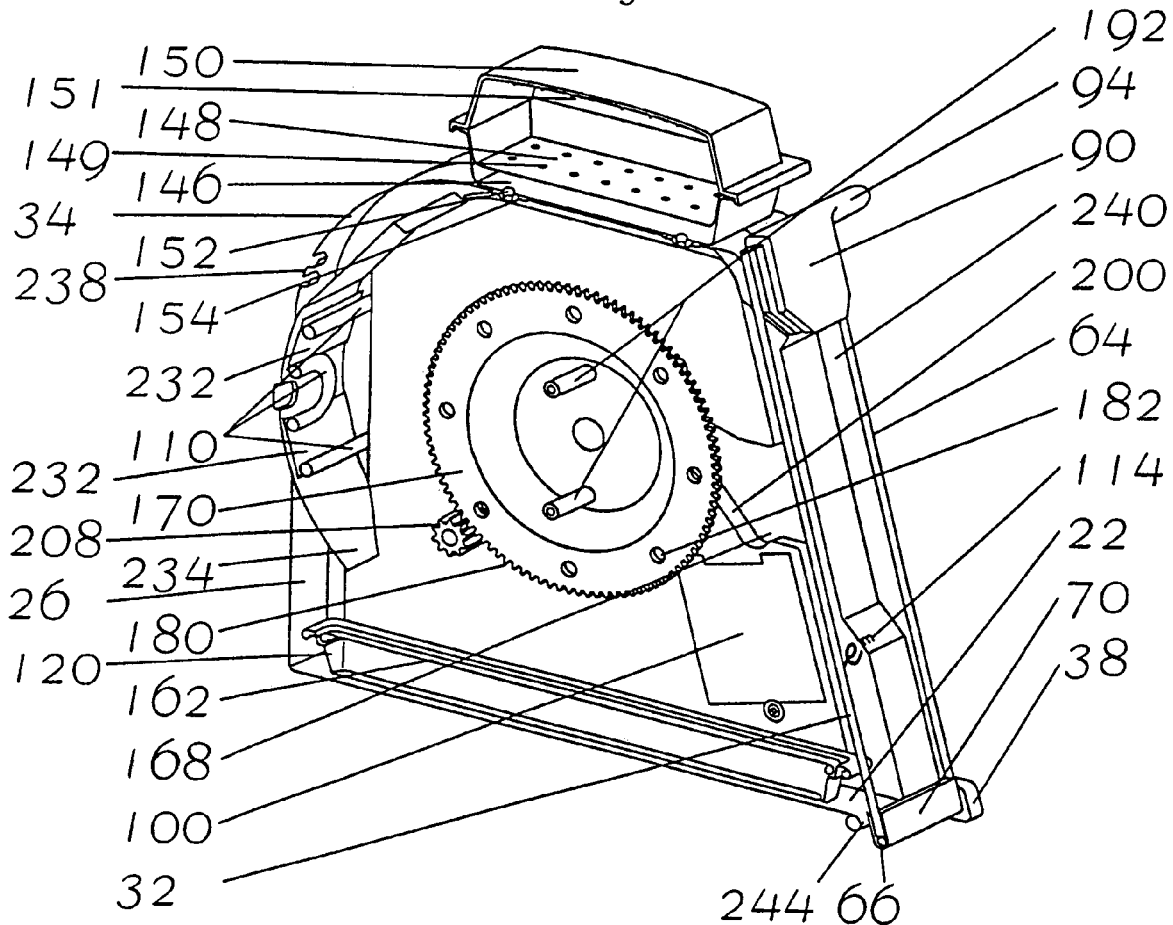
FIG. 6 is a perspective view of the section shown in FIG. 2.

The second control device is a control switch 224 which regulates the functions of the heat element 110, the gear reduced motor 212, and the light 98. The control switch 224 is only functional when the timer 222 is set and running with time on it. As shown in FIG. 5, the control switch 224 has three positions 252 254 256. Starting from the left, the first position 252 called "No Heat Rotation" turns on the gear reduced motor 212, causing the spit assembly 170, if installed, to rotate, and turns off both the light 98 and the heat element 110. The light 98 being off, along with no light shining through the red lens 112, indicates to the user that the heating element 110 is off and is not receiving electricity. This first switch position 252 is generally used after foods have been rotisserie cooked to cool the foods down while continuing the rotational flow of juices in and around the foods. It 252 keeps foods moist while not allowing grease, oil and/or other liquids to settle into the foods. It 252 may be used with the glass door 32 open 132 134 87 or closed 85 depending on whether it's desirable to cool the foods to serving temperature rapidly or slowly. If the first switch position 252 is used with an electronic timer, the heat element 110 might be run at lower wattage or cycled on and off during this cooling down period to keep the foods warm for a prolonged period of time.

The second control switch position 254, titled "Normal Rotation", is used for rotisserie cooking. In this control switch position 254 the gear reduced motor 212, the heat element 110, and the light 98 all remain on. The light 98 being on, along with light shining through the red lens 112, indicates to the user that the heating element 110 is on and receiving electricity. In the second control switch position 254, foods are rotisserie cooked for the amount of time set on the timer 222.

The third control switch position 256, titled "Pause to Sear", is used to brown or sear the surfaces of foods. In this control switch position 256, the gear reduced motor 212 is turned off, thus stopping the spit assembly 170 from rotating, but the heat element 110, and the light 98 remain on. Using this switch position 256 involves rotating the food using either of the other two control switch positions 252 254 until the side of the food to be browned or seared faces the heating element 110, and then turning the control switch 224 to the "Pause to Sear" position 256. The food will brown or sear in this position 256 until the time set on the timer 222 expires.

Circuits to perform the functions described herein are well know to one knowledgeable in the art and thus are not described in this document.

Besides the countdown timer and control switch, the gear reduced motor is enclosed in the control/motor housing. Although many types of motors and gear transmissions might be suitable, a half inch stack shaded pole motor with spur and helical reduction has been found to produce particularly satisfactory results in the larger size embodiment whose dimensions have been described earlier.

The smaller embodiment, whose dimensions were described earlier, might use a less powerful, and therefore less expensive motor, such as a gear reduced synchronous motor. Synchronous motors have an advantage in generally producing less noise than generally larger shaded pole motors and other motors commonly used in rotisseries. Use of the spit plate as an extra large and durable final drive gear allows use of synchronous motors which usually have less durable transmissions than those used on the more expensive shaded pole motors.

Figure 16:
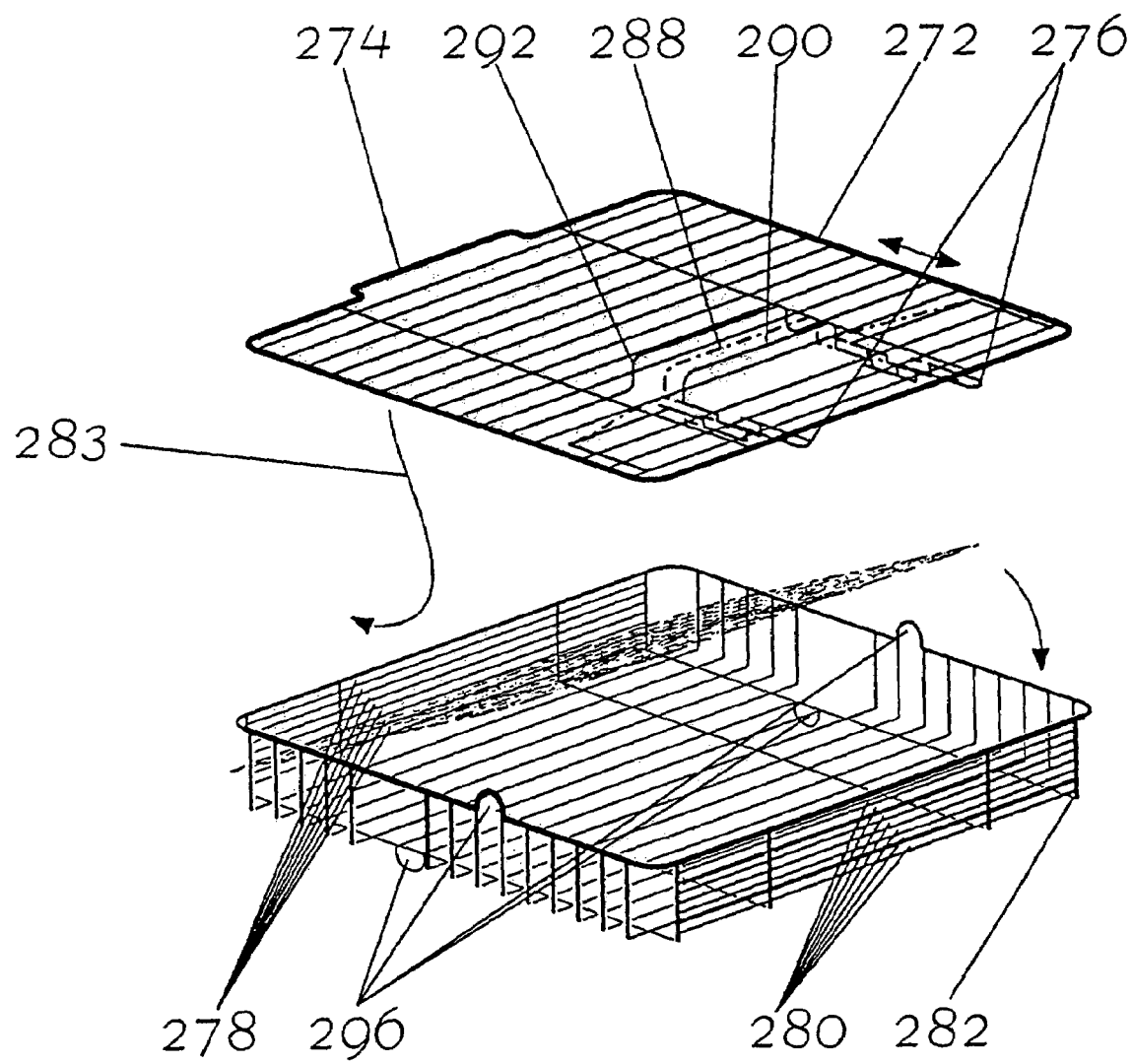
FIG. 16 is a perspective view of a food cooking basket showing in phantom lines how the lid for the basket is mounted.
Figure 17:
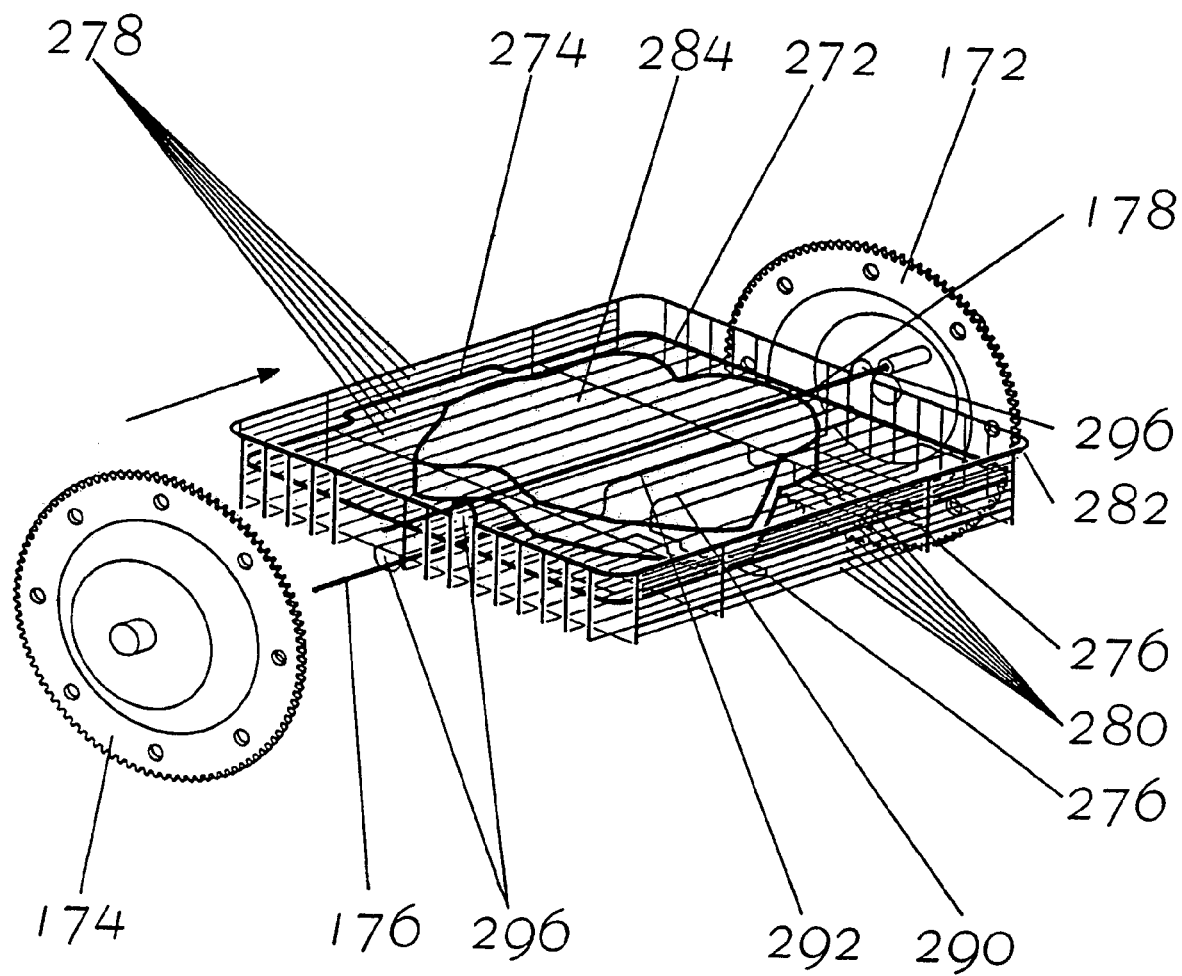
FIG. 17 is a perspective view of the food cooking basket shown in FIG. 16 with food contained within the basket and the basket mounted on the spit assembly.

Several accessories can fit on the spit assembly. As an example as shown in FIGS. 16 and 17, a metal wire basket 270 might be fitted. This wire basket 270 might have a metal wire framework covered with a nonstick coating to prevent foods from sticking to the basket.

The lid 272 of the basket 270 is fitted with a fixed wire tab 274 on one side and a finger retractable wire tab 276 on the opposite side. Each tab fits into one of several slots 278 280 defined by wires on each side of the dished out lower part 282 of the basket 270. Thus the lid 272 may be adjusted to clamp onto and hold during rotisserie cooking several different thicknesses of foods.

There is a certain degree of springiness in the lid 272 and the lower part 282 of the basket 270, and this springiness allows the food 284 being held in the basket 270 to be clamped under pressure between the lid 272 and the lower part 282 of the basket 270 so that the food 284 is prevented from shifting while cooking. The same springiness allows different thicknesses of food to be held securely at the same time. Helping this ability to accommodate different thickness food simultaneously, the fixed tab 274 and the finger retractable tab 276 may each be inserted at different heights above the floor 286 of the dished out lower part 282 of the basket 270.

Securing food in the basket 270 is a simple process. The food 284 is first placed on the floor 286 of the dished out lower part 282 of the basket 270. The fixed wire tab 274 on the lid 272 is slid into 283 one of the slots 278 on the side of the dished out lower part 282 of the basket 270. The slot 278 chosen, and hence the height of the lid 272 above the floor 286 adjacent to the fixed wire tab 274, should be slightly lower than the height of the food 284 directly adjacent to the slot 278.

The finger retractable wire tab 276 is then retracted 288 by squeezing on the movable 290 and fixed 292 handles of the finger retractable wire tab 276. The finger retractable wire tab 276 side of the lid 272 is then lowered 294 to clamp the food and the retractable wire tab 288 inserted into one of the slots 280 on the side of the dished out lower part 282 of the basket 270 by releasing finger pressure on the movable 290 and fixed 292 handles of the finger retractable wire tab 276.

Attaching the basket to the spit assembly 170 is done by simply inserting the two spit rods 176 178 through four integral semicircular loops 296 which are part of the dished out lower part 282 of the basket 270, and then placing the second spit plate 174 over the ends of the spit rods 176 178 and inserting the spit assembly 170 with the basket 270 in the normal manner into the cooking cavity 104.

The basket 270 is centered on the spit assembly 170 and fits between the two spit rods 176 178. This is different than most spit baskets which either have a spit rod running through their center or are placed off center to the spit assembly rotation axis. Those baskets with a spit rod through their center limit their capacity to cook large flat foods such a steaks and fish. Those baskets which are placed off center to the spit rotation axis cook one side of the foods they contain more thoroughly than the other. By contrast, compared to these alternative designs, the basket of this embodiment cooks food more evenly on both sides and has the ability to hold foods up to the full size of the basket. In the real world, both of these are major advantages in rotisserie cooking.

The fixed 274 and finger retractable tab 276 lid 272 attachment design of this embodiment also has major advantages over other lid latching designs. As an example, many designs adjust to only one thickness of food. This embodiment, through use of two tabs 274 276 which fit into separate slots 278 280 which individually adjust their heights, not only allows adjustment to different thickness foods, but allows several different thickness foods to be held in the basket 270 simultaneously.

Likewise, in contrast to lid attachment designs which are rigid, this embodiment is springy which allows it not only adjust to different thickness foods being simultaneously held, but allows it also to put clamping pressure on the foods, even foods of different thicknesses, being held in the basket so they won't shift during rotisserie cooking. Shifting foods tend to get damaged and to fall out of the basket. Rigid basket designs generally don't provide this spring loaded clamping pressure.

The finger latching mechanism used on this embodiment is also superior in simplicity and ease of use compared to other basket designs. As an example, the basket on this embodiment may be secured closed with food in it using only one hand. Many other designs require two hands to close and latch.

Such baskets may be made in several different sizes. FIGS. 16 and 17 illustrate a relatively flat basket, perhaps as an example, one to one-and-a-half inches thick, which would be inserted with the spit assembly 170 in the low heat position 122 and hold such foods as steaks, fish and small vegetables. This basket's 270 perimeter is determined by the maximum size which will fit between the first 172 and second 174 spit plates and clear: the heat rods 110, the glass door 32, the cooking cavity ceiling 142, and grate cover 162.

A thicker basket, perhaps twice as thick as the previous basket 270 but otherwise similar in shape and dimensions to the previous basket, might be made to hold lobster tails, potatoes, and other larger vegetables and foods, as well as hold all the kinds of foods the previous basket 270 might hold.

Such a thick basket might also be made which would only extend out to the perimeters of the first 172 and second 174 spit plates. Such a basket might be used when it is mounted to the spit assembly 170 and the spit assembly 170 is supported in the high heat position 202, closer to the heat coil 110 where the reduced size would now allow the basket to clear. It would hold all the same foods the previous two described baskets could, but in smaller amounts. In return for these smaller amounts due to its restricted size, this basket would cook foods faster when it was placed in the high heat position.202 This basket could also be used in the low heat position 122 if slower cooking speeds were desirable.

A thinner version of this high heat basket might also be made for use where food thickness was not a factor.

Figure 13:
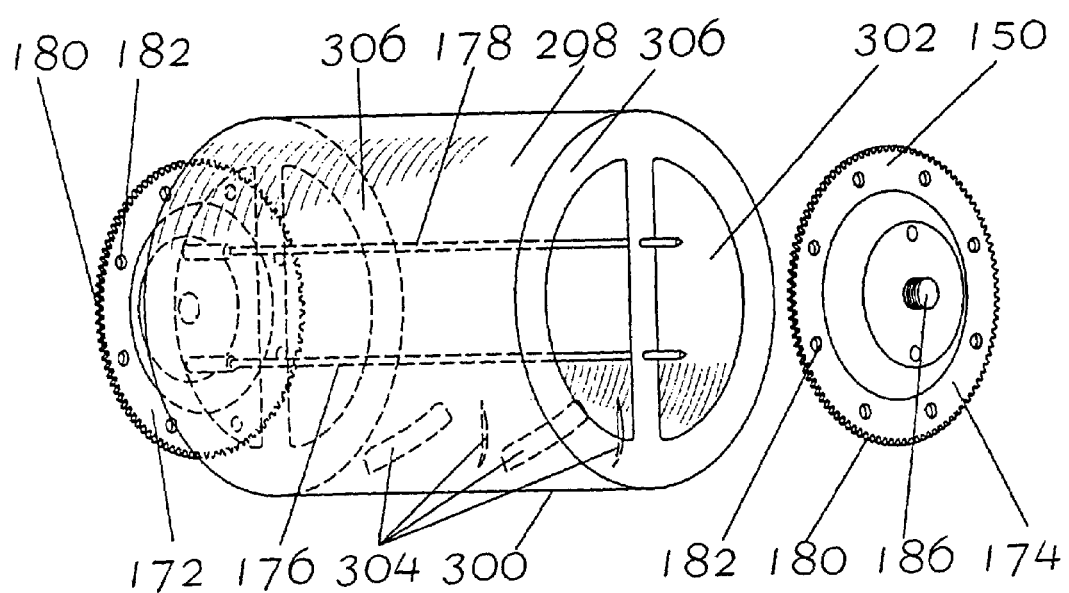
FIG. 13 is a perspective view of the spit assembly shown in FIG. 11 mounting a rotary cooking container.
Figure 14:
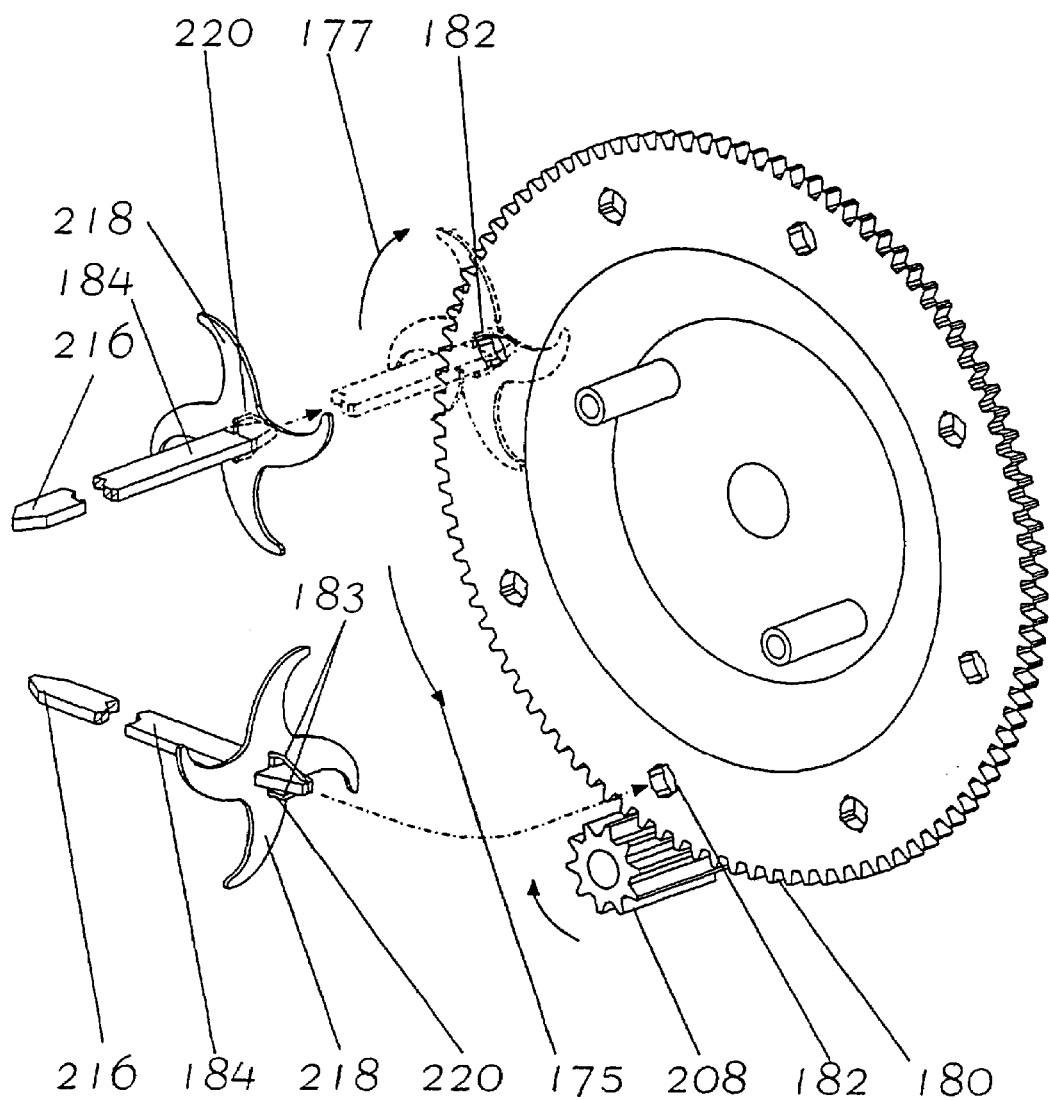
FIG. 14 is a broken perspective section of a kabob rod showing with phantom lines how it mounts into the spit plate.

As illustrated in FIG. 13, another accessory which might be included with this embodiment is the rotary cooking container 298 which stir fries and rotary cooks foods such as meats, vegetables, popcorn, shrimp, seafoods, etc.

This container can also be used with or without rotation but without heat inside the embodiment to marinate meats and vegetables by simply putting the meats or vegetables into the container 298 along with a marinade or rub and leaving the timer 222 in the off position or turning on the timer and placing the switch into the "No Heat Rotation" position. The rotary movement, if used, helps the marinade penetrate all sides of the meats or vegetables or helps the rubs coat all sides of the meats or vegetables with little or no intervention on the part of the user.

This accessory comprises a spit assembly 170 mounted cylindrical tubular housing 300 with at least one opening on one end, such opening 302 which may be covered by a lid or door when cooking. Several agitation blades 304 project from the interior surfaces of the cylindrical housing 300, and help move and direct food inside the housing 300 while the housing 300 is being rotated.

As shown in FIG. 13, in use, the cylindrical housing 300 is mounted onto the spit rods 176 178 through holes in the housing's ends 306 308.

A shape other than cylindrical may be used for the tubular housing 300 of the rotary cooking container 298. As examples, the tubular housing might be squarcle (cross between a square and a circle like an old television screen), square, pentagonal, hexagonal, irregular, or other shape in cross section.

To use this accessory 298, the user mounts the tubular housing 300 onto the spit rods 176 178, puts food and possibly cooking oil, spices, etc. inside the housing 300 though the hole 302 or holes 302 in the ends 306 308 of the housing 300, caps the housing 300 if a cap or door is to be used, and places the spit assembly 170, including the rotary cooking container 298 with its food contents, into the low 122 or high heat 202 spit mounting positions inside the enclosure 20.

The cooking process which follows this is like normal rotisserie cooking, except foods can be tumbled as they cook inside the container, and if cooking oil is present, a form of stir frying may be performed.

The rotary cooking container 298 may be fabricated from stamped, rolled or cast metal, or from glass or from other appropriate materials well known in the art.

The rotary cooking container shown in FIG. 13 adds a convenient cooking feature of automatically agitating foods without user intervention. When cooking, this means that foods tend not to burn and may be cooked with little or no oil or fats. Either rotary cooking container may be nonstick coated on their interiors to help facilitate not using fats and oils during cooking. Such coatings are well known in the art and thus are not described in detail herein.

Inserting and removing foods into and from the cooking cavity 104 of this embodiment is typically an easy process. However, this embodiment includes a pair of gloves 310 shown in FIG. 19 to simplify the process. These gloves 310 are different than normal kitchen gloves however. Their 310 outer surfaces 312 are coated with a flexible, water and grease tight material, like plastic or rubber, similar to a set of dishwashing gloves. This water and grease tight material covers an insulating layer of cotton fabric less than 1/16 of an inch thick which helps prevent hot foods from burning the user. The gloves 310 extend over the wrists and cover part of the user's lower arm.

A user may lift foods, such as chickens, turkeys, steaks, ribs or vegetables, which are either mounted or not mounted on the spit assembly, both into or out of this embodiment's cooking cavity 104, when the food is either hot or cold, using the gloves 310.

The gloves 310 prevent the user's hands from getting dirty or greasy and help protect the user from getting burned when handling hot foods.

The gloves 310 also simplify handling cooked and uncooked foods in general, and make easier the mounting and releasing foods to and from the spit assembly by removing concerns the user might have of getting dirty and greasy, and getting burned when directly using his or her hands to help perform these tasks. The gloves 310 can also help protect the user from cuts which he might get using knives or other kitchen utensils, or from the spit rods 176 178 and other rotisseries parts and accessories.

The gloves 310 are washable simply by placing them under running water and possibly using a little soap or detergent to help remove grease.

The gloves 310 are formed as normal four finger one thumb gloves, however they may also be formed as mitts with only one separation between thumb and finger enclosure areas, or they may have separations for every two or three fingers etc.

Unlike the gloves 310 that come with this embodiment, conventional cooking gloves and mitts can not protect a user from hot grease, liquids and oils when directly handing rotisserie cooked foods, nor can such gloves and mitts be easily cleaned.

Also, unlike the gloves 310 that come with this embodiment, conventional cooking gloves and mitts generally do not extend over the user's wrists and lower arms and thus do not provide protection against burns in these areas which approach hot cooking cavity walls while the user is reaching into the rotisserie cooking cavity to mount or unmount the spit assembly and for other reasons.

Referring now to FIGS. 20–32, preferred embodiments of the present invention is shown. The preferred embodiments comprise cooking appliances having detachable electronic components, specifically control boxes and heating elements, thereby enabling the cooking appliance enclosure to be safely subjected to dishwashing.

Figure 20:
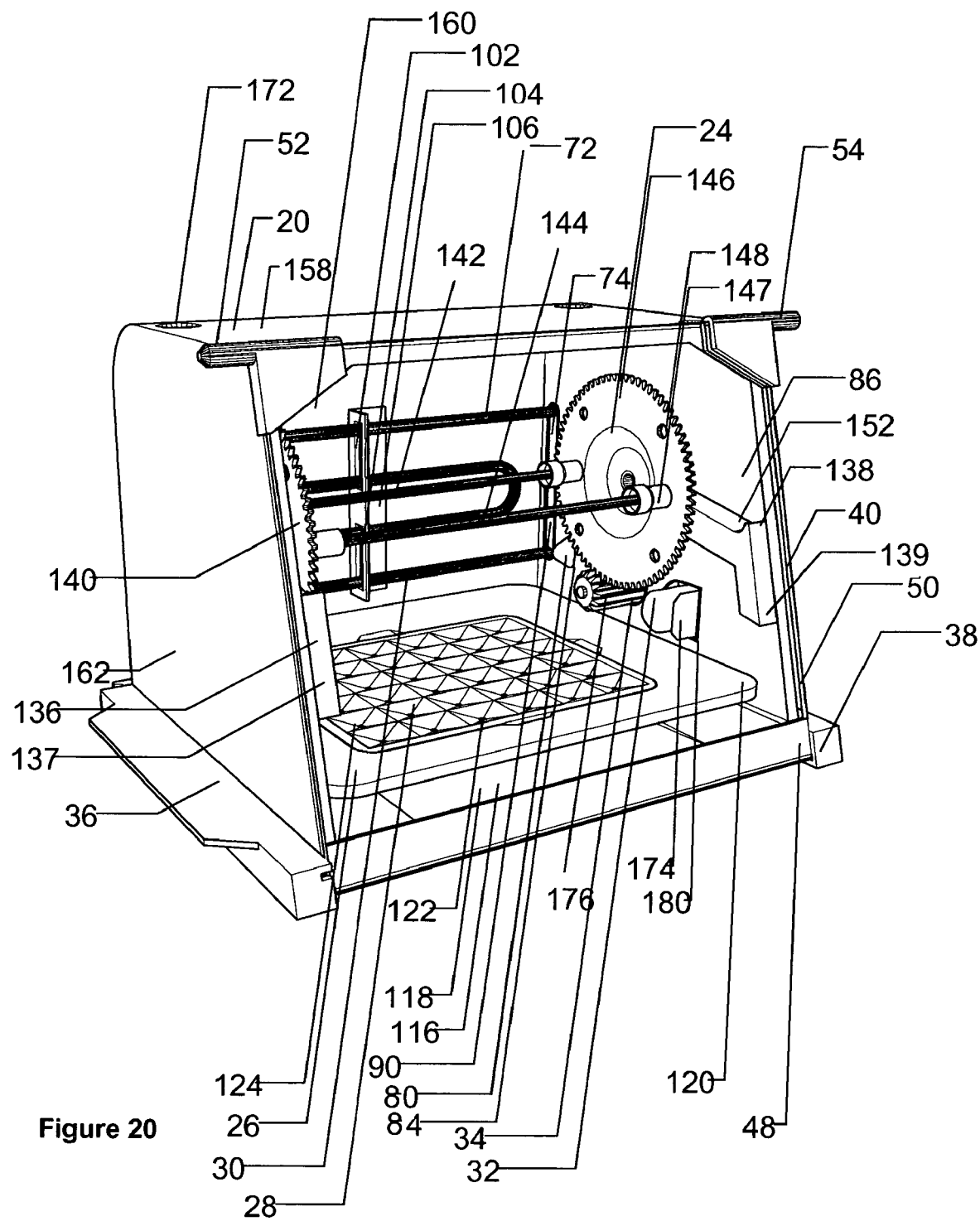
FIG. 20 is a forward, left hand, upper perspective of a preferred embodiment of the present inventions.
Figure 21:
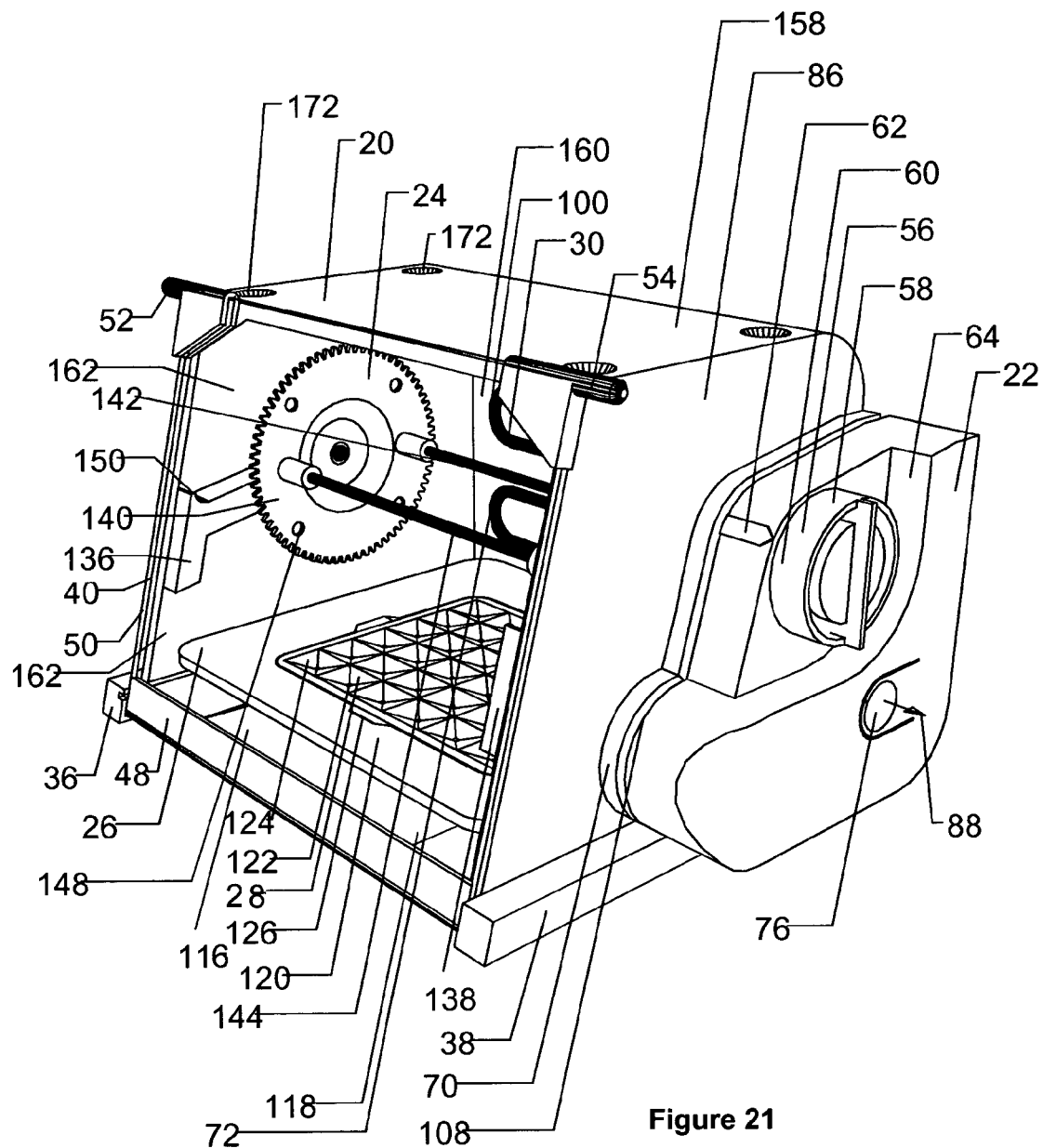
FIG. 21 is a forward, right hand, upper perspective of the preferred embodiment, shown in FIG. 20.
Figure 22:
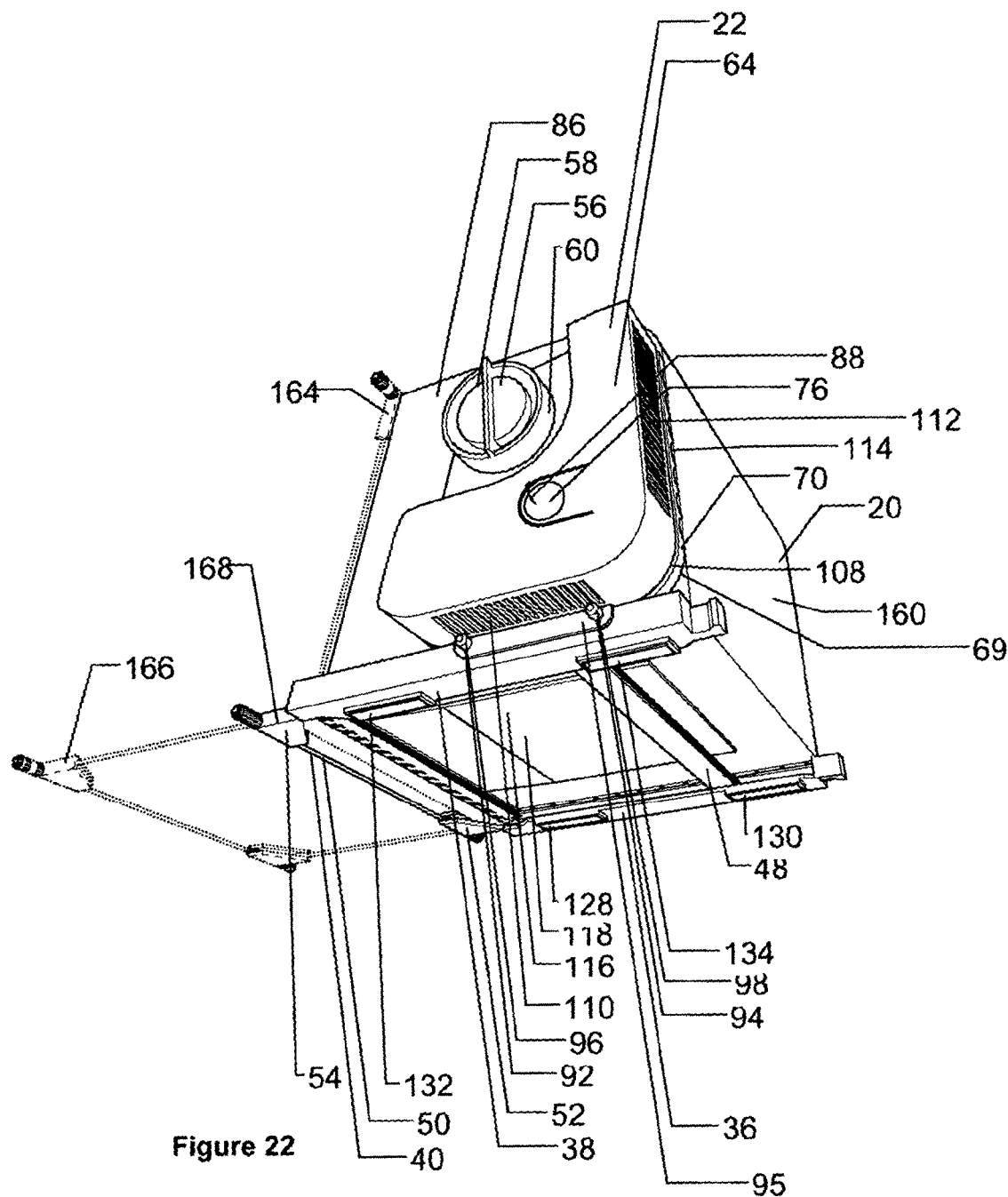
FIG. 22 is a rear, right hand, lower perspective of the preferred embodiment illustrated in FIG. 20.

Referring to FIGS. 20, 21, and 22, a preferred embodiment of the present inventions includes oven cabinet 20 containing: spit assembly 24; drip pan 26; drip pan cover 28 which covers reservoir of drip pan 26; with oven cabinet 20 removably mounting control box 22.

Oven cabinet 20 is supported on a counter top by left support rail 36 and right support rail 38 which are coupled to the left and right sides respectively of cabinet's 20 base by means of attachment to left rail attachment tab 44 and right rail attachment tab 46 both of which extend sideways and horizontally away from oven cabinet 20 (see FIG. 25).

Referring to FIG. 25, glass door 40 removably and slidably couples to support rails 36 and 38 by means of engagement with left door support axle 41 and right door support axle 42, both of which protrude from the lower edge of door 40 and are attached to door 40 by means of channel 48 which is attached to the base of glass pane 50. Attached to the upper left and right and corners respectively of glass pane 50 are left door handle 52, and right door handle 54.

Figure 26:
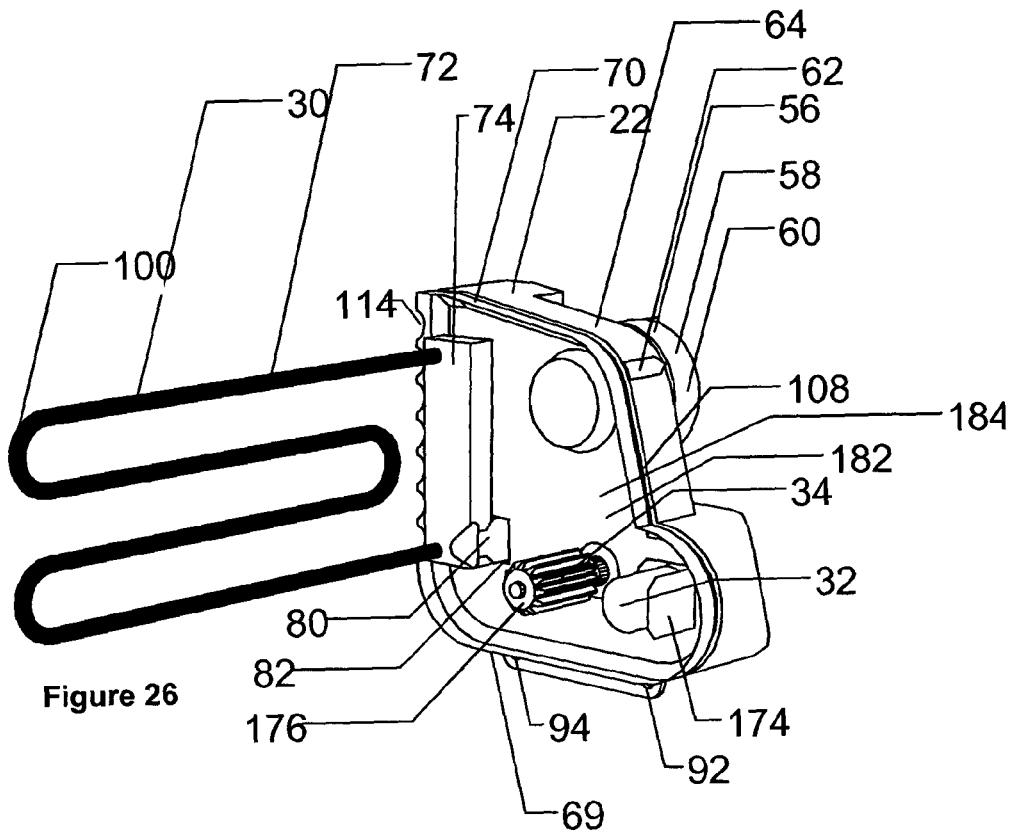
FIG. 26 is a forward, left hand, upper perspective of control box 22, including: heat coil 30, latch tab 80, spit drive assembly 34, and light assembly 32.

Referring to FIG. 26, integral with control box 22 are: a power supply cord (not shown), heat coil 30, light assembly 32, cooking time timer 56, and spit drive assembly 34. As an alternative to that illustrated, this integration may be accomplished by cooking time timer 56 being attached on the power supply cord outside of outer control box housing 64.

Figure 27:
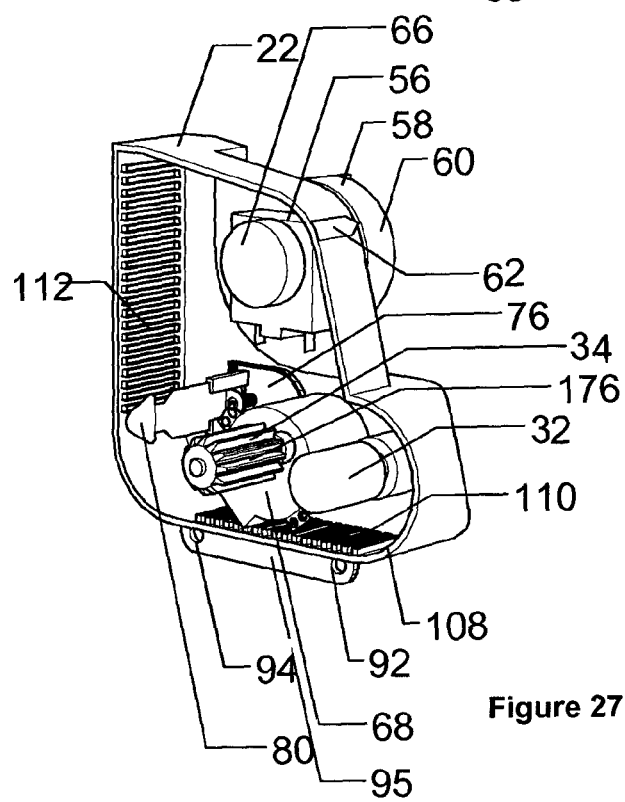
FIG. 27 is a forward, left hand, upper perspective of control box 22 with control box cover panel 70 removed, thus exposing cooking time timer 56, gear reduced drive motor 68, and light assembly 32.
Figure 28:
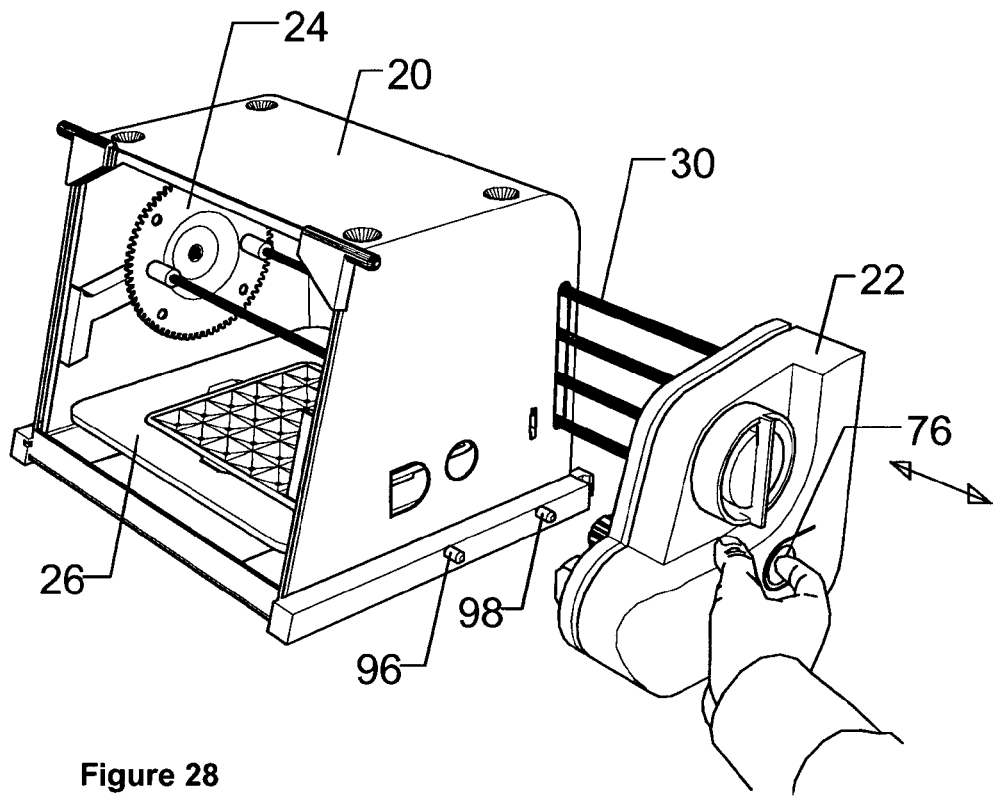
FIG. 28 is a forward, right hand, upper perspective of the preferred embodiment illustrated in FIG. 20 showing how control box 22 is removed from oven cabinet 20.

Cooking time timer 56, is a mechanical two hour windup timer manually operated through timer control knob 58. Control knob 58 is imprinted on its cylindrical periphery 60 with cooking time countdown marking indices which aligned with indicator arrow 62 which is in turn disposed on outer control box housing, 64 as shown. Referring to FIG. 27, cooking time timer 56 has bell 66 which rings when cooking is complete. Cooking time timer 56, also deenergizes the rotisserie once the selected cooking time has elapsed.

Referring to FIGS. 26 and 27, outer control box housing 64 also rigidly mounts: gear reduced drive motor 68, light assembly 32, and control box cover panel 70. Control box cover panel 70, in turn rigidly mounts heat coil assembly 72 which includes heat coil 30 and heat coil mounting bracket 74. Gear reduced drive motor 68 is a synchronous gear reduced motor operating off normal house current.

Heat coil 30 is a conventional resistance type tubular heat element operating off normal house current. Others suitable heaters might be used, provided they can be detachable in accordance with the present invention, including but not limited to, gas fired heaters, quartz type heaters, etc. Any suitable wattage might be employed for heat coil 30 and wattages between 800 W and 1600 W have been found suitable.

Light assembly 32 can employ any type of lighting device but preferably employs a conventional 25 W appliance light bulb. Cooking time timer 56 is a conventional two hour windup timer with house current switching capabilities to fully terminate and activate the rotisserie. As a safety feature, cooking time timer 56 may not have a manual override and therefore will only activate the rotisserie for up to two hours.

Outer control box housing 64 has formed into its right face, latch control button 76 which is inserted on its inner face with latch tab 80. Latch tab 80, in turn passes through hole 82 in control box cover panel 70 which restraints both latch tab's 80 inner and outer travel.

Referring to FIGS. 25, 26, and 27, coupling control box 22 to oven cabinet 20 relies on latch tab 80 controlled by latch control button 76, engaging latch hole 84 in right oven cabinet wall 86. This is aided by the natural outward bias 88 of latch control button 76 and latch tab 80 to engage latch tab 80 into hole 84.

As shown in FIGS. 25–28, disengaging control box 22 from oven cabinet 20 is accomplished by the user pressing latch control button 76 thus uncoupling latch tab 80 from latch hole 84, and then pulling control box 22 away from oven cabinet 20. In order to engage control box 22 to oven cabinet 20, the user first lines up heat coil 30 to pass into and through hole 90 in right oven cabinet wall 86. Control box 22 is then moved toward oven cabinet 20 causing the left end 100 of heat coil 30 to pass through holes 102 and 104 in heater support bracket 106. Control box 22 is then pressed against right oven cabinet wall 86, causing holes 92 and 94 in tab 95, formed in control box's 22 base, to respectively engage pins 96 and 98 which are integrally formed into the right side of right side support rail 38.

This engagement aligns and couples control box 22 with oven cabinet 20. Alignment and coupling is also aided through the engagement between heat coil 30 and hole 90, as well as engagement between heat coil 30 and holes 102 and 104 in heater support bracket 106. Engagement between latch tab 80 and latch hole 84, prevents control box 22 from disengaging from cabinet 20. Holes 90, 102, and 104 have rolled edges to prevent undesirable screeching sounds when heat coil 30 is inserted through holes 90, 102, and 104.

As shown in FIG. 26, inside edge 69 of control box cover panel 70 keeps control box 22 at a specific distance from right oven cabinet wall 86. This helps to mount control box 22 to oven cabinet 20 with more stability. This also creates air gap 182 between right oven cabinet wall 86 and forward face 184 of control box cover panel 70, as shown in FIG. 20, 21, 25, and 26. Air gap 182 keeps components within control box 22 cooler. Air gap 182, is vented through vents 114 in the back of control box cover panel 70, as shown in FIGS. 22 and 26.

Referring to FIG. 26, light shade 174 is integrally formed on the interior surface of control box cover panel 70 from the panel forming control box cover panel 70. Light shade 174, helps to reduce glare originating from light assembly 32. Light within oven cabinet 20 is important, both for reviewing cooking progress, and for making a show or presentation of the rotisserie cooking process.

Referring to FIGS. 25 and 26, drive gear 176 penetrates through hole 178 in right oven cabinet wall 86, when control box housing 22 is mounted on oven cabinet 20. Likewise, light assembly 32 and light shade 174 penetrate through hole 180.

Referring to FIGS. 21 and 22, components within control box 22 are kept cooler through venting, including perimeter vent 108, which circumnavigates the engagement periphery between outer control box housing 64 and control box cover panel 70. Vents 110 in the bottom of control box 22, and vents 112 in the back of control box 22 also help to reduce heat within control box 22. Also vents 114 in the back of control box cover panel 70 further help in reducing control box 22 internal heat, particularly since they are so close to the terminal ends of heat coil 30.

Referring to FIGS. 20 and 21, during rotisserie cooking, drip pan 26 is positioned in recess 116 in oven cabinet floor 118, directly below spit assembly 24 where it can catch grease and other waste food components. A raised edge 120 surrounds reservoir in drip pan 26. The width of raised edge 120 is not less than ⅛ of the front to back dimension of drip pan 26. Desirable results have been obtained when the width of raised edge 120 is not less than ⅙th of the front to back dimension of drip pan 26. These dimensions have proven to reduce the risk of fire by spacing reservoir away from heat coil 30. These dimensions have also proven to reduce undesirable odors emanating from heated grease and other food products within reservoir.

Also helping in reducing both the risk of fire and the occurrence of undesirable odors is the topography and geometry of drip pan cover 28, shown in FIG. 20, 21, and, more specifically, 24. Small holes 122 are recessed into inverse pyramids 124, formed in the surface of drip pan cover 28. Good results have been obtained when the area taken up by holes 122, is less than 20% of the total surface area of drip pan cover 28, with a greatest dimension of each of holes 122 being less than one quarter of an inch. Finger grips 126 formed in drip pan 26 help in removing drip pan cover 28 from drip pan 26.

As shown in FIGS. 20 and 25, supporting oven cabinet 20 on a countertop are left support rail 36, and right support rail 38. These are attached to oven cabinet 20 by means of left rail attachment tab 44 and right rail attachment tab 46 respectively, which are formed onto oven cabinet 20 in the lower left and right side edges of oven cabinet 20, and extend horizontally, sideways, and outwardly from oven cabinet 20.

Attachment tabs 44 and 46 may be fabricated as separate pieces or formed from oven cabinet 20 itself. As an example, right oven cabinet wall 86, may be bent at right angles at its base and joined with an extension of oven cabinet floor 118 to construct right rail attachment tab 46. Alternatively, as a second example, right rail attachment tab 46 might be constructed from an L-shaped channel, attached to right oven cabinet wall 86.

Right support rail 38 has slots 37 near its top which are bounded on their bottoms by a series of short vertical ribs 39. These slots slide over right rail attachment tab 46. Vertical screws (not shown) are then inserted through right support rail 38 and through right rail attachment tab 46 to secure right support rail 38 to right rail attachment tab 46.

Referring to FIG. 22, left support rail 36 and right support rail 38 mount feet 128 130 132 and 134. Support rails 36 and 38 in cooperation with feet 128 130 132 and 134 support oven cabinet, 20 on a countertop, and help protect the countertop from receiving excessive heat due to hot oven cabinet floor 118 being too close to the countertop during rotisserie cooking. Drip pan 26 also helps to block the countertop from receiving too much heat during rotisserie cooking.

Left support rail 36 and right support rail 38 support glass door 40 and allow it to rotate, detach, and slide in a manner described in accordance with the first embodiment described herein. FIG. 22 shows glass door 40 in three positions: closed position 164, countertop open position 166, and slidably retracted position 168 below oven cabinet floor 118. Glass door 40 may be lowered from countertop opened position 166 to a positioned below the horizontal surface on which the rotisserie rests simply by letting glass door 40 drop from countertop open position 166. Referring to FIGS. 22 and 25, sliding glass door 40 below oven cabinet floor 118 is accommodated by left door support axel 41 engaging a sliding track in left support rail 36 and by right door support axel 42 engaging a sliding track in right support rail 38.

Figure 23:
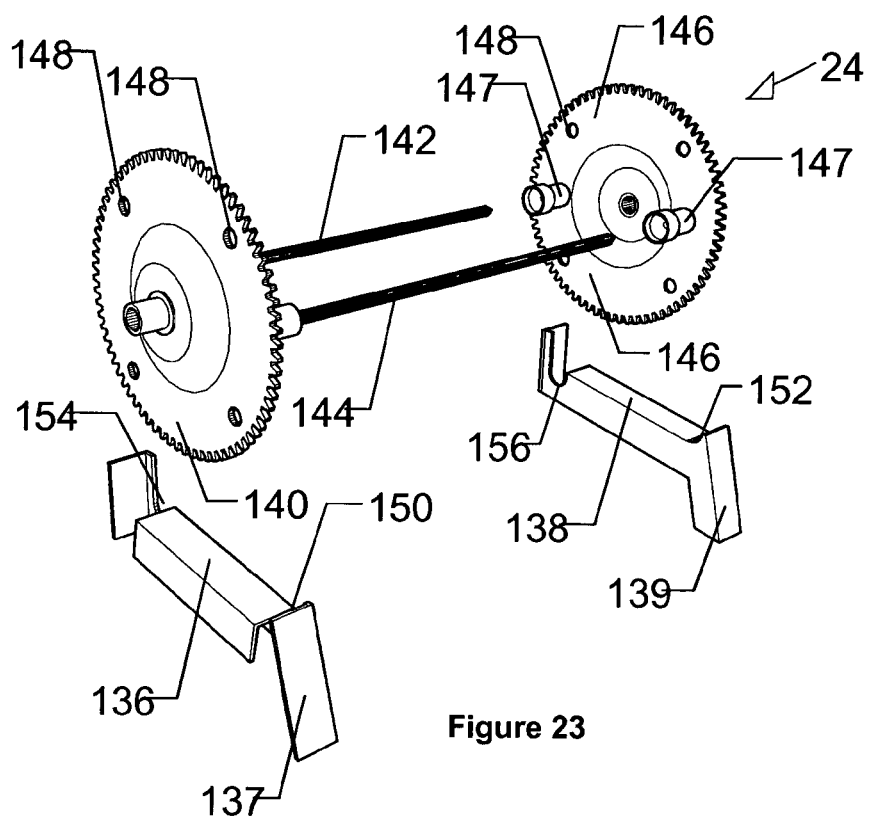
FIG. 23 is a forward, left hand, upper perspective of spit assembly 24 and left 136 and right 138 spit supports, and with right spit plate 146 detached from spit assembly 24.
Figure 24:
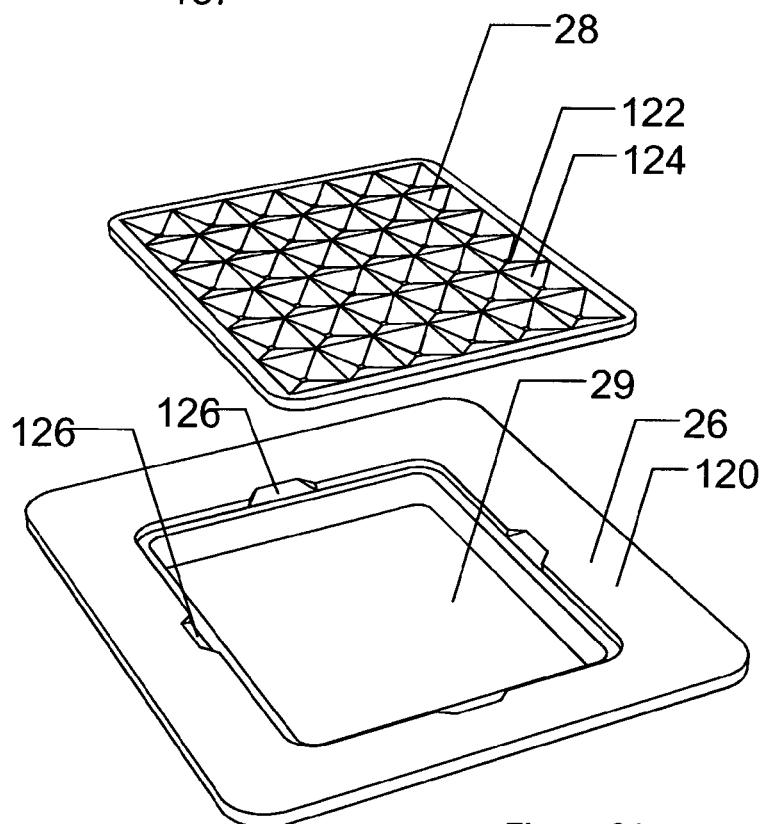
FIG. 24 is a forward, right hand, upper perspective of drip pan 26, and drip pan cover 28, with drip pan cover 28 raised about drip pan 26.

As shown in FIG. 23, spit assembly 24 is supported within oven cabinet 20 by left spit support 136, and right spit support 138. Spit assembly 24 is comprised of left spit plate 140 which rigidly mounts spit rods 142 and 144 which in turn removably connect to right spit plate 146 by sliding into sleeves 147 which are permanently and rigidly mounted on right spit plate 146.

Spit plates 140 and 146 each are pierced by four equally spaced kebab rod supporting holes 148 located near the periphery of each plate in a manner similar to that detailed in the first embodiment described herein. Spit plates 140 and 146 protrude inwardly on their periphery to allow clearance on their backsides for the tips of kebab rods protruding through support holes 148.

Left spit support 136 and right spit support 138 have rest positions 150 and 152 respectively to support spit assembly 24 and food thereon, when spit assembly 24 and food thereon are first loaded into oven cabinet 20 and before spit assembly 24 and food thereon are moved to their cooking position and supported by left detent support position 154 and right detent support position 156 in left spit support 136 and a right spit support 138 respectively. Rest positions 150 and 152 make it more convenient to load foods into the rotisserie by providing an intermediate rest position for the user to place the food before reaching into the oven cavity to place the food in its cooking position.

Spit guards 137 and 139 are located on the forward portions of left spit support 136 and right spit support 138 respectively. Guards 137 and 139 prevent spit assembly 24 from mistakenly being placed below spit supports 136 and 138.

The use of two spit rods 142, 144 to provide rotational support and coordination between the two spit plates 140, 146 provides a plurality of unique advantages. It obviates the need for a central structure connecting the centers of the two plates 140, 146. This makes food mounting and spit assembly placement easier. The two spit structure creates greater rotational stability and is better at capturing and holding onto food items.

Left detent support position 154 and right detent support position 156 support the axis of spit assembly 24 closer to glass door 40 than to: heat coil 30, cabinet ceiling 158, cabinet back 160, or drip pan cover 28. This means that if food is too large to be accommodated within oven cabinet 20, it will first strike glass door 40, where user observation can easily ascertained the food is too large, before it will strike any other part of the rotisserie oven. When food strikes glass door 40, it can easily be observed to be both hitting glass pane 50, and to be moving glass door 40 outwardly. Food hitting door 40 will also likely cause noise by attempting to open door 40 to further alert the end-user of a problem.

Ideally, heat coil 30 is positioned to be the most distant object within oven cabinet 20 from the center of the rotating axis of spit assembly 24. This means that if food is too large to be accommodated within oven cabinet 20, heat coil 30 would be the last object that the food would strike within oven cabinet 20. This is a major safety advantage, as in other rotisserie oven configurations oversize foods can easily be ignored, creating fire and other hazards.

Referring back to FIG. 20, oven cabinet 20 is comprised of single wall construction, which has advantages already pointed out. Cabinet ceiling 158, cabinet back 160, cabinet floor 118, left oven cabinet wall 162, and right oven cabinet wall 86 each has only one panel between their interior and exterior surfaces, as does glass door 40. Indented into cabinet ceiling 158 are four detents 172 which are configured to seat the feet on a heating and/or steaming tray as detailed in accordance with the first embodiment described herein.

Figure 29:
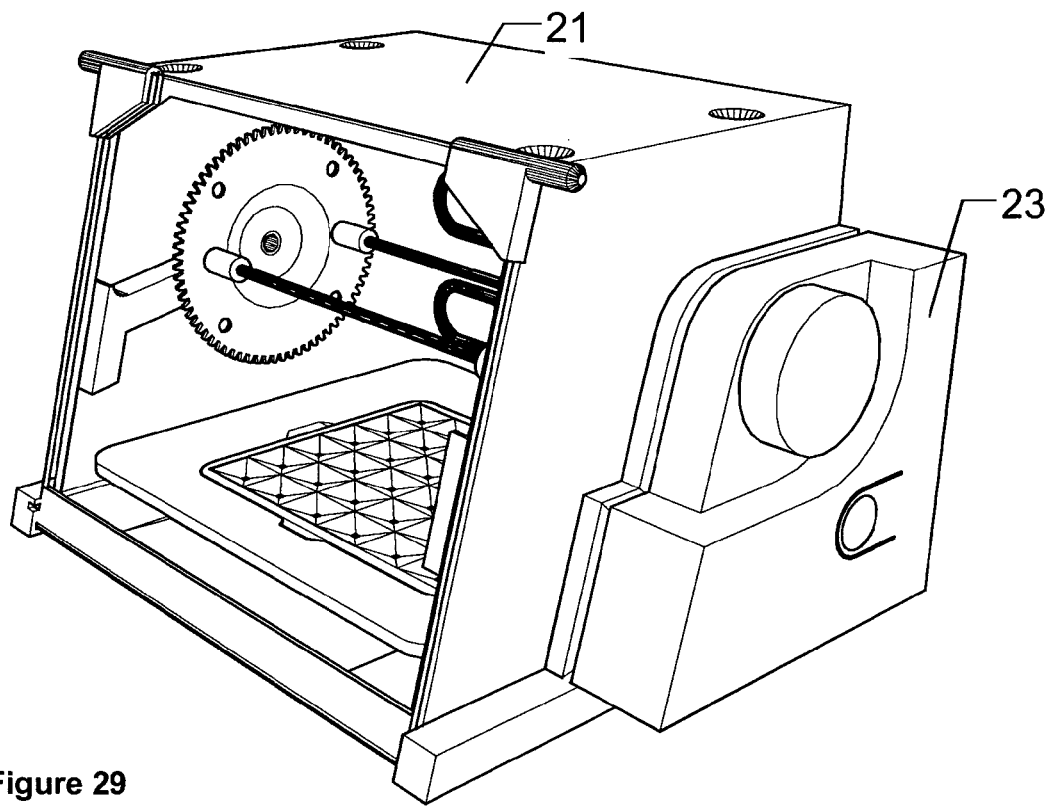
FIG. 29 is a forward, right hand, upper perspective of an alternate, restyled preferred embodiment for the present inventions. It shows alternate control box 23, coupled to alternate oven cabinet 21.

FIG. 29 shows an alternate preferred embodiment with both restyled oven cabinet 21 and restyled control box 23. Both function in essentially the same manner as that described for the earlier preferred embodiment. In combination with the earlier preferred embodiment, the new preferred embodiment offers up to four combinations or two combinations more than are illustrated. As examples, alternate control box 23 could be substituted onto the side of oven cabinet 20, or control box 22 could be placed onto alternate oven cabinet 21.

The preferred embodiments just described, may be constructed from any desirable material using any applicable manufacturing technique. As examples; oven cabinet 20 may be constructed from sheet material such as: steel, stainless steel, Galvalum, aluminum, other types of metal, high temperature plastic, ceramics, composites, or other suitable materials. Fabrication techniques may include: progressive die stamping, injection molding, die casting, or other desirable methods. Outer control box housing 64 may be fabricated from: plastics (such as polypropylene, ABS, SAN, polycarbonate, etc.), metal (such as aluminum, zinc, steel, stainless steel, etc.), ceramics, composites or other suitable material(s). Fabrication techniques may include: injection molding, die casting, progressive die stamping, or other suitable techniques.

Left spit plate 140 and right spit plate 146 may be constructed from metal (such as steel, stainless steel, aluminum, zinc, etc.) high temperature plastic, ceramic, composite, or other suitable material. Fabrication techniques might include: die casting, progressive die stamping, injection molding, compression molding, or other suitable techniques.

Cooking time timer 56 may be replaced with an electronic timer. Such a timer might have a digital readout (LCD, LED, etc.), and might introduce other features. These features might include warming the food after it has been cooked by cycling heat coil 30 on and off in a predetermined sequence. As an example, and not by way of limitation, heat coil 30 might be turned on for 20 seconds and turned off for 30 seconds repeatedly while spit assembly 24 is rotated. Alternatively, foods may be rotated without heat at the end of the cooking cycle. Each of these features, could have user controls to implement or deactivate them.

Nonstick materials, including, but not limited to: Teflon™, or ceramic materials might be used as coatings on any of the parts, to reduce cleaning or for other purposes. Self-cleaning oven coatings might also be used on any of the parts to facilitate cleaning or for other purposes.

The preferred embodiment can be constructed at any desirable scale. As an example, particular advantage has been found when the width, depth and height of oven cabinet 20 are between: 12 in. to 18 in. wide; 9 in. to 14 in. deep; and 7 to 14 in. high. These dimensions make it suitable for cooking: a single 5 lb. chicken, a 6 lbs. standing rib roast, a 5 lb. leg of lamb, four or more servings of vegetables (including squash, bell peppers, tomatoes, potatoes, carrots, etc.), two slabs of baby back ribs, a 5 lbs. steak, four pork chops, four salmon steaks, four quarter pound hamburgers, eight hotdogs, a 5 lbs. turkey breast, a 6 lb. duck, a basketful of shrimp, two lobster tails, or an 8 lb. turkey.

One of ordinary skill in the art would appreciate that many of the features described in accordance with the first embodiment can be utilized with this preferred embodiment. Such features include the kabob rods, their structure, and their methodology of use and the basket structure, its structure, and its methodology of use.

Horizontal spit rotisserie ovens have a unique property of allowing grease, oil and liquids to be shed from all sides of food being cooked. This contrasts with other forms of cooking, which, while allowing grease, oils and other liquids to drip off from one side of foods being cooked, simultaneously through gravity, they unhealthily cook greases and oils into the opposite side. These unhealthy cooked-in greases and oils are not properly digested and are heavy contributors to weight gain, particularly when they originate from protein rich foods and are combined with starchy foods in the same meal. It has been found that this is particularly true when the food being consumed is ingested in the afternoon or evening.

Success in losing weight has been achieved by horizontal spit rotisserie cooking protein rich foods, such as fish, foul, and red meats, including: salmon, trout, cod, halibut, chicken, duck, Cornish hen, squab, steak, pork, roast beef, baby back ribs, lamb, etc.; and consuming these foods for afternoon and evening meals, with non-starchy vegetables and with salads. Starchy foods, such as potatoes, rice, bread, beans (navy, pinto), corn, grains and pastries, are not consumed during the afternoon and evening meals.

Individuals may eat as much as they desire. There are no limitations on portion sizes and no limitations on caloric intake. There are also no limitations on the number of meals or snacks that may be consumed during the afternoon and evening periods.

Breakfasts may remain unchanged while under this régime, or, for even more rapid results, breakfasts may include the same protein rich rotisserie cooked foods combined with non-starchy vegetables and salads, consumed during afternoon and evening meals. It is suggested that only one protein rich food be consumed during each meal. As an example, steak would not be consumed with chicken in the same meal. It is best if the protein rich food is consumed first during a meal, followed by vegetables and salads.

Sweets, including artificial sweets, are to be avoided. Individuals are encouraged to drink at least eight glasses of water a day. Coffee, tea, lemon water and other non-sweet beverages are also good. Sweet fruit and fruit juices may be consumed with, or for breakfast. Canola and peanut oils are to be avoided at all times.

Aerobic exercise is highly recommended at least every other day, and preferably once a day. This may be as simple as a walk around the block or climbing four or five flights of stairs.

Contrary to what might be conventionally expected, some individuals following this régime have not only achieved weight loss, but have also lowered their cholesterol and blood pressure. This may be because of the grease and oil shed by the food during horizontal spit rotisserie cooking, or it may be for other reasons.

It is expected that, because the foods being consumed are naturally tasty from horizontal spit rotisserie cooking, and because there are no limitations on portions or on the number of meals that individuals may consume; that individuals following this régime may be willing to follow it for longer periods of time than those periods found for conventional diets. This may allow individuals to lose, and keep weight off.

Figure 32:
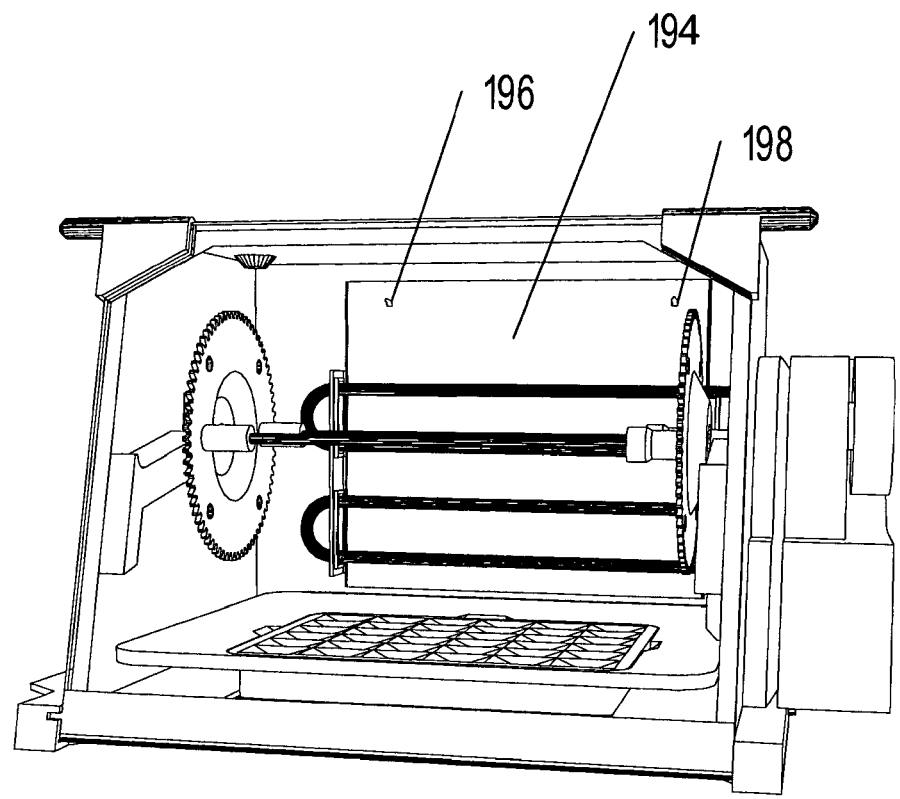
FIG. 32 is a front perspective view of a preferred embodiment of the present invention.

FIG. 32 shows the embodiment shown in FIG. 29 with a piece of aluminum foil 194 suspended behind the heat coil by pointed pegs 196 and 198 which are bent forward from the embodiment's rear wall and pierced through the foil. The foil may be folded to fit the desired dimensions. Foil 194 is easily inserted and removed, and is disposable, and may greatly help in both easing cleaning and in reflecting heat on the foods being rotisserie cooked.

Figure 30:
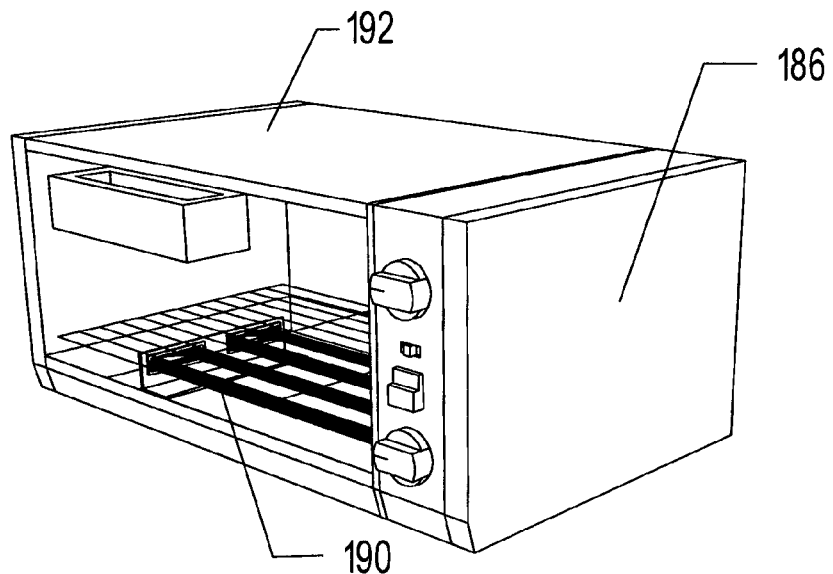
FIG. 30 is a right, upper, perspective view of a toaster oven incorporating some of the present inventions.
Figure 31:
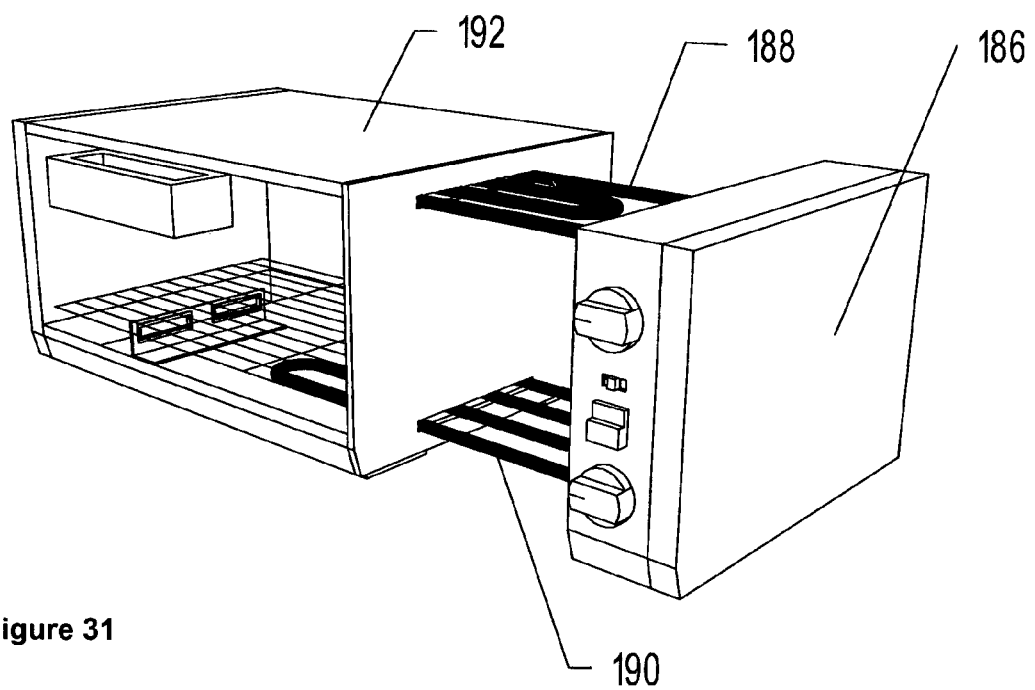
FIG. 31 is a right, upper, perspective view of the toaster oven shown in FIG. 11 with its control box and heat coils being removed.

The present invention is directed toward a plurality of different cooking appliances having detachable electronic and/or heating components. In another embodiment, a toaster oven with detachable electronic components is provided. Referring to FIGS. 30 and 31, a toaster oven in accordance with the present invention is shown. Control box 186 having rigidly mounted heat coils 188 and 190 is removable from cabinet 192 by unlatching control box 186 and pulling it away from cabinet 192. The heat coils 188, 190 insert into holes integrally formed with the base and top of the cabinet 192.

The engagement mechanism is substantially similar to the latching and attachment mechanism described in accordance with the preferred rotisserie invention. Coupling control box to the cabinet preferably relies on a latch tab controlled by latch control button, engaging latch hole in a cabinet wall. Disengaging control box from the cabinet is accomplished by the user pressing latch control button thus uncoupling latch tab from latch hole, and then pulling control box away from oven cabinet. In order to engage control box to the cabinet, the user first lines up heat coil to pass into and through hole in the cabinet wall. Control box is then moved toward oven cabinet causing the left end of heat coil to pass through holes and in heater support bracket. Control box is then pressed against the cabinet wall.

The control box preferably comprises a cooking time timer that is a mechanical windup timer manually operated through a timer control knob. Control knob is imprinted on its cylindrical periphery with cooking time countdown marking indices that are aligned with an indicator arrow, which is in turn disposed on outer control box housing. The cooking time timer has a bell, which rings when cooking is complete. Cooking time timer also deenergizes the toaster oven once the selected cooking time has elapsed.

Heat coil is a conventional resistance type tubular heat element operating off normal house current. Others suitable heaters might be used, provided they can be detachable in accordance with the present invention, including but not limited to, gas fired heaters, quartz type heaters, etc. Any suitable wattage might be employed for heat coil.

Other devices might also utilize current inventions. As examples, deep fat friars, breadmakers, popcorn makers, vertical rotisseries, toasters, as well as other devices including kitchen appliances might benefit for cleaning and other purposes from having control units with integral heat coils, which are removable from their cabinet.

What have been described herein are specific preferred embodiments of the present inventions. One knowledgeable in the art will easily recognize that many departures may be made from these embodiments without compromising the underlying inventions. As examples: cabinet proportions and sizes may be changed; other spits and spit drive mechanisms might be employed such as rotating spit assembly on two or more drive wheels without a central axle, or rotating spit assembly with belts, chains, reciprocating claws, etc.; an embodiment may use a gas-fired burner; an embodiment may be designed for use outdoors; an embodiment may rest on a floor, a patio, or the ground instead of a countertop; spit assembly designs may include more or fewer spit rods, such as three or four spit rods equally or unequally spaced from the spit assembly central axis, or two peripheral spit rods, similar to that shown, combined with a basket or other type of food support mechanism or combined with a central axle rod, etc.; the spit drive might employ a stepper motor, solenoid, shaded poll motor, gasoline motor, propane or butane motor, or other type of power mechanism; likewise, such power mechanisms might be controlled with electronic circuits which would provide programmed varying speeds, including no motion, over a predetermined time; the control box might have multiple mounting positions on the oven cabinet to, as an example, facilitate alternate heating positions, such as behind, below, beside, or above the food being cooked, or alternate cooking positions, such as the spit being in a horizontal or vertical position. Such changes should be considered as obvious. Claim coverage for the inventions taught herein should be solely determined by the appended claims, and by their legal equivalents.

What is claimed is:

1. A horizontal spit rotisserie oven comprising:
   a cabinet having a plurality of side walls, each having an interior face and exterior face, and resting on a horizontal surface;
   a spit assembly that can be positioned within the cabinet; and
   a control box comprising an activation switch and a spit assembly drive mechanism, wherein the control box is attached to a cooking heating member, wherein the control box is mounted on the exterior of one of the side walls of the cabinet by a manually activated latch, wherein the control box and the cooking heating member can be manually removed from the cabinet, and wherein when the control box is mounted on the exterior of one of the side walls of the cabinet, the cooking heating member and the spit drive mechanism driving the spit are positioned within the cabinet.

2. The horizontal spit rotisserie oven of claim 1 wherein the cooking heating member can be manually removed from the cabinet without the use of tools.

3. The horizontal spit rotisserie of claim 1 wherein the side walls of the cabinet each have only a single panel between their interior and exterior faces.

4. The horizontal spit rotisserie of claim 1 wherein the cabinet has an opening through which food is loaded into the cabinet, and the opening is covered by a door having an interior and exterior face wherein the door has only a single panel between its interior and exterior faces.

5. The horizontal spit rotisserie of claim 1 wherein the cabinet has an opening through which food is loaded into the oven cabinet, and the opening is covered by a door and the door can slide under the oven cabinet and the door can be lowered below the horizontal surface on which the rotisserie rests.

6. The horizontal spit rotisserie of claim 1 wherein the control box is removed from the cabinet by pulling the control box generally orthogonally away from the side wall on which the control box is mounted.

7. The horizontal spit rotisserie of claim 1 wherein the activation switch is a countdown timer which activates and terminates operation of the rotisserie.

8. The horizontal spit rotisserie of claim 1 wherein the activation switch is a timer which activates a food warming feature after cooking.

9. The horizontal spit rotisserie of claim 1 wherein the spit drive mechanism is a gear reduced electric motor.

10. The horizontal spit rotisserie of claim 1 wherein the control box has a light which illuminates an interior of the cabinet when the control box is mounted on the cabinet.

11. The horizontal spit rotisserie of claim 10 wherein a globe of the light protrudes into the cabinet.

12. The horizontal spit rotisserie of claim 1 wherein the cabinet comprises side rails which support it above a horizontal surface.

13. The horizontal spit rotisserie of claim 1 wherein the cabinet has a plurality of feet wherein the feet attach to the side walls using tabs extending away from the side walls.

14. The horizontal spit rotisserie of claim 1 wherein the cabinet mounts a food warming tray.

15. The horizontal spit rotisserie of claim 1 wherein when the control box is mounted on the cabinet there is an air gap between an outside face of the cabinet and an inside face of the control box.

16. The horizontal spit rotisserie of claim 1 wherein the cabinet has a transparent window.

17. The horizontal, spit rotisserie of claim 1 wherein an axis of the spit is closer to the window than to the cooking heating member.

18. The horizontal spit rotisserie of claim 1 wherein a frontal portion of the cabinet is inclined.

19. A horizontal spit rotisserie oven comprising:
    a cabinet having a plurality of side walls, each having an interior face and exterior face, and resting on a horizontal surface;
    a spit assembly that can be positioned within the cabinet; and
    a control box comprising an activation switch and a spit assembly drive mechanism, wherein the control box is attached to a cooking heating member, wherein the control box is mounted on the exterior of one of the side walls of the cabinet by a manually activated latch, wherein the control box and the cooking heating member can be manually removed from the cabinet, and wherein the cooking heating member is at least one of an electric, resistive, or tubular heating element.

20. A horizontal spit rotisserie oven comprising:
    a cabinet having a plurality of side walls, each having an interior face and exterior face, and resting on a horizontal surface;
    a spit assembly that can be positioned within the cabinet; and
    a control box comprising an activation switch and a spit assembly drive mechanism, wherein the control box is attached to a cooking heating member, wherein the control box is mounted on the exterior of one of the side walls of the cabinet by a manually activated latch, wherein the control box and the cooking heating member can be manually removed from the cabinet, and wherein the cooking heating member helps structurally support the control box to be mounted to the cabinet.

21. A food cooking rotisserie, comprising:
    an enclosure with a plurality of peripheral walls;
    a spit assembly capable of being positioned within the enclosure;
    a control box removably coupled to the exterior of one of the peripheral walls of the enclosure by a manually activated latch;

a cooking heat source formed integrally with the control box; and a spit drive mechanism formed integrally with the control box, wherein the control box, the cooking heat source and the spit drive mechanism are manually removable from the enclosure without use of tools and wherein the cooking heat source and the spit drive mechanism are positioned within the cabinet.

22. The food cooking rotisserie of claim 21 wherein the enclosure has a transparent window.

23. The food cooking rotisserie of claim 22 wherein an axis of the spit is closer to the transparent window than to the cooking heat source.

24. The food cooking rotisserie of claim 21 wherein the enclosure has an access door.

25. The food cooking rotisserie of claim 24 wherein an axis of the spit is closer to the access door than to the cooking heat source.

26. The food cooking rotisserie of claim 21 wherein, when the control box is coupled to the enclosure, there is an air gap between an outside face of the enclosure and an inside face of the control box.

27. The food cooking rotisserie of claim 21 wherein the side walls of the enclosure each has only a single panel between their interior and exterior faces.

28. The food cooking rotisserie of claim 21 wherein the enclosure has an opening through which food is loaded into the enclosure, and the opening is covered by a door having an interior and exterior face wherein the door has only a single panel between its interior and exterior faces.

29. The food cooking rotisserie of claim 28 wherein the rotisserie rests on a horizontal surface and the door can drop below the horizontal surface.

* * * * *